United States Patent
Tran et al.

(10) Patent No.: US 12,530,561 B2
(45) Date of Patent: Jan. 20, 2026

(54) ARTIFICIAL NEURAL NETWORK COMPRISING AN ANALOG ARRAY AND A DIGITAL ARRAY

(71) Applicant: Silicon Storage Technology, Inc., San Jose, CA (US)

(72) Inventors: Hieu Van Tran, San Jose, CA (US); Thuan Vu, San Jose, CA (US); Stanley Hong, San Jose, CA (US); Stephen Trinh, San Jose, CA (US); Anh Ly, San Jose, CA (US)

(73) Assignee: Silicon Storage Technology, Inc, San Jose, CA (US)

( * ) Notice: Subject to any disclaimer, the term of this patent is extended or adjusted under 35 U.S.C. 154(b) by 952 days.

(21) Appl. No.: 17/721,254

(22) Filed: Apr. 14, 2022

(65) Prior Publication Data
US 2023/0244903 A1   Aug. 3, 2023

Related U.S. Application Data

(60) Provisional application No. 63/304,485, filed on Jan. 28, 2022.

(51) Int. Cl.
*G06N 3/04* (2023.01)
*G11C 11/54* (2006.01)
(52) U.S. Cl.
CPC .............. *G06N 3/04* (2013.01); *G11C 11/54* (2013.01)
(58) Field of Classification Search
CPC .......... G11C 11/54; G11C 21/00; G11C 27/00
See application file for complete search history.

(56) References Cited

U.S. PATENT DOCUMENTS

| | | |
|---|---|---|
| 5,029,130 A | 7/1991 | Yeh |
| 6,747,310 B2 | 6/2004 | Fan |
| 10,741,568 B2 | 8/2020 | Tran et al. |
| 10,748,630 B2 | 8/2020 | Tran et al. |
| 11,081,168 B2 | 8/2021 | Zhao et al. |
| 2006/0268631 A1* | 11/2006 | Kang ................. G11C 11/22 365/192 |
| 2017/0337466 A1 | 11/2017 | Bayat et al. |
| 2019/0236445 A1 | 8/2019 | Das et al. |
| 2020/0372949 A1* | 11/2020 | Zhao ............... G11C 13/0026 |

(Continued)

FOREIGN PATENT DOCUMENTS

| | | |
|---|---|---|
| KR | 10-2021-0146995 | 12/2021 |
| KR | 10-2021-0154816 | 12/2021 |
| TW | 694448 | 5/2021 |

(Continued)

OTHER PUBLICATIONS

PCT Invitation to Pay Additional Fees mailed on Oct. 18, 2022 corresponding to the related PCT Patent Application No. PCT/US2022/027046.

(Continued)

*Primary Examiner* — Han Yang
(74) *Attorney, Agent, or Firm* — Vedder Price P.C.

(57) ABSTRACT

Numerous examples are described for providing an artificial neural network system comprising an analog array and a digital array. In certain examples, an analog array and a digital array are coupled to shared bit lines. In other examples, an analog array and a digital array are coupled to separate bit lines.

7 Claims, 45 Drawing Sheets

(56) References Cited

U.S. PATENT DOCUMENTS

2020/0402392 A1 12/2020 Robinson
2023/0352477 A1 11/2023 Matsuzaki et al.

FOREIGN PATENT DOCUMENTS

WO 2020/222867 A1 11/2020
WO 2020/229468 A1 11/2020
WO 2022029541 A1 2/2022

OTHER PUBLICATIONS

Taiwanese Office Action mailed on Jul. 31, 2023 corresponding to the related Taiwanese Patent Application No. 111144915.
PCT Search Report and Written Opinion mailed on Dec. 13, 2022 corresponding to the related PCT Patent Application No. PCT/US2022/027046.
Machine translation of Office Action from Japan Patent Office, filed under Japan Application No. 2024-535730, 5 pages.
Machine translation of Office Action from Korean Patent Office, filed under Korean Application No. 10-2024-7023699, 5 pages.

\* cited by examiner

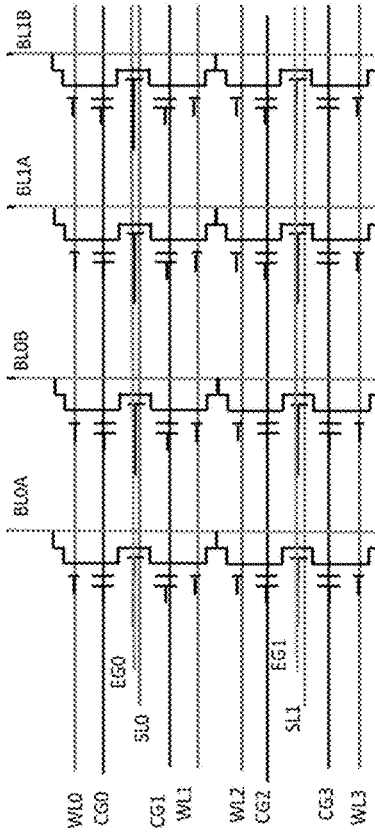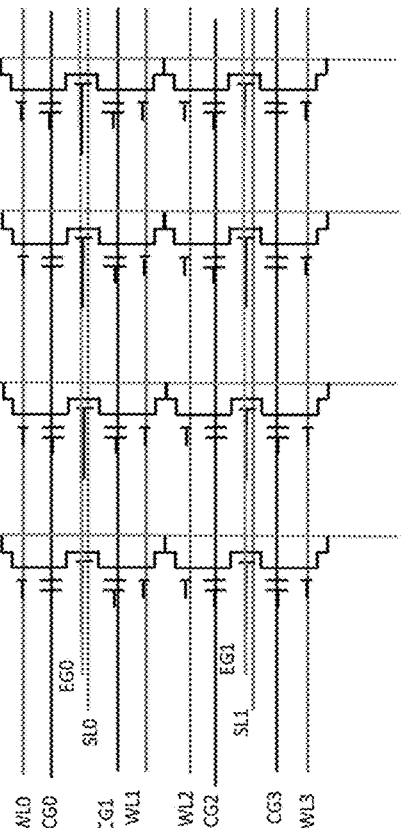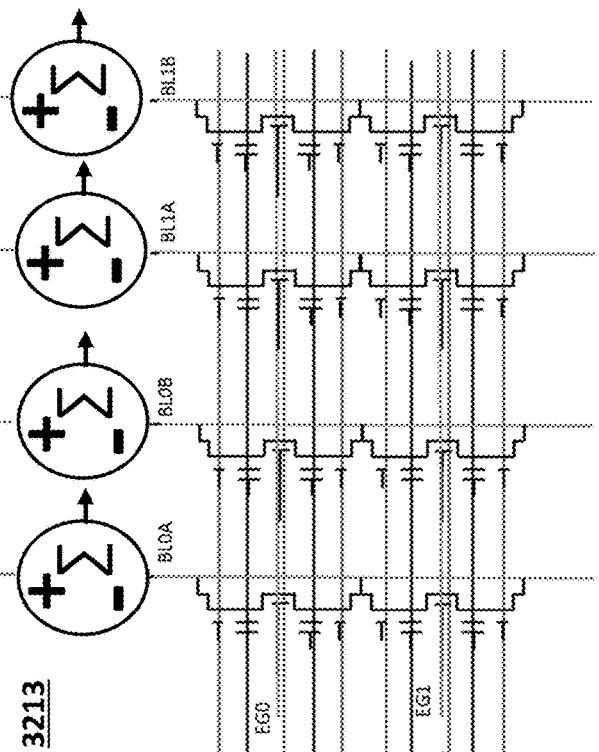
FIGURE 32

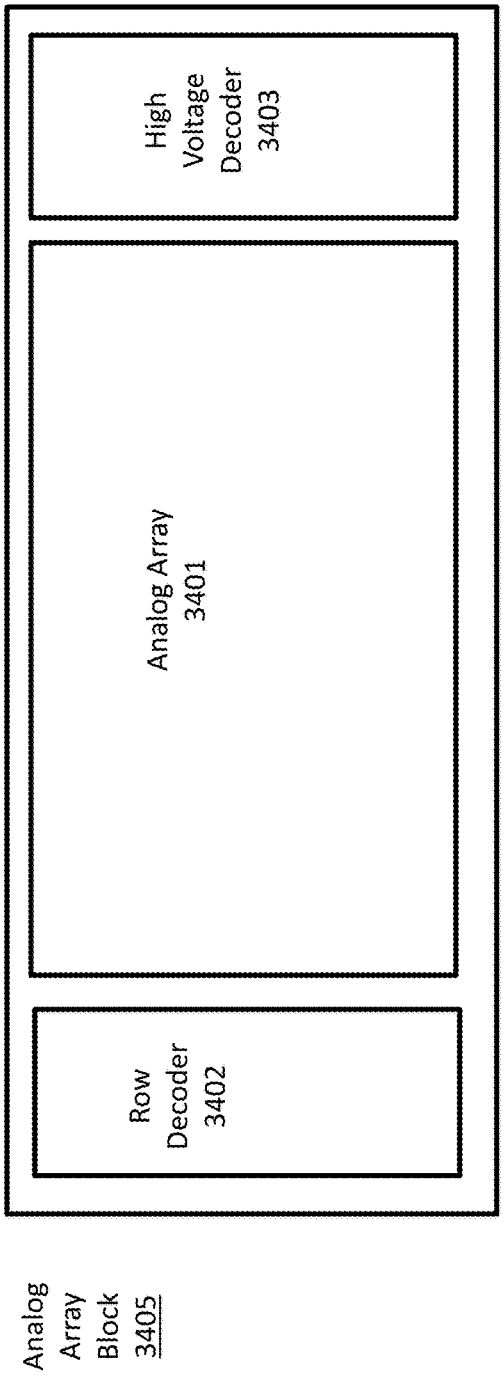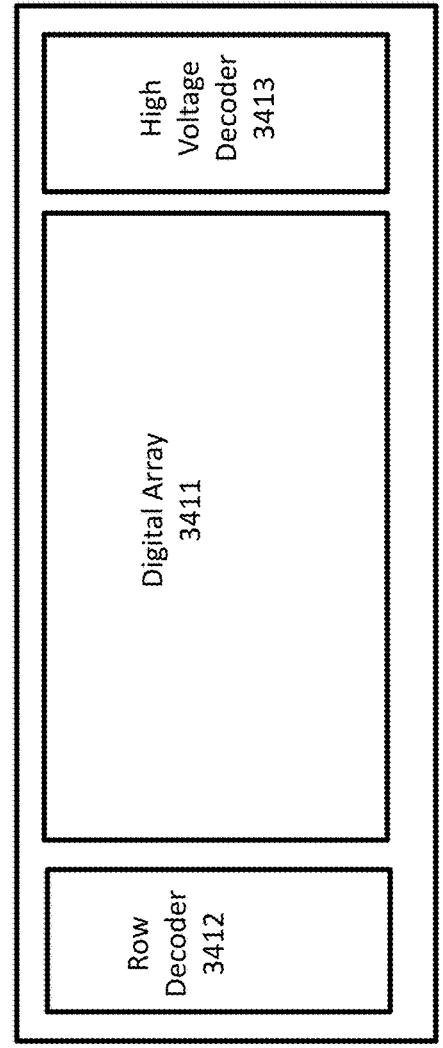
FIGURE 34 (PRIOR ART)

FIGURE 43

Read Operation
4300

4301 During a read of an analog array, a first row decoder and a first voltage row decoder apply a first set of voltages to the analog array.

↓

4302 During a read of a digital array, a second row decoder and a second voltage row decoder apply a second set of voltages to the digital array, where the second set of voltages are different than the first set of voltages.

US 12,530,561 B2

ARTIFICIAL NEURAL NETWORK COMPRISING AN ANALOG ARRAY AND A DIGITAL ARRAY

PRIORITY CLAIM

This application claims priority from U.S. Provisional Patent Application No. 63/304,485, filed on Jan. 28, 2022, and titled, "Artificial Neural Network Comprising a Digital Information Array," which is incorporated by reference herein.

FIELD OF THE INVENTION

Numerous examples are disclosed of an artificial neural network that comprises an analog array and a digital array.

BACKGROUND OF THE INVENTION

Artificial neural networks mimic biological neural networks (the central nervous systems of animals, in particular the brain) and are used to estimate or approximate functions that can depend on a large number of inputs and are generally unknown. Artificial neural networks generally include layers of interconnected "neurons" which exchange messages between each other.

FIG. 1 illustrates an artificial neural network, where the circles represent the inputs or layers of neurons. The connections (called synapses) are represented by arrows and have numeric weights that can be tuned based on experience. This makes neural networks adaptive to inputs and capable of learning. Typically, neural networks include a layer of multiple inputs. There are typically one or more intermediate layers of neurons, and an output layer of neurons that provide the output of the neural network. The neurons at each level individually or collectively make a decision based on the received data from the synapses.

One of the major challenges in the development of artificial neural networks for high-performance information processing is a lack of adequate hardware technology. Indeed, practical neural networks rely on a very large number of synapses, enabling high connectivity between neurons, i.e., a very high computational parallelism. In principle, such complexity can be achieved with digital supercomputers or specialized graphics processing unit clusters. However, in addition to high cost, these approaches also suffer from mediocre energy efficiency as compared to biological networks, which consume much less energy primarily because they perform low-precision analog computation. CMOS analog circuits have been used for artificial neural networks, but most CMOS-implemented synapses have been too bulky given the high number of neurons and synapses.

Applicant previously disclosed an artificial (analog) neural network that utilizes one or more non-volatile memory arrays as the synapses in U.S. Patent Application Publication 2017/0337466A1, which is incorporated by reference. The non-volatile memory arrays operate as an analog neural memory and comprise non-volatile memory cells arranged in rows and columns. The neural network includes a first plurality of synapses configured to receive a first plurality of inputs and to generate therefrom a first plurality of outputs, and a first plurality of neurons configured to receive the first plurality of outputs. The first plurality of synapses includes a plurality of memory cells, wherein each of the memory cells includes spaced apart source and drain regions formed in a semiconductor substrate with a channel region extending there between, a floating gate disposed over and insulated from a first portion of the channel region and a non-floating gate disposed over and insulated from a second portion of the channel region. Each of the plurality of memory cells store a weight value corresponding to a number of electrons on the floating gate. The plurality of memory cells multiply the first plurality of inputs by the stored weight values to generate the first plurality of outputs.

Non-Volatile Memory Cells

Non-volatile memories are well known. For example, U.S. Pat. No. 5,029,130 ("the '130 patent"), which is incorporated herein by reference, discloses an array of split gate non-volatile memory cells, which are a type of flash memory cells. Such a memory cell 210 is shown in FIG. 2. Each memory cell 210 includes source region 14 and drain region 16 formed in semiconductor substrate 12, with channel region 18 there between. Floating gate 20 is formed over and insulated from (and controls the conductivity of) a first portion of the channel region 18, and over a portion of the source region 14. Word line terminal 22 (which is typically coupled to a word line) has a first portion that is disposed over and insulated from (and controls the conductivity of) a second portion of the channel region 18, and a second portion that extends up and over the floating gate 20. The floating gate 20 and word line terminal 22 are insulated from the substrate 12 by a gate oxide. Bitline 24 is coupled to drain region 16.

Memory cell 210 is erased (where electrons are removed from the floating gate) by placing a high positive voltage on the word line terminal 22, which causes electrons on the floating gate 20 to tunnel through the intermediate insulation from the floating gate 20 to the word line terminal 22 via Fowler-Nordheim (FN) tunneling.

Memory cell 210 is programmed by source side injection (SSI) with hot electrons (where electrons are placed on the floating gate) by placing a positive voltage on the word line terminal 22, and a positive voltage on the source region 14. Electron current will flow from the drain region 16 towards the source region 14. The electrons will accelerate and become heated when they reach the gap between the word line terminal 22 and the floating gate 20. Some of the heated electrons will be injected through the gate oxide onto the floating gate 20 due to the attractive electrostatic force from the floating gate 20.

Memory cell 210 is read by placing positive read voltages on the drain region 16 and word line terminal 22 (which turns on the portion of the channel region 18 under the word line terminal). If the floating gate 20 is positively charged (i.e., erased of electrons), then the portion of the channel region 18 under the floating gate 20 is turned on as well, and current will flow across the channel region 18, which is sensed as the erased or "1" state. If the floating gate 20 is negatively charged (i.e., programmed with electrons), then the portion of the channel region under the floating gate 20 is mostly or entirely turned off, and current will not flow (or there will be little flow) across the channel region 18, which is sensed as the programmed or "0" state.

Table No. 1 depicts typical voltage and current ranges that can be applied to the terminals of memory cell 210 for performing read, erase, and program operations:

TABLE 1

Operation of Flash Memory Cell 210 of FIG. 2

|  | WL | BL | SL |
|---|---|---|---|
| Read | 2-3 V | 0.6-2 V | 0 V |
| Erase | ~11-13 V | 0 V | 0 V |
| Program | 1-2 V | 10.5-3 µA | 9-10 V |

Other split gate memory cell configurations, which are other types of flash memory cells, are known. For example, FIG. 3 depicts a four-gate memory cell 310 comprising source region 14, drain region 16, floating gate 20 over a first portion of channel region 18, a select gate 22 (typically coupled to a word line, WL) over a second portion of the channel region 18, a control gate 28 over the floating gate 20, and an erase gate 30 over the source region 14. This configuration is described in U.S. Pat. No. 6,747,310, which is incorporated herein by reference for all purposes. Here, all gates are non-floating gates except floating gate 20, meaning that they are electrically connected or connectable to a voltage source. Programming is performed by heated electrons from the channel region 18 injecting themselves onto the floating gate 20. Erasing is performed by electrons tunneling from the floating gate 20 to the erase gate 30.

Table No. 2 depicts typical voltage and current ranges that can be applied to the terminals of memory cell 310 for performing read, erase, and program operations:

TABLE 2

Operation of Flash Memory Cell 310 of FIG. 3

|  | WL/SG | BL | CG | EG | SL |
|---|---|---|---|---|---|
| Read | 1.0-2 V | 0.6-2 V | 0-2.6 V | 0-2.6 V | 0 V |
| Erase | −0.5 V/0 V | 0 V | 0 V/−8 V | 8-12 V | 0 V |
| Program | 1 V | 0.1-1 µA | 8-11 V | 4.5-9 V | 4.5-5 V |

FIG. 4 depicts a three-gate memory cell 410, which is another type of flash memory cell. Memory cell 410 is identical to the memory cell 310 of FIG. 3 except that memory cell 410 does not have a separate control gate. The erase operation (whereby erasing occurs through use of the erase gate) and read operation are similar to that of the FIG. 3 except there is no control gate bias applied. The programming operation also is done without the control gate bias, and as a result, a higher voltage is applied on the source line during a program operation to compensate for a lack of control gate bias.

Table No. 3 depicts typical voltage and current ranges that can be applied to the terminals of memory cell 410 for performing read, erase, and program operations:

TABLE 3

Operation of Flash Memory Cell 410 of FIG. 4

|  | WL/SG | BL | EG | SL |
|---|---|---|---|---|
| Read | 0.7-2.2 V | 0.6-2 V | 0-2.6 V | 0 V |
| Erase | −0.5 V/0 V | 0 V | 11.5 V | 0 V |
| Program | 1 V | 0.2-3 µA | 4.5 V | 7-9 V |

FIG. 5 depicts stacked gate memory cell 510, which is another type of flash memory cell. Memory cell 510 is similar to memory cell 210 of FIG. 2, except that floating gate 20 extends over the entire channel region 18, and control gate 22 (which here will be coupled to a word line) extends over floating gate 20, separated by an insulating layer (not shown). The erase is done by FN tunneling of electrons from FG to substrate, programming is by channel hot electron (CHE) injection at region between the channel 18 and the drain region 16, by the electrons flowing from the source region 14 towards to drain region 16 and read operation which is similar to that for memory cell 210 with a higher control gate voltage.

Table No. 4 depicts typical voltage ranges that can be applied to the terminals of memory cell 510 and substrate 12 for performing read, erase, and program operations:

TABLE 4

Operation of Flash Memory Cell 510 of FIG. 5

|  | CG | BL | SL | Substrate |
|---|---|---|---|---|
| Read | 2-5 V | 0.6-2 V | 0 V | 0 V |
| Erase | −8 to −10 V/0 V | FLT | FLT | 8-10 V/15-20 V |
| Program | 8-12 V | 3-5 V | 0 V | 0 V |

The methods and means described herein may apply to other non-volatile memory technologies such as FINFET split gate flash or stack gate flash memory, NAND flash, SONOS (silicon-oxide-nitride-oxide-silicon, charge trap in nitride), MONOS (metal-oxide-nitride-oxide-silicon, metal charge trap in nitride), ReRAM (resistive ram), PCM (phase change memory), MRAM (magnetic ram), FeRAM (ferro-electric ram), CT (charge trap) memory, CN (carbon-tube) memory, OTP (bi-level or multi-level one time programmable), and CeRAM (correlated electron ram), without limitation.

In order to utilize the memory arrays comprising one of the types of non-volatile memory cells described above in an artificial neural network, two modifications are made. First, the lines are configured so that each memory cell can be individually programmed, erased, and read without adversely affecting the memory state of other memory cells in the array, as further explained below. Second, continuous (analog) programming of the memory cells is provided.

Specifically, the memory state (i.e., charge on the floating gate) of each memory cell in the array can be continuously changed from a fully erased state to a fully programmed state, and vice-versa, independently and with minimal disturbance of other memory cells. This means the cell storage is effectively analog or at the very least can store one of many discrete values (such as 16 or 64 different values), which allows for very precise and individual tuning of all the memory cells in the memory array, and which makes the memory array ideal for storing and making fine tuning adjustments to the synapsis weights of the neural network.
Neural Networks Employing Non-Volatile Memory Cell Array FIG. 6 conceptually illustrates a non-limiting example of a neural network utilizing a non-volatile memory array of the present examples. This example uses the non-volatile memory array neural network for a facial recognition application, but any other appropriate application could be implemented using a non-volatile memory array based neural network.

S0 is the input layer, which for this example is a 32×32 pixel RGB image with 5 bit precision (i.e. three 32×32 pixel arrays, one for each color R, G and B, each pixel being 5 bit precision). The synapses CB1 going from input layer S0 to layer C1 apply different sets of weights in some instances and shared weights in other instances and scan the input image with 3×3 pixel overlapping filters (kernel), shifting the filter by 1 pixel (or more than 1 pixel as dictated by the model). Specifically, values for 9 pixels in a 3×3 portion of the image (i.e., referred to as a filter or kernel) are provided to the synapses CB1, where these 9 input values are multiplied by the appropriate weights and, after summing the outputs of that multiplication, a single output value is determined and provided by a first synapse of CB1 for generating a pixel of one of the feature maps of layer C1. The 3×3 filter is then shifted one pixel to the right within input layer S0 (i.e., adding the column of three pixels on the right, and dropping the column of three pixels on the left), whereby the 9 pixel values in this newly positioned filter are provided to the synapses CB1, where they are multiplied by the same weights and a second single output value is determined by the associated synapse. This process is continued until the 3×3 filter scans across the entire 32×32 pixel image of input layer S0, for all three colors and for all bits (precision values). The process is then repeated using different sets of weights to generate a different feature map of layer C1, until all the features maps of layer C1 have been calculated.

In layer C1, in the present example, there are 16 feature maps, with 30×30 pixels each. Each pixel is a new feature pixel extracted from multiplying the inputs and kernel, and therefore each feature map is a two dimensional array, and thus in this example layer C1 constitutes 16 layers of two dimensional arrays (keeping in mind that the layers and arrays referenced herein are logical relationships, not necessarily physical relationships—i.e., the arrays are not necessarily oriented in physical two dimensional arrays). Each of the 16 feature maps in layer C1 is generated by one of sixteen different sets of synapse weights applied to the filter scans. The C1 feature maps could all be directed to different aspects of the same image feature, such as boundary identification. For example, the first map (generated using a first weight set, shared for all scans used to generate this first map) could identify circular edges, the second map (generated using a second weight set different from the first weight set) could identify rectangular edges, or the aspect ratio of certain features, and so on.

An activation function P1 (pooling) is applied before going from layer C1 to layer S1, which pools values from consecutive, non-overlapping 2×2 regions in each feature map. The purpose of the pooling function P1 is to average out the nearby location (or a max function can also be used), to reduce the dependence of the edge location for example and to reduce the data size before going to the next operation. At layer S1, there are 16 15×15 feature maps (i.e., sixteen different arrays of 15×15 pixels each). The synapses CB2 going from layer S1 to layer C2 scan maps in layer S1 with 4×4 filters, with a filter shift of 1 pixel. At layer C2, there are 22 12×12 feature maps. An activation function P2 (pooling) is applied before going from layer C2 to layer S2, which pools values from consecutive non-overlapping 2×2 regions in each feature map. At layer S2, there are 22 6×6 feature maps. An activation function (pooling) is applied at the synapses CB3 going from layer S2 to layer C3, where every neuron in layer C3 connects to every map in layer S2 via a respective synapse of CB3. At layer C3, there are 64 neurons. The synapses CB4 going from layer C3 to the output layer S3 fully connects C3 to S3, i.e. every neuron in layer C3 is connected to every neuron in layer S3. The output at S3 includes 10 neurons, where the highest output neuron determines the class. This output could, for example, be indicative of an identification or classification of the contents of the original image.

Each layer of synapses is implemented using an array, or a portion of an array, of non-volatile memory cells.

FIG. 7 is a block diagram of an array that can be used for that purpose. Vector-by-matrix multiplication (VMM) array 32 includes non-volatile memory cells and is utilized as the synapses (such as CB1, CB2, CB3, and CB4 in FIG. 6) between one layer and the next layer. Specifically, VMM array 32 includes an array of non-volatile memory cells 33, erase gate and word line gate decoder 34, control gate decoder 35, bit line decoder 36 and source line decoder 37, which decode the respective inputs for the non-volatile memory cell array 33. Input to VMM array 32 can be from the erase gate and wordline gate decoder 34 or from the control gate decoder 35. Source line decoder 37 in this example also decodes the output of the non-volatile memory cell array 33. Alternatively, bit line decoder 36 can decode the output of the non-volatile memory cell array 33.

Non-volatile memory cell array 33 serves two purposes. First, it stores the weights that will be used by the VMM array 32. Second, the non-volatile memory cell array 33 effectively multiplies the inputs by the weights stored in the non-volatile memory cell array 33 and adds them up per output line (source line or bit line) to produce the output, which will be the input to the next layer or input to the final layer. By performing the multiplication and addition function, the non-volatile memory cell array 33 negates the need for separate multiplication and addition logic circuits and is also power efficient due to its in-situ memory computation.

The output of non-volatile memory cell array 33 is supplied to a differential summer (such as a summing op-amp or a summing current mirror) 38, which sums up the outputs of the non-volatile memory cell array 33 to create a single value for that convolution. The differential summer 38 is arranged to perform summation of positive weight and negative weight.

The summed-up output values of differential summer 38 are then supplied to an activation function block 39, which rectifies the output. The activation function block 39 may provide sigmoid, tanh, or ReLU functions. The rectified output values of activation function block 39 become an element of a feature map as the next layer (e.g. C1 in FIG. 6), and are then applied to the next synapse to produce the next feature map layer or final layer. Therefore, in this example, non-volatile memory cell array 33 constitutes a plurality of synapses (which receive their inputs from the prior layer of neurons or from an input layer such as an image database), and summing op-amp 38 and activation function block 39 constitute a plurality of neurons.

The input to VMM array 32 in FIG. 7 (WLx, EGx, CGx, and optionally BLx and SLx) can be analog level, binary level, or digital bits (in which case a DAC is provided to convert digital bits to appropriate input analog level) and the output can be analog level, binary level, or digital bits (in which case an output ADC is provided to convert output analog level into digital bits).

FIG. 8 is a block diagram depicting the usage of numerous layers of VMM arrays 32, here labeled as VMM arrays 32a, 32b, 32c, 32d, and 32e. As shown in FIG. 8, the input, denoted Inputx, is converted from digital to analog by a digital-to-analog converter 31 and provided to input VMM array 32a. The converted analog inputs could be voltage or current. The input D/A conversion for the first layer could be done by using a function or a LUT (look up table) that maps the inputs Inputx to appropriate analog levels for the matrix multiplier of input VMM array 32a. The input conversion could also be done by an analog to analog (A/A) converter to convert an external analog input to a mapped analog input to the input VMM array 32a.

The output generated by input VMM array 32a is provided as an input to the next VMM array (hidden level 1) 32b, which in turn generates an output that is provided as an input to the next VMM array (hidden level 2) 32c, and so on. The various layers of VMM array 32 function as different layers of synapses and neurons of a convolutional neural network (CNN). Each VMM array 32a, 32b, 32c, 32d, and 32e can be a stand-alone, physical non-volatile memory array, or multiple VMM arrays could utilize different portions of the same physical non-volatile memory array, or multiple VMM arrays could utilize overlapping portions of the same physical non-volatile memory array. The example shown in FIG. 8 contains five layers (32a, 32b, 32c, 32d, 32e): one input layer (32a), two hidden layers (32b, 32c), and two fully connected layers (32d, 32e). One of ordinary skill in the art will appreciate that this is merely an example and that a system instead could comprise more than two hidden layers and more than two fully connected layers.

Vector-by-Matrix Multiplication (VMM) Arrays

FIG. 9 depicts neuron VMM array 900, which is particularly suited for memory cells 310 as shown in FIG. 3 and is utilized as the synapses and parts of neurons between an input layer and the next layer. VMM array 900 comprises memory array 901 of non-volatile memory cells and reference array 902 (at the top of the array) of non-volatile reference memory cells. Alternatively, another reference array can be placed at the bottom.

In VMM array 900, control gate lines, such as control gate line 903, run in a vertical direction (hence reference array 902 in the row direction is orthogonal to control gate line 903), and erase gate lines, such as erase gate line 904, run in a horizontal direction. Here, the inputs to VMM array 900 are provided on the control gate lines (CG0, CG1, CG2, CG3), and the output of VMM array 900 emerges on the source lines (SL0, SL1). In one example, only even rows are used, and in another example, only odd rows are used. The current placed on each source line (SL0, SL1, respectively) performs a summing function of all the currents from the memory cells connected to that particular source line.

As described herein for neural networks, the non-volatile memory cells of VMM array 900, i.e., the memory cells 310 of VMM array 900, operationally are configured to operate in a sub-threshold region.

The non-volatile reference memory cells and the non-volatile memory cells described herein are biased in weak inversion (sub threshold region):

$$Ids = Io * e^{(Vg-Vth)/nVt} = w * Io * e^{(Vg)/nVt},$$

where $w = e^{(-Vth)/nVt}$ where Ids is the drain to source current; Vg is gate voltage on the memory cell; Vth is threshold voltage of the memory cell; Vt is thermal voltage=k*T/q with k being the Boltzmann constant, T the temperature in Kelvin, and q the electronic charge; n is a slope factor=1+(Cdep/Cox) with Cdep=capacitance of the depletion layer, and Cox capacitance of the gate oxide layer; Io is the memory cell current at gate voltage equal to threshold voltage, Io is proportional to $(Wt/L)*u*Cox*(n-1)*Vt^2$ where u is carrier mobility and Wt and L are width and length, respectively, of the memory cell.

For an I-to-V log converter using a memory cell (such as a reference memory cell or a peripheral memory cell) or a transistor to convert input current into an input voltage:

$$Vg = n*Vt*\log[Ids/wp*Io]$$

where, wp is w of a reference or peripheral memory cell.

For a memory array used as a vector matrix multiplier VMM array with the current input, the output current is:

$$Iout = wa*Io*e^{(Vg)/nVt}, \text{ namely}$$

$$Iout = (wa/wp)*Iin = W*Iin$$

$$W = e^{(Vthp-Vtha)/nVt}$$

Here, wa=w of each memory cell in the memory array. Vthp is effective threshold voltage of the peripheral memory cell and Vtha is effective threshold voltage of the main (data) memory cell. Note that the threshold voltage of a transistor is a function of substrate body bias voltage and the substrate body bias voltage, denoted Vsb, can be modulated to compensate for various conditions, on such temperature. The threshold voltage Vth can be expressed as:

$$Vth = Vth0 + gamma(SQRT|Vsb - 2*\varphi F| - SQRT|2*\varphi F|)$$

where Vth0 is threshold voltage with zero substrate bias, φF is a surface potential, and gamma is a body effect parameter.

A wordline or control gate can be used as the input for the memory cell for the input voltage.

Alternatively, the flash memory cells of VMM arrays described herein can be configured to operate in the linear region:

$$Ids = beta*(Vgs - Vth)*Vds; beta = u*Cox*Wt/L$$

$$W = \alpha(Vgs - Vth)$$

meaning weight W in the linear region is proportional to (Vgs-Vth)

A wordline or control gate or bitline or sourceline can be used as the input for the memory cell operated in the linear region. The bitline or sourceline can be used as the output for the memory cell.

For an I-to-V linear converter, a memory cell (such as a reference memory cell or a peripheral memory cell) or a transistor operating in the linear region can be used to linearly convert an input/output current into an input/output voltage.

Alternatively, the memory cells of VMM arrays described herein can be configured to operate in the saturation region:

$$Ids = \frac{1}{2}*beta*(Vgs - Vth)^2; beta = u*Cox*Wt/L$$

$W\alpha(Vgs-Vth)^2$, meaning weight $W$ is proportional to $(Vgs-Vth)^2$

A wordline, control gate, or erase gate can be used as the input for the memory cell operated in the saturation region. The bitline or sourceline can be used as the output for the output neuron.

Alternatively, the memory cells of VMM arrays described herein can be used in all regions or a combination thereof (sub threshold, linear, or saturation) for each layer or multi layers of a neural network.

Other examples for VMM array 32 of FIG. 7 are described in U.S. Pat. No. 10,748,630, which is incorporated by reference herein. As described in that application. a sourceline or a bitline can be used as the neuron output (current summation output).

FIG. 10 depicts neuron VMM array 1000, which is particularly suited for memory cells 210 as shown in FIG. 2 and is utilized as the synapses between an input layer and the next layer. VMM array 1000 comprises a memory array 1003 of non-volatile memory cells, reference array 1001 of first non-volatile reference memory cells, and reference array 1002 of second non-volatile reference memory cells.

Reference arrays 1001 and 1002, arranged in the column direction of the array, serve to convert current inputs flowing into terminals BLR0, BLR1, BLR2, and BLR3 into voltage inputs WL0, WL1, WL2, and WL3. In effect, the first and second non-volatile reference memory cells are diode-connected through multiplexors 1014 (partially depicted) with current inputs flowing into them. The reference cells are tuned (e.g., programmed) to target reference levels. The target reference levels are provided by a reference mini-array matrix (not shown).

Memory array 1003 serves two purposes. First, it stores the weights that will be used by the VMM array 1000 on respective memory cells thereof. Second, memory array 1003 effectively multiplies the inputs (i.e. current inputs provided in terminals BLR0, BLR1, BLR2, and BLR3, which reference arrays 1001 and 1002 convert into the input voltages to supply to wordlines WL0, WL1, WL2, and WL3) by the weights stored in the memory array 1003 and then adds all the results (memory cell currents) to produce the output on the respective bit lines (BL0-BLN), which will be the input to the next layer or input to the final layer. By performing the multiplication and addition function, memory array 1003 negates the need for separate multiplication and addition logic circuits and is also power efficient. Here, the voltage inputs are provided on the word lines WL0, WL1, WL2, and WL3, and the output emerges on the respective bit lines BL0-BLN during a read (inference) operation. The current placed on each of the bit lines BL0-BLN performs a summing function of the currents from all non-volatile memory cells connected to that particular bitline.

Table No. 5 depicts operating voltages and currents for VMM array 1000. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE No. 5

Operation of VMM Array 1000 of FIG. 10:

|  | WL | WL-unsel | BL | BL-unsel | SL | SL-unsel |
|---|---|---|---|---|---|---|
| Read | 1-3.5 V | −0.5 V/0 V | 0.6-2 V (Ineuron) | 0.6 V-2 V/0 V | 0 V | 0 V |
| Erase | ~5-13 V | 0 V | 0 V | 0 V | 0 V | 0 V |
| Program | 1-2 V | −0.5 V/0 V | 0.1-3 uA | Vinh ~2.5 V | 4-10 V | 0-1 V/FLT |

FIG. 11 depicts neuron VMM array 1100, which is particularly suited for memory cells 210 as shown in FIG. 2 and is utilized as the synapses and parts of neurons between an input layer and the next layer. VMM array 1100 comprises a memory array 1103 of non-volatile memory cells, reference array 1101 of first non-volatile reference memory cells, and reference array 1102 of second non-volatile reference memory cells. Reference arrays 1101 and 1102 run in row direction of the VMM array 1100. VMM array is similar to VMM 1000 except that in VMM array 1100, the word lines run in the vertical direction. Here, the inputs are provided on the word lines (WLA0, WLB0, WLA1, WLB2, WLA2, WLB2, WLA3, WLB3), and the output emerges on the source line (SL0, SL1) during a read operation. The current placed on each source line performs a summing function of all the currents from the memory cells connected to that particular source line.

Table No. 6 depicts operating voltages and currents for VMM array 1100. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE No 6

Operation of VMM Array 1100 of FIG. 11

|  | WL | WL-unsel | BL | BL-unsel | SL | SL-unsel |
|---|---|---|---|---|---|---|
| Read | 1-3.5 V | −0.5 V/0 V | 0.6-2 V | 0.6 V-2 V/0 V | ~0.3-1 V (Ineuron) | 0 V |
| Erase | ~5-13 V | 0 V | 0 V | 0 V | 0 V | SL-inhibit (~4-8 V) |
| Program | 1-2 V | −0.5 V/0 V | 0.1-3 uA | Vinh ~2.5 V | 4-10 V | 0-1 V/FLT |

FIG. 12 depicts neuron VMM array 1200, which is particularly suited for memory cells 310 as shown in FIG. 3 and is utilized as the synapses and parts of neurons between an input layer and the next layer. VMM array 1200 comprises a memory array 1203 of non-volatile memory cells, reference array 1201 of first non-volatile reference memory cells, and reference array 1202 of second non-volatile reference memory cells. Reference arrays 1201 and 1202 serve to convert current inputs flowing into terminals BLR0, BLR1, BLR2, and BLR3 into voltage inputs CG0, CG1, CG2, and CG3. In effect, the first and second non-volatile reference memory cells are diode-connected through multiplexors 1212 (partially shown) with current inputs flowing into them through BLR0, BLR1, BLR2, and BLR3. Multiplexors 1212 each include a respective multiplexor 1205 and a cascoding transistor 1204 to ensure a constant voltage on the bitline (such as BLR0) of each of the first and second non-volatile reference memory cells during a read operation. The reference cells are tuned to target reference levels.

Memory array 1203 serves two purposes. First, it stores the weights that will be used by the VMM array 1200. Second, memory array 1203 effectively multiplies the inputs (current inputs provided to terminals BLR0, BLR1, BLR2, and BLR3, for which reference arrays 1201 and 1202 convert these current inputs into the input voltages to supply to the control gates (CG0, CG1, CG2, and CG3) by the weights stored in the memory array and then add all the results (cell currents) to produce the output, which appears on BL0-BLN, and will be the input to the next layer or input to the final layer. By performing the multiplication and addition function, the memory array negates the need for separate multiplication and addition logic circuits and is also power efficient. Here, the inputs are provided on the control gate lines (CG0, CG1, CG2, and CG3), and the output emerges on the bit lines (BL0-BLN) during a read operation. The current placed on each bitline performs a summing function of all the currents from the memory cells connected to that particular bitline.

VMM array 1200 implements uni-directional tuning for non-volatile memory cells in memory array 1203. That is, each non-volatile memory cell is erased and then partially programmed until the desired charge on the floating gate is reached. If too much charge is placed on the floating gate (such that the wrong value is stored in the cell), the cell is erased and the sequence of partial programming operations starts over. As shown, two rows sharing the same erase gate (such as EG0 or EG1) are erased together (which is also referred to as a page erase), and thereafter, each cell is partially programmed until the desired charge on the floating gate is reached.

Table No. 7 depicts operating voltages and currents for VMM array 1200. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

and is utilized as the synapses and parts of neurons between an input layer and the next layer. VMM array 1300 comprises a memory array 1303 of non-volatile memory cells, reference array 1301 or first non-volatile reference memory cells, and reference array 1302 of second non-volatile reference memory cells. EG lines EGR0, EG0, EG1 and EGR1 are run vertically while CG lines CG0, CG1, CG2 and CG3 and SL lines WL0, WL1, WL2 and WL3 are run horizontally. VMM array 1300 is similar to VMM array 1400, except that VMM array 1300 implements bi-directional tuning, where each individual cell can be completely erased, partially programmed, and partially erased as needed to reach the desired amount of charge on the floating gate due to the use of separate EG lines. As shown, reference arrays 1301 and 1302 convert input current in the terminal BLR0, BLR1, BLR2, and BLR3 into control gate voltages CG0, CG1, CG2, and CG3 (through the action of diode-connected reference cells through multiplexors 1314) to be applied to the memory cells in the row direction. The current output (neuron) is in the bit lines BL0-BLN, where each bit line sums all currents from the non-volatile memory cells connected to that particular bitline.

Table No. 8 depicts operating voltages and currents for VMM array 1300. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE No 7

Operation of VMM Array 1200 of FIG. 12

| | WL | WL-unsel | BL | BL-unsel | CG | CG-unsel same sector | CG-unsel | EG | EG-unsel | SL | SL-unsel |
|---|---|---|---|---|---|---|---|---|---|---|---|
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 0-2.6 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 13 depicts neuron VMM array 1300, which is particularly suited for memory cells 310 as shown in FIG. 3, TABLE No 8

Operation of VMM Array 1300 of FIG. 13

| | WL | WL-unsel | BL | BL-unsel | CG | CG-unsel same sector | CG-unsel | EG | EG-unsel | SL | SL-unsel |
|---|---|---|---|---|---|---|---|---|---|---|---|
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 4-9 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 22 depicts neuron VMM array 2200, which is particularly suited for memory cells 210 as shown in FIG. 2 and is utilized as the synapses and parts of neurons between an input layer and the next layer. In VMM array 2200, the inputs $INPUT_0, \ldots, INPUT_N$ are received on bit lines $BL_0, \ldots BL_N$, respectively, and the outputs $OUTPUT_1$, $OUTPUT_2$, $OUTPUT_3$, and $OUTPUT_4$ are generated on source lines $SL_0, SL_1, SL_2,$ and $SL_3$, respectively.

FIG. 23 depicts neuron VMM array 2300, which is particularly suited for memory cells 210 as shown in FIG. 2 and is utilized as the synapses and parts of neurons between an input layer and the next layer. In this example, the inputs $INPUT_0, INPUT_1, INPUT_2,$ and $INPUT_3$ are received on source lines $SL_0, SL_1, SL_2,$ and $SL_3$, respectively, and the outputs $OUTPUT_0, \ldots OUTPUT_N$ are generated on bit lines $BL_0, \ldots, BL_N$.

FIG. 24 depicts neuron VMM array 2400, which is particularly suited for memory cells 210 as shown in FIG. 2, and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bit lines $BL_0, \ldots, BL_N$.

FIG. 25 depicts neuron VMM array 2500, which is particularly suited for memory cells 310 as shown in FIG. 3, and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bit lines $BL_0, \ldots, BL_N$.

FIG. 26 depicts neuron VMM array 2600, which is particularly suited for memory cells 410 as shown in FIG. 4, and is utilized as the synapses and parts of neurons between an input layer and the next layer. In this example, the inputs $INPUT_0, \ldots, INPUT_n$ are received on vertical control gate lines $CG_0, \ldots, CG_N$, respectively, and the outputs $OUTPUT_1$ and $OUTPUT_2$ are generated on source lines $SL_0$ and $SL_1$.

FIG. 27 depicts neuron VMM array 2700, which is particularly suited for memory cells 410 as shown in FIG. 4, and is utilized as the synapses and parts of neurons between an input layer and the next layer. In this example, the inputs $INPUT_0, \ldots, INPUT_N$ are received on the gates of bit line control gates 2701-1, 2701-2, ..., 2701-(N−1), and 2701-N, respectively, which are coupled to bit lines $BL_0, \ldots, BL_N$, respectively. Example outputs $OUTPUT_1$ and $OUTPUT_2$ are generated on source lines $SL_0$ and $SL_1$.

FIG. 28 depicts neuron VMM array 2800, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on word lines $WL_0, \ldots, WL_M$, and the outputs $OUTPUT_0, \ldots, OUTPUT_N$ are generated on bit lines $BL_0, \ldots, BL_N$, respectively.

FIG. 29 depicts neuron VMM array 2900, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical source lines $SL_0, \ldots, SL_N$, respectively, where each source line $SL_i$ is coupled to the source lines of all memory cells in column i.

FIG. 30 depicts neuron VMM array 3000, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical bit lines $BL_0, \ldots, BL_N$, respectively, where each bit line $BL_i$ is coupled to the bit lines of all memory cells in column i.

Long Short-Term Memory

The prior art includes a concept referred to as long short-term memory (LSTM). LSTM units often are used in neural networks. LSTM allows a neural network to remember information over predetermined arbitrary time intervals and to use that information in subsequent operations. A conventional LSTM unit comprises a cell, an input gate, an output gate, and a forget gate. The three gates regulate the flow of information into and out of the cell and the time interval that the information is remembered in the LSTM. VMMs are particularly useful in LSTM units.

FIG. 14 depicts an example LSTM 1400. LSTM 1400 in this example comprises cells 1401, 1402, 1403, and 1404. Cell 1401 receives input vector $x_0$ and generates output vector $h_0$ and cell state vector $c_0$. Cell 1402 receives input vector $x_1$, the output vector (hidden state) $h_0$ from cell 1401, and cell state $c_0$ from cell 1401 and generates output vector $h_1$ and cell state vector $c_1$. Cell 1403 receives input vector $x_2$, the output vector (hidden state) $h_1$ from cell 1402, and cell state $c_1$ from cell 1402 and generates output vector $h_2$ and cell state vector $c_2$. Cell 1404 receives input vector $x_3$, the output vector (hidden state) $h_2$ from cell 1403, and cell state $c_2$ from cell 1403 and generates output vector $h_3$. Additional cells can be used, and an LSTM with four cells is merely an example.

FIG. 15 depicts an example implementation of an LSTM cell 1500, which can be used for cells 1401, 1402, 1403, and 1404 in FIG. 14. LSTM cell 1500 receives input vector x(t), cell state vector c(t−1) from a preceding cell, and output vector h(t−1) from a preceding cell, and generates cell state vector c(t) and output vector h(t).

LSTM cell 1500 comprises sigmoid function devices 1501, 1502, and 1503, each of which applies a number between 0 and 1 to control how much of each component in the input vector is allowed through to the output vector. LSTM cell 1500 also comprises tanh devices 1504 and 1505 to apply a hyperbolic tangent function to an input vector, multiplier devices 1506, 1507, and 1508 to multiply two vectors together, and addition device 1509 to add two vectors together. Output vector h(t) can be provided to the next LSTM cell in the system, or it can be accessed for other purposes.

FIG. 16 depicts an LSTM cell 1600, which is an example of an implementation of LSTM cell 1500. For the reader's convenience, the same numbering from LSTM cell 1500 is used in LSTM cell 1600. Sigmoid function devices 1501, 1502, and 1503 and tanh device 1504 each comprise multiple VMM arrays 1601 and activation function blocks 1602. Thus, it can be seen that VMM arrays are particular useful in LSTM cells used in certain neural network systems. The multiplier devices 1506, 1507, and 1508 and the addition device 1509 are implemented in a digital manner or in an analog manner. The activation function blocks 1602 can be implemented in a digital manner or in an analog manner.

An alternative to LSTM cell 1600 (and another example of an implementation of LSTM cell 1500) is shown in FIG. 17. In FIG. 17, sigmoid function devices 1501, 1502, and 1503 and tanh device 1504 share the same physical hardware (VMM arrays 1701 and activation function block 1702) in a time-multiplexed fashion. LSTM cell 1700 also comprises multiplier device 1703 to multiply two vectors together, addition device 1708 to add two vectors together, tanh device 1505 (which comprises activation function block 1702), register 1707 to store the value i(t) when i(t) is output from sigmoid function block 1702, register 1704 to store the value f(t)*c(t−1) when that value is output from multiplier device 1703 through multiplexor 1710, register 1705 to store the value i(t)*u(t) when that value is output from multiplier device 1703 through multiplexor 1710, and register 1706 to store the value o(t)*c~(t) when that value is output from multiplier device 1703 through multiplexor 1710, and multiplexor 1709.

Whereas LSTM cell 1600 contains multiple sets of VMM arrays 1601 and respective activation function blocks 1602, LSTM cell 1700 contains only one set of VMM arrays 1701 and activation function block 1702, which are used to represent multiple layers in the example of LSTM cell 1700. LSTM cell 1700 will require less space than LSTM 1600, as LSTM cell 1700 will require ¼ as much space for VMMs and activation function blocks compared to LSTM cell 1600.

It can be further appreciated that LSTM units will typically comprise multiple VMM arrays, each of which requires functionality provided by certain circuit blocks outside of the VMM arrays, such as a summer and activation function block and high voltage generation blocks. Providing separate circuit blocks for each VMM array would require a significant amount of space within the semiconductor device and would be somewhat inefficient. The examples described below therefore reduce the circuitry required outside of the VMM arrays themselves.

Gated Recurrent Units

An analog VMM implementation can be utilized for a GRU (gated recurrent unit) system. GRUs are a gating mechanism in recurrent neural networks. GRUs are similar to LSTMs, except that GRU cells generally contain fewer components than an LSTM cell.

FIG. 18 depicts an example GRU 1800. GRU 1800 in this example comprises cells 1801, 1802, 1803, and 1804. Cell 1801 receives input vector $x_0$ and generates output vector $h_0$. Cell 1802 receives input vector $x_1$, the output vector $h_0$ from cell 1801 and generates output vector $h_1$. Cell 1803 receives input vector $x_2$ and the output vector (hidden state) $h_1$ from cell 1802 and generates output vector $h_2$. Cell 1804 receives input vector $x_3$ and the output vector (hidden state) $h_2$ from cell 1803 and generates output vector $h_3$. Additional cells can be used, and an GRU with four cells is merely an example.

FIG. 19 depicts an example implementation of a GRU cell 1900, which can be used for cells 1801, 1802, 1803, and 1804 of FIG. 18. GRU cell 1900 receives input vector x(t) and output vector h(t−1) from a preceding GRU cell and generates output, vector h(t). GRU cell 1900 comprises sigmoid function devices 1901 and 1902, each of which applies a number between 0 and 1 to components from output vector h(t−1) and input vector x(t). GRU cell 1900 also comprises a tanh device 1903 to apply a hyperbolic tangent function to an input vector, a plurality of multiplier devices 1904, 1905, and 1906 to multiply two vectors together, an addition device 1907 to add two vectors together, and a complementary device 1908 to subtract an input from 1 to generate an output.

FIG. 20 depicts a GRU cell 2000, which is an example of an implementation of GRU cell 1900. For the reader's convenience, the same numbering from GRU cell 1900 is used in GRU cell 2000. As can be seen in FIG. 20, sigmoid function devices 1901 and 1902, and tanh device 1903 each comprise multiple VMM arrays 2001 and activation function blocks 2002. Thus, it can be seen that VMM arrays are of particular use in GRU cells used in certain neural network systems. The multiplier devices 1904, 1905, 1906, the addition device 1907, and the complementary device 1908 are implemented in a digital manner or in an analog manner. The activation function blocks 2002 can be implemented in a digital manner or in an analog manner.

An alternative to GRU cell 2000 (and another example of an implementation of GRU cell 1900) is shown in FIG. 21. In FIG. 21, GRU cell 2100 utilizes VMM arrays 2101 and activation function block 2102, which when configured as a sigmoid function applies a number between 0 and 1 to control how much of each component in the input vector is allowed through to the output vector. In FIG. 21, sigmoid function devices 1901 and 1902 and tanh device 1903 share the same physical hardware (VMM arrays 2101 and activation function block 2102) in a time-multiplexed fashion. GRU cell 2100 also comprises multiplier device 2103 to multiply two vectors together, addition device 2105 to add two vectors together, complementary device 2109 to subtract an input from 1 to generate an output, multiplexor 2104, register 2106 to hold the value h(t−1)*r(t) when that value is output from multiplier device 2103 through multiplexor 2104, register 2107 to hold the value h(t−1)*z(t) when that value is output from multiplier device 2103 through multiplexor 2104, and register 2108 to hold the value h^(t)*(1−z(t)) when that value is output from multiplier device 2103 through multiplexor 2104.

Whereas GRU cell 2000 contains multiple sets of VMM arrays 2001 and activation function blocks 2002, GRU cell 2100 contains only one set of VMM arrays 2101 and activation function block 2102, which are used to represent multiple layers in the example of GRU cell 2100. GRU cell 2100 will require less space than GRU cell 2000, as GRU cell 2100 will require ⅓ as much space for VMMs and activation function blocks compared to GRU cell 2000.

It can be further appreciated that GRU systems will typically comprise multiple VMM arrays, each of which requires functionality provided by certain circuit blocks outside of the VMM arrays, such as a summer and activation function block and high voltage generation blocks. Providing separate circuit blocks for each VMM array would require a significant amount of space within the semiconductor device and would be somewhat inefficient. The examples described below therefore reduce the circuitry required outside of the VMM arrays themselves.

The input to the VMM arrays can be an analog level, a binary level, a pulse, a time modulated pulse, or digital bits (in this case a DAC is needed to convert digital bits to appropriate input analog level) and the output can be an analog level, a binary level, a timing pulse, pulses, or digital bits (in this case an output ADC is needed to convert output analog level into digital bits).

In general, for each memory cell in a VMM array, each weight W can be implemented by a single memory cell or by a differential cell or by two blend memory cells (average of 2 cells). In the differential cell case, two memory cells are needed to implement a weight W as a differential weight (W=W+−W−). In the two blend memory cells, two memory cells are needed to implement a weight W as an average of two cells.

FIG. 31 depicts VMM system 3100. In some examples, the weights, W, stored in a VMM array are stored as differential pairs, W+ (positive weight) and W− (negative weight), where W=(W+)−(W−). In VMM system 3100, half of the bit lines are designated as W+ lines, that is, bit lines connecting to memory cells that will store positive weights W+, and the other half of the bit lines are designated as W− lines, that is, bit lines connecting to memory cells implementing negative weights W−. The W− lines are interspersed among the W+ lines in an alternating fashion. The subtraction operation is performed by a summation circuit that receives current from a W+ line and a W− line, such as summation circuits 3101 and 3102. The output of a W+ line and the output of a W− line are combined together to give effectively W=W+−W− for each pair of (W+, W−) cells for all pairs of (W+, W−) lines. While the above has been described in relation to W− lines interspersed among the W+ lines in an alternating fashion, in other examples W+ lines and W− lines can be arbitrarily located anywhere in the array.

FIG. 32 depicts another example. In VMM system 3210, positive weights W+ are implemented in first array 3211 and negative weights W− are implemented in a second array 3212, second array 3212 separate from the first array, and the resulting weights are appropriately combined together by summation circuits 3213.

FIG. 33 depicts VMM system 3300. the weights, W, stored in a VMM array are stored as differential pairs, W+ (positive weight) and W− (negative weight), where W=(W+)−(W−). VMM system 3300 comprises array 3301 and array 3302. Half of the bit lines in each of array 3301 and 3302 are designated as W+ lines, that is, bit lines connecting to memory cells that will store positive weights W+, and the other half of the bit lines in each of array 3301 and 3302 are designated as W− lines, that is, bit lines connecting to memory cells implementing negative weights W−. The W− lines are interspersed among the W+ lines in an alternating fashion. The subtraction operation is performed by a summation circuit that receives current from a W+ line and a W− line, such as summation circuits 3303, 3304, 3305, and 3306. The output of a W+ line and the output of a W− line from each array 3301, 3302 are respectively combined together to give effectively W=W+−W− for each pair of (W+, W−) cells for all pairs of (W+, W−) lines. In addition, the W values from each array 3301 and 3302 can be further combined through summation circuits 3307 and 3308, such that each W value is the result of a W value from array 3301 minus a W value from array 3302, meaning that the end result from summation circuits 3307 and 3308 is a differential value of two differential values.

Each non-volatile memory cells used in the analog neural memory system is to be erased and programmed to hold a very specific and precise amount of charge, i.e., the number of electrons, in the floating gate. For example, each floating gate should hold one of N different values, where N is the number of different weights that can be indicated by each cell. Examples of N include 16, 32, 64, 128, and 256.

FIG. 34 depicts prior art VMM system 3400, which comprises two separate array blocks, analog array block 3405 and digital array block 3415. Analog array block 3405 includes analog array 3401, row decoder 3402, and high voltage decoder 3403. Analog array 3401 stores one of N different analog values, as described above. Digital array block 3415 includes digital array 3411, row decoder 3412, and high voltage decoder 3413. Digital array block 3415 can be used to store system data, configuration data, operating system data (OS), and other data for the operation of VMM system 3400. For example, digital array 3411 might store digital data such as user ID, trim bits, manufacturing info, security codes, OS code, and other information used by VMM system 3400. In another example, VMM system 3400 may include a separate digital non-volatile memory macro or external chip.

Because analog array 3401 stores analog values (multi-level values), an accurate current range (due to multi-levels at desired low power) is applied to the bit lines during a read operation compared to a read operation of digital array 3411 (where each cell stores either a "1" or a "0"). The difference in current levels used during read operations can cause undesired consequences, such as leakage from high current cells of the digital cells (which is needed for high speed read, which can affect the accuracy of read operations), bias conditions (which is different for analog levels vs. digital levels), and other consequences.

What is needed is an improved architecture for providing an analog array and a digital array in an artificial neural network system while reducing leakage and other undesired consequences.

SUMMARY OF THE INVENTION

Numerous examples are described for providing an artificial neural network system comprising an analog array and a digital array.

BRIEF DESCRIPTION OF THE DRAWINGS

FIG. 32 depicts another example of a VMM system.
FIG. 34 depicts an example of a VMM system comprising a digital array.
FIG. 43 depicts an example read operation of an analog array and a digital array.

DETAILED DESCRIPTION OF THE INVENTION

The artificial neural networks described herein utilize a combination of CMOS technology and non-volatile memory arrays.

VMM System Overview

Figure 1:
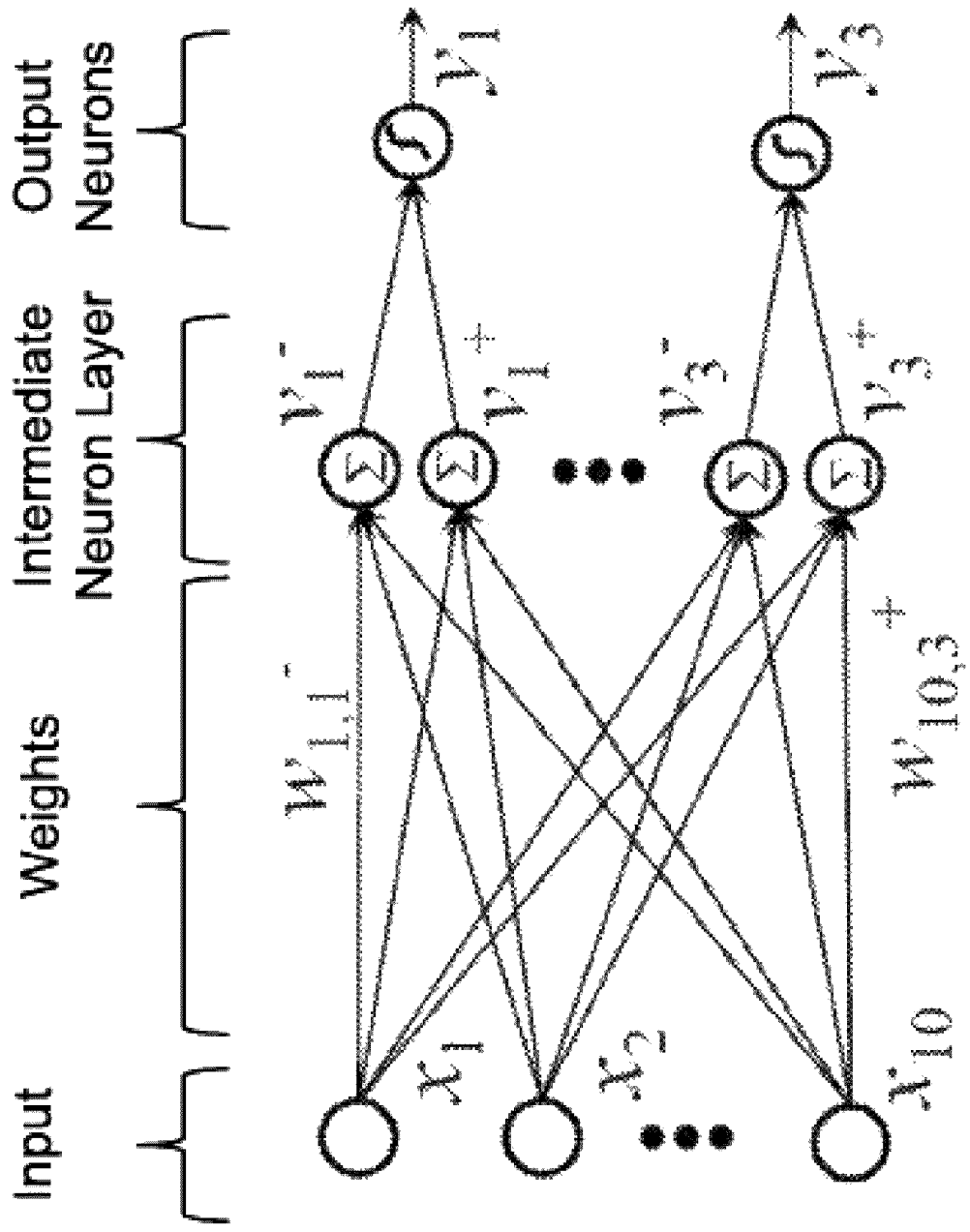
FIG. 1 is a diagram that illustrates an artificial neural network.
Figure 2:
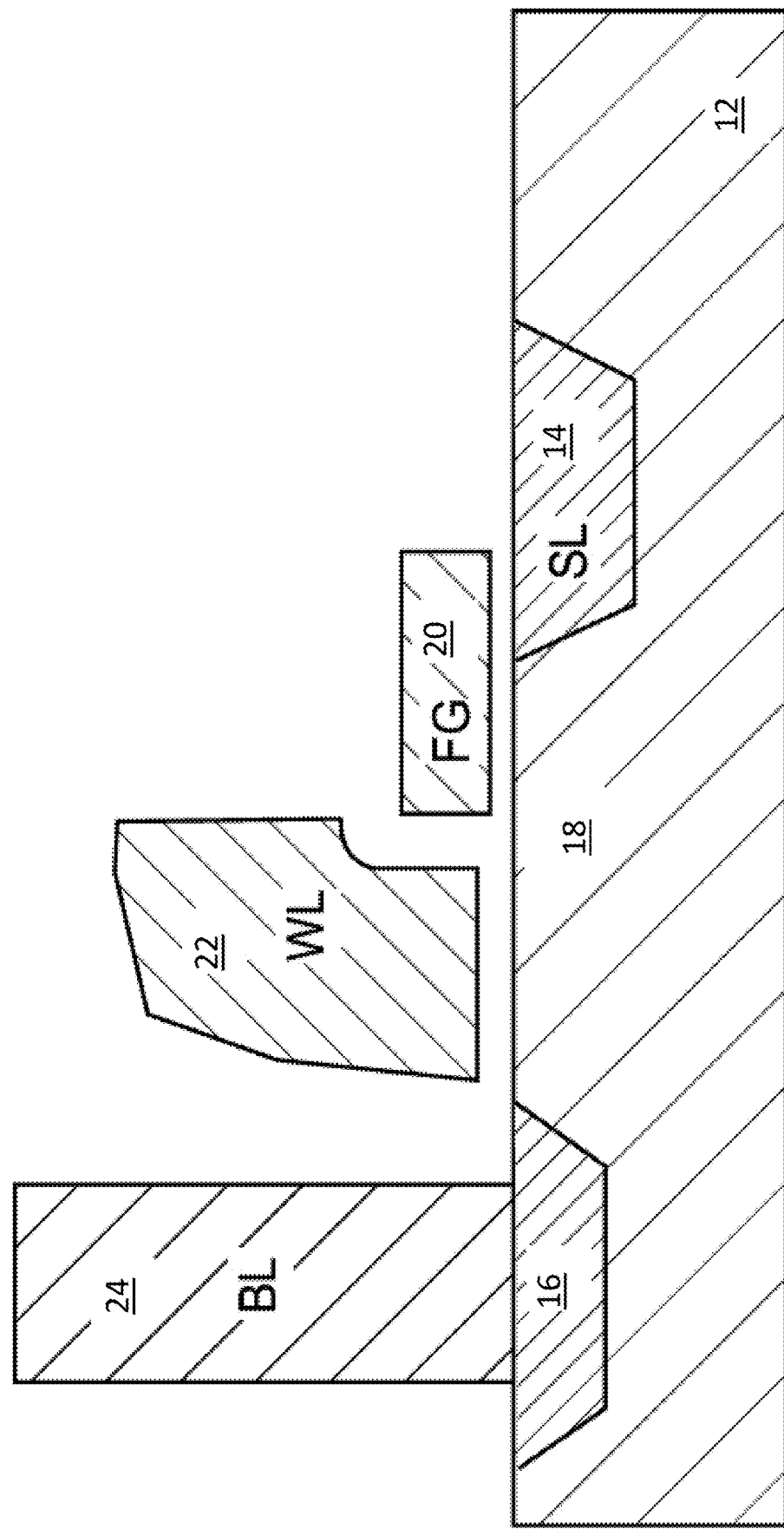
FIG. 2 depicts a prior art split gate flash memory cell.
Figure 3:
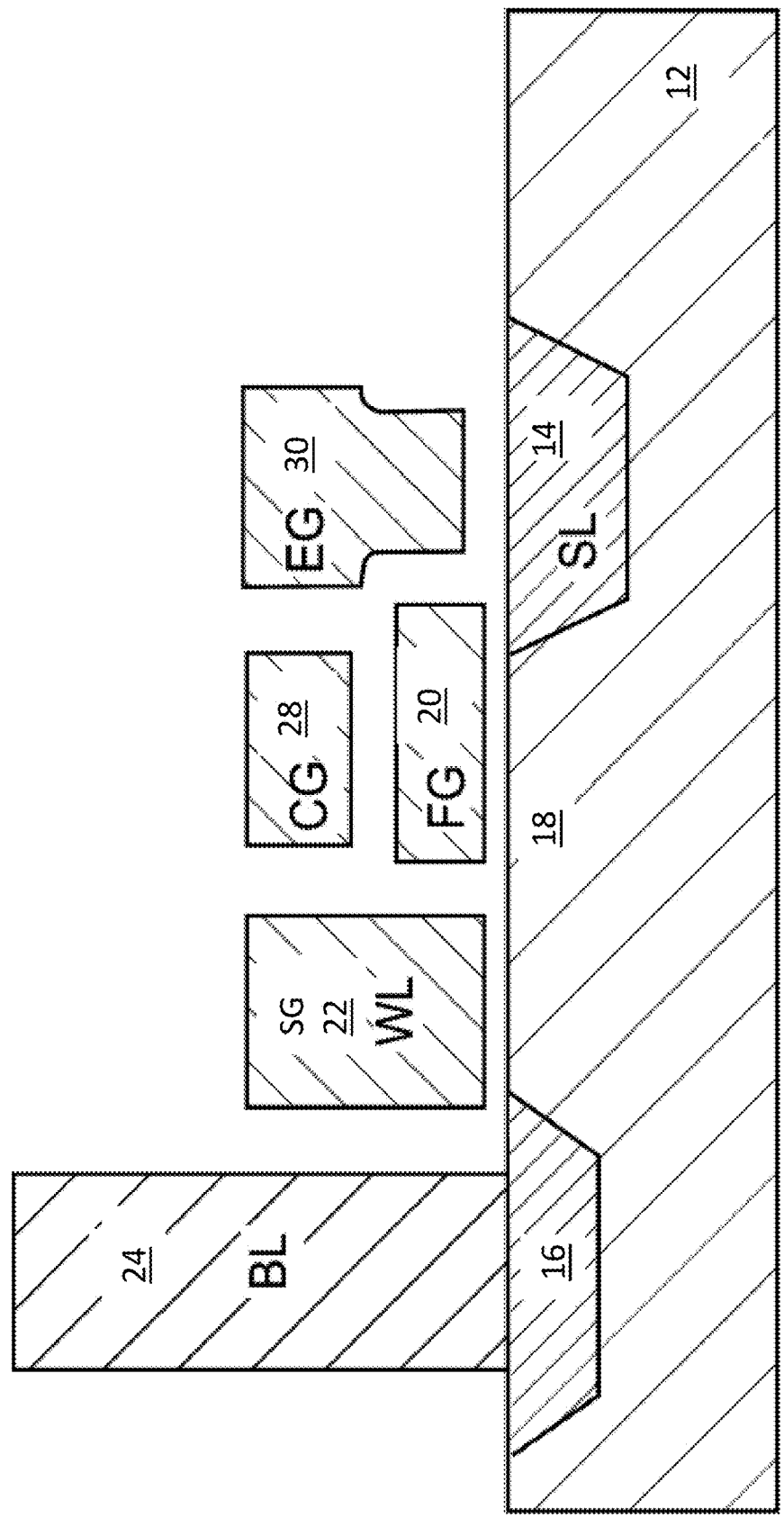
FIG. 3 depicts another prior art split gate flash memory cell.
Figure 4:
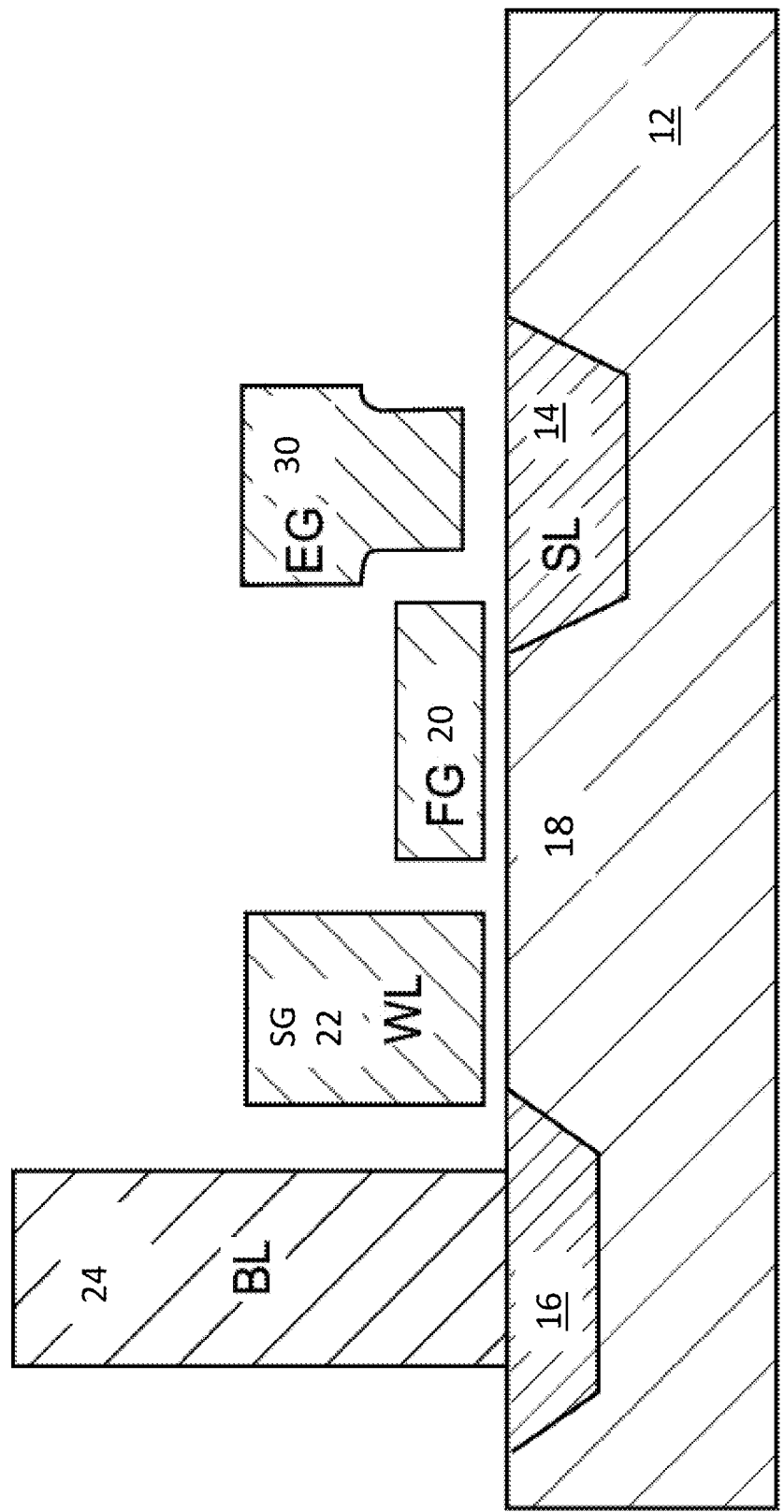
FIG. 4 depicts another prior art split gate flash memory cell.
Figure 5:
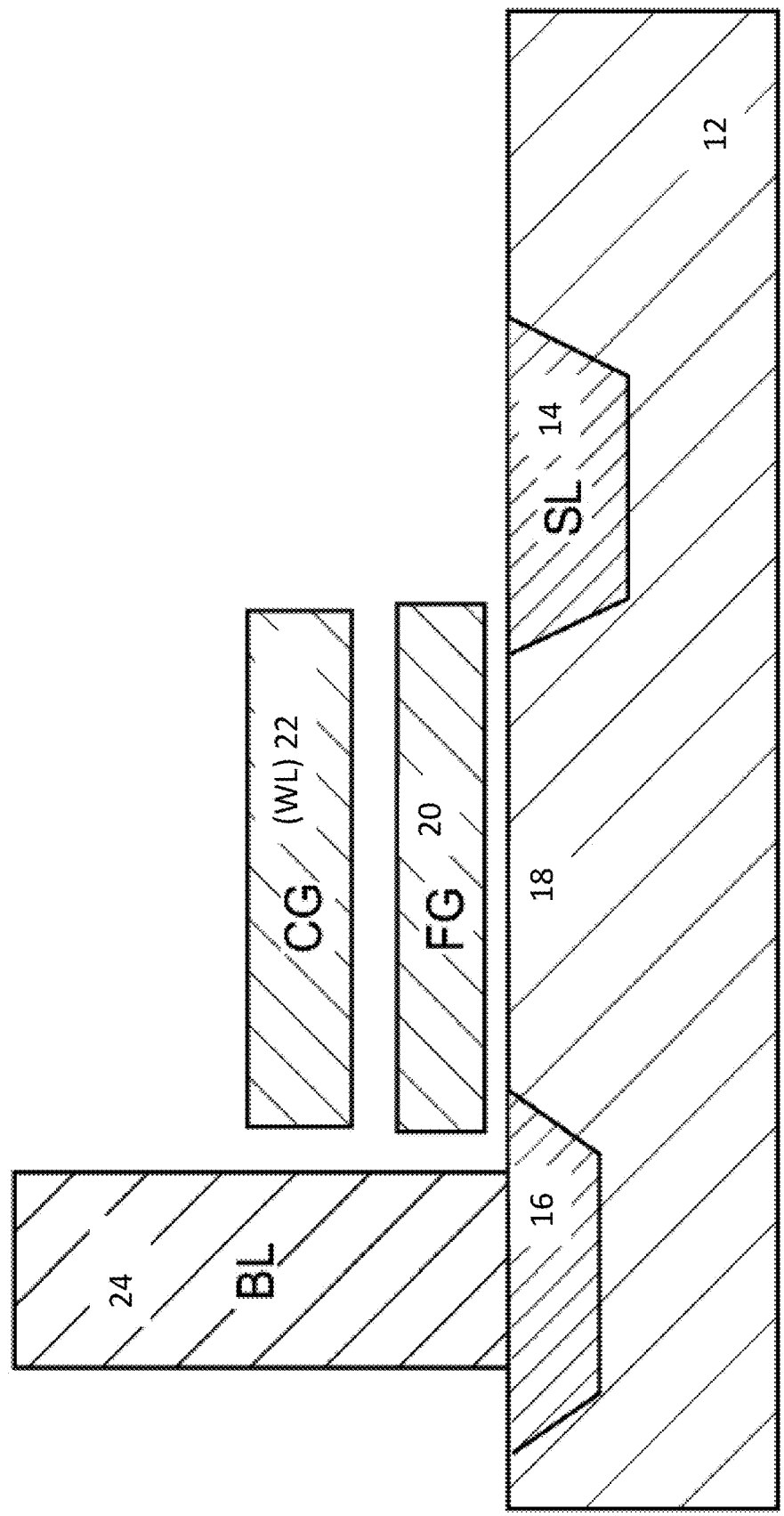
FIG. 5 depicts another prior art split gate flash memory cell.
Figure 6:
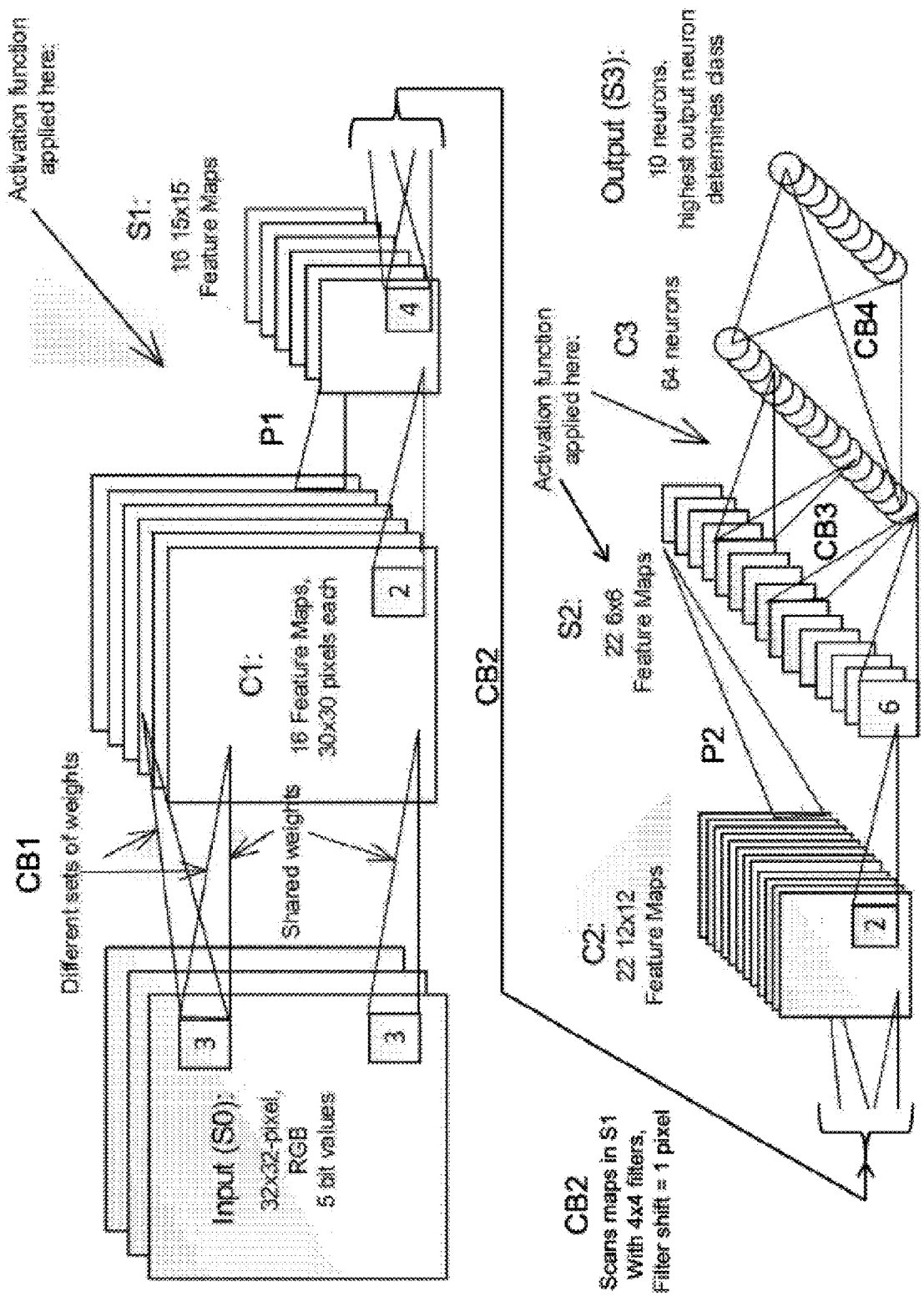
FIG. 6 is a diagram illustrating the different levels of an example artificial neural network utilizing one or more non-volatile memory arrays.
Figure 7:
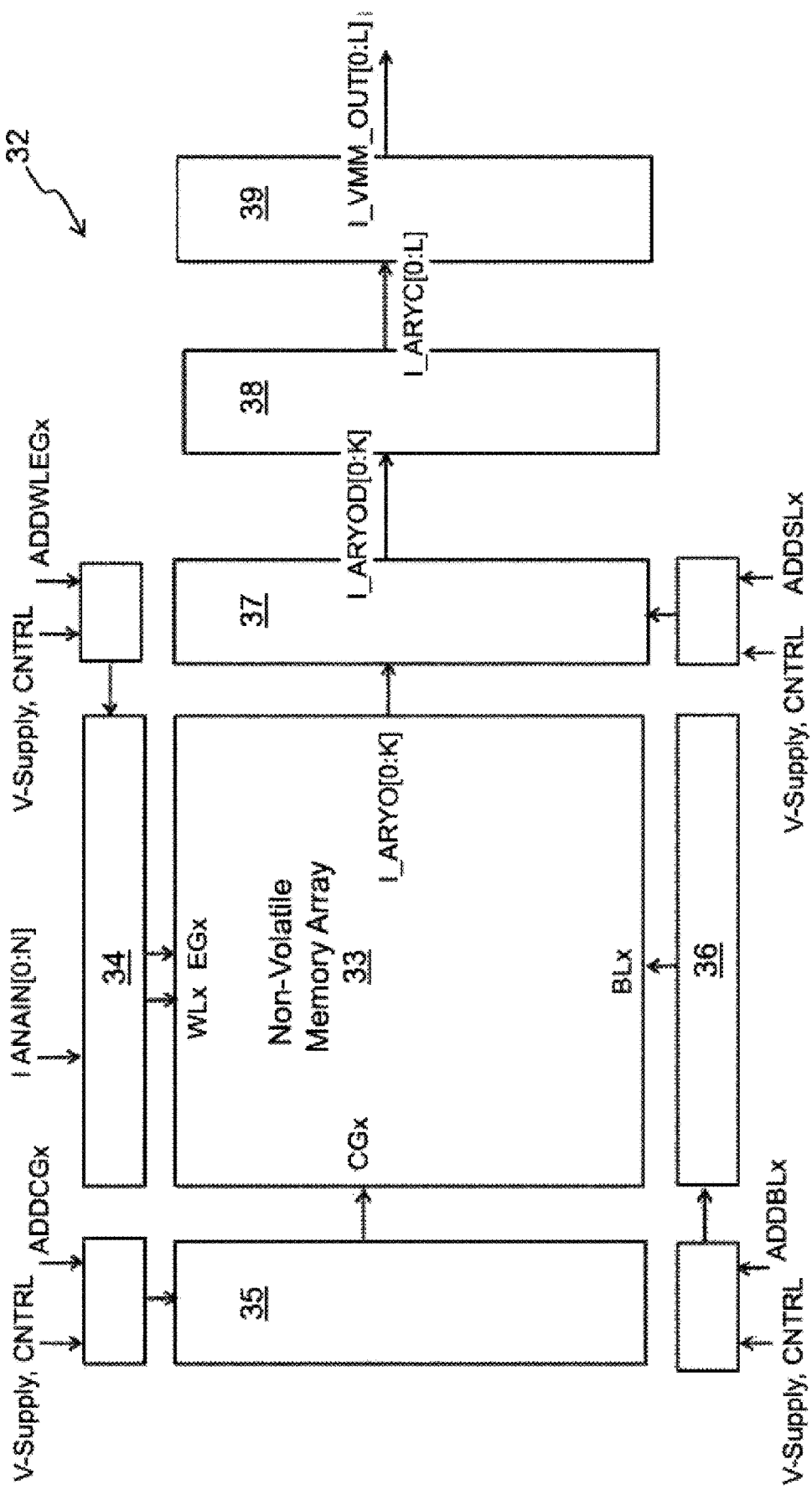
FIG. 7 is a block diagram illustrating a VMM system.
Figure 8:
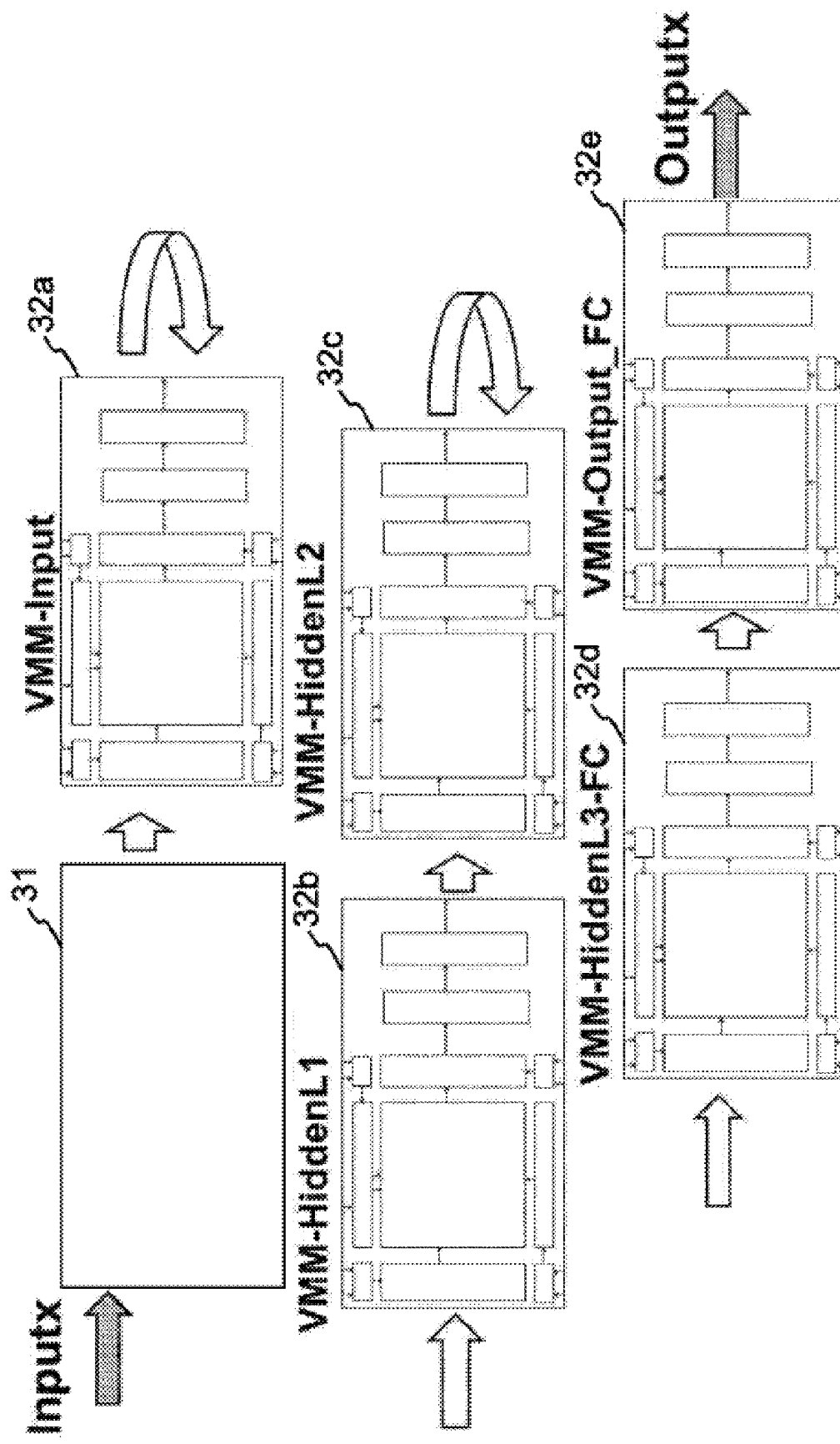
FIG. 8 is a block diagram illustrates an example artificial neural network utilizing one or more VMM systems.
Figure 9:
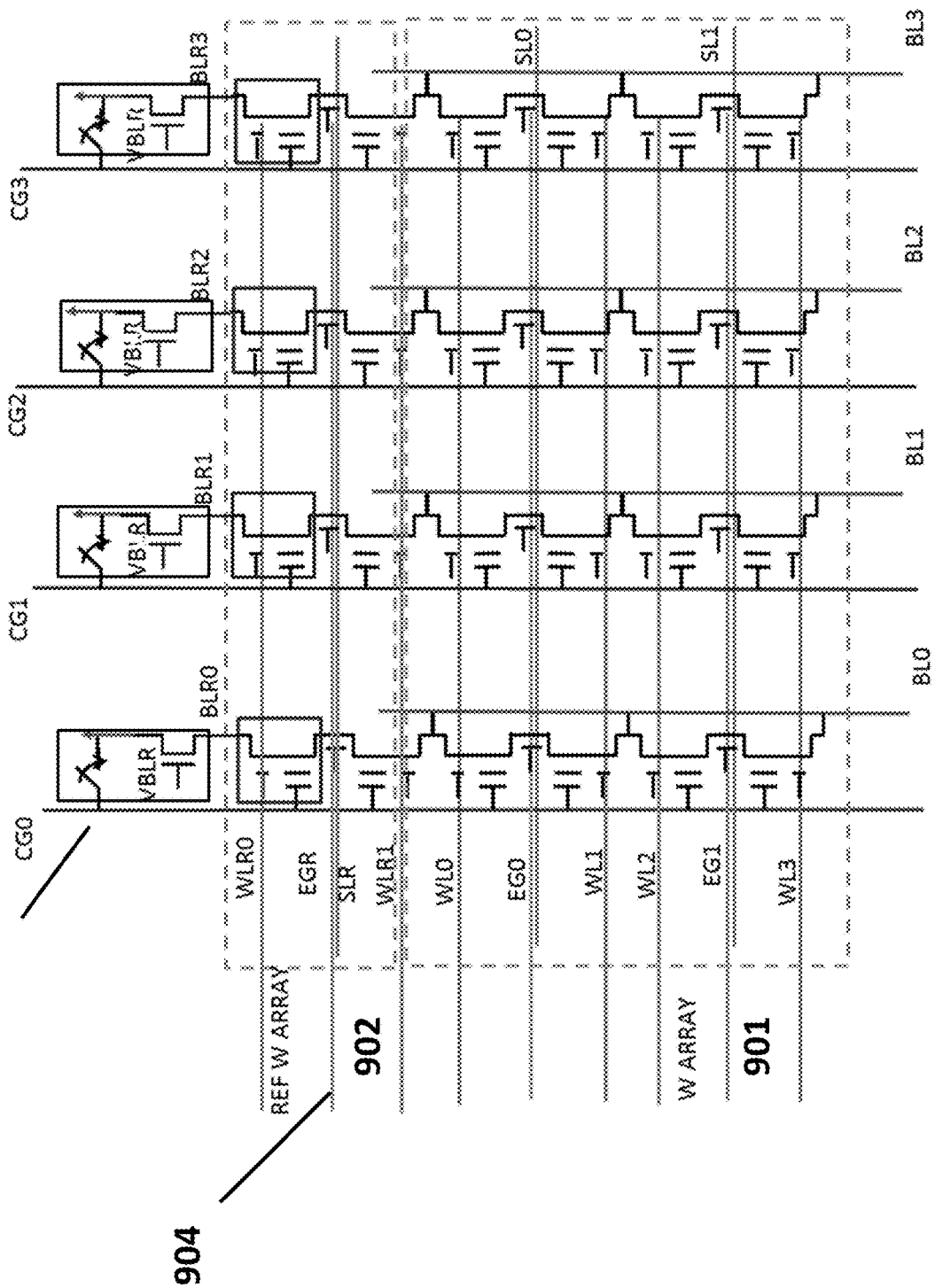
FIG. 9 depicts another example of a VMM system.
Figure 10:
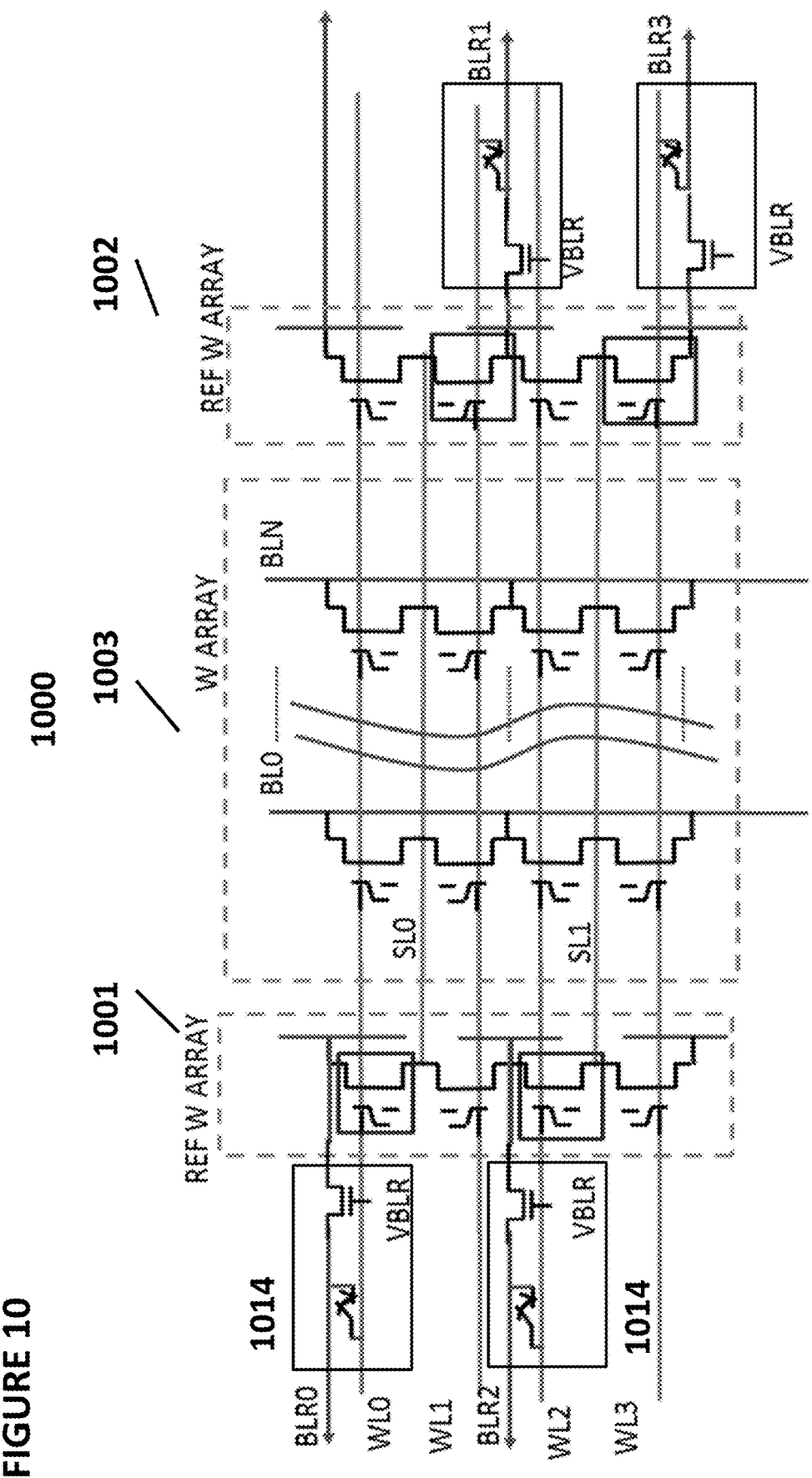
FIG. 10 depicts another example of a VMM system.
Figure 11:
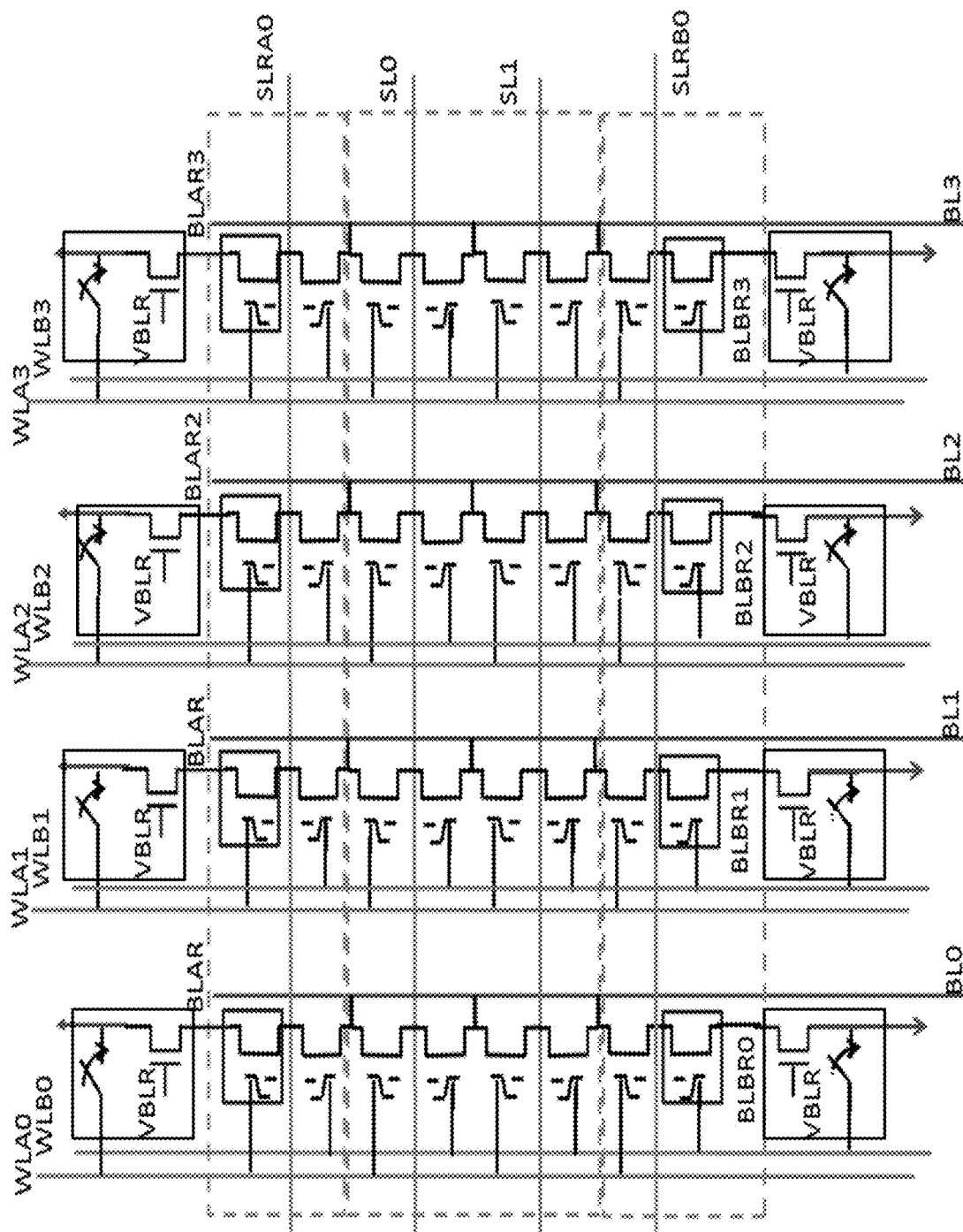
FIG. 11 depicts another example of a VMM system.
Figure 12:
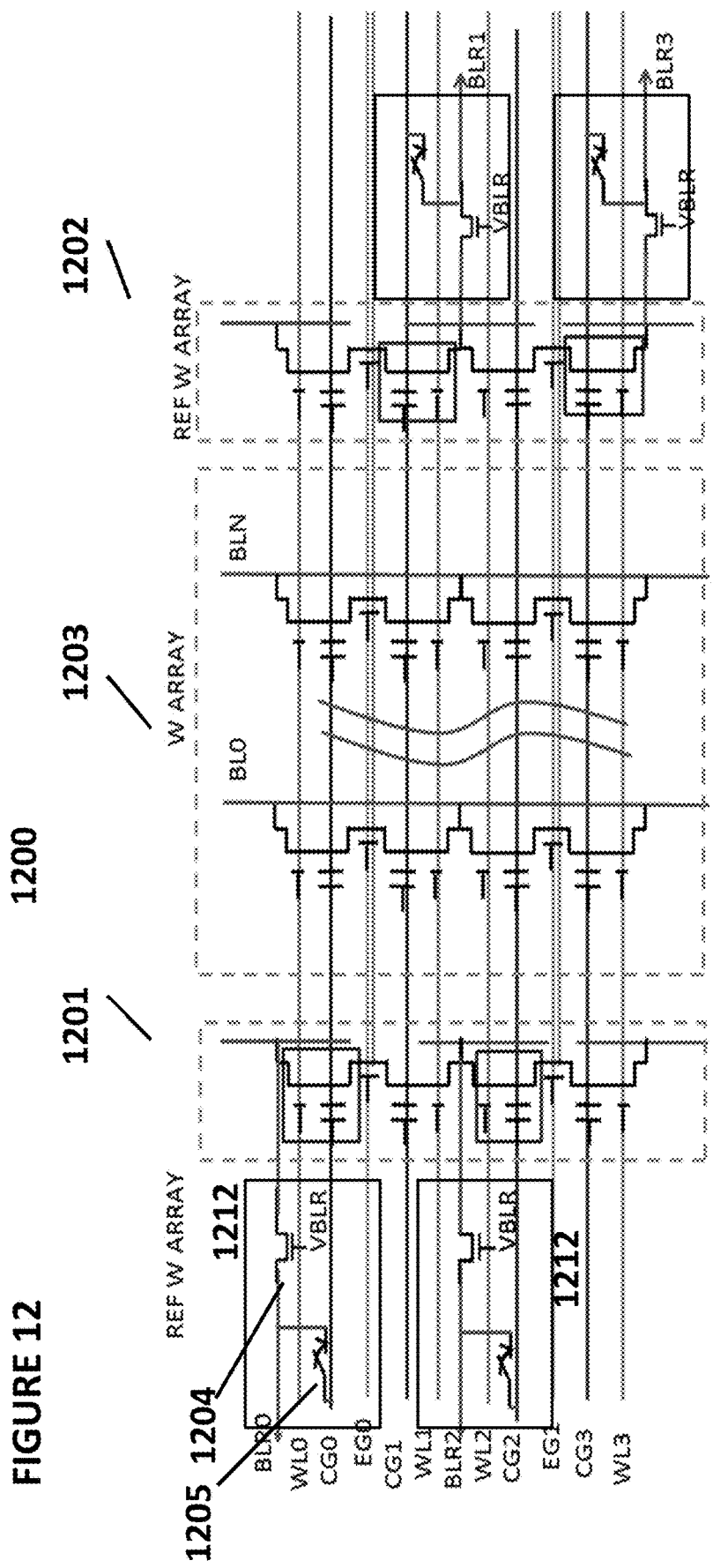
FIG. 12 depicts another example of a VMM system.
Figure 13:
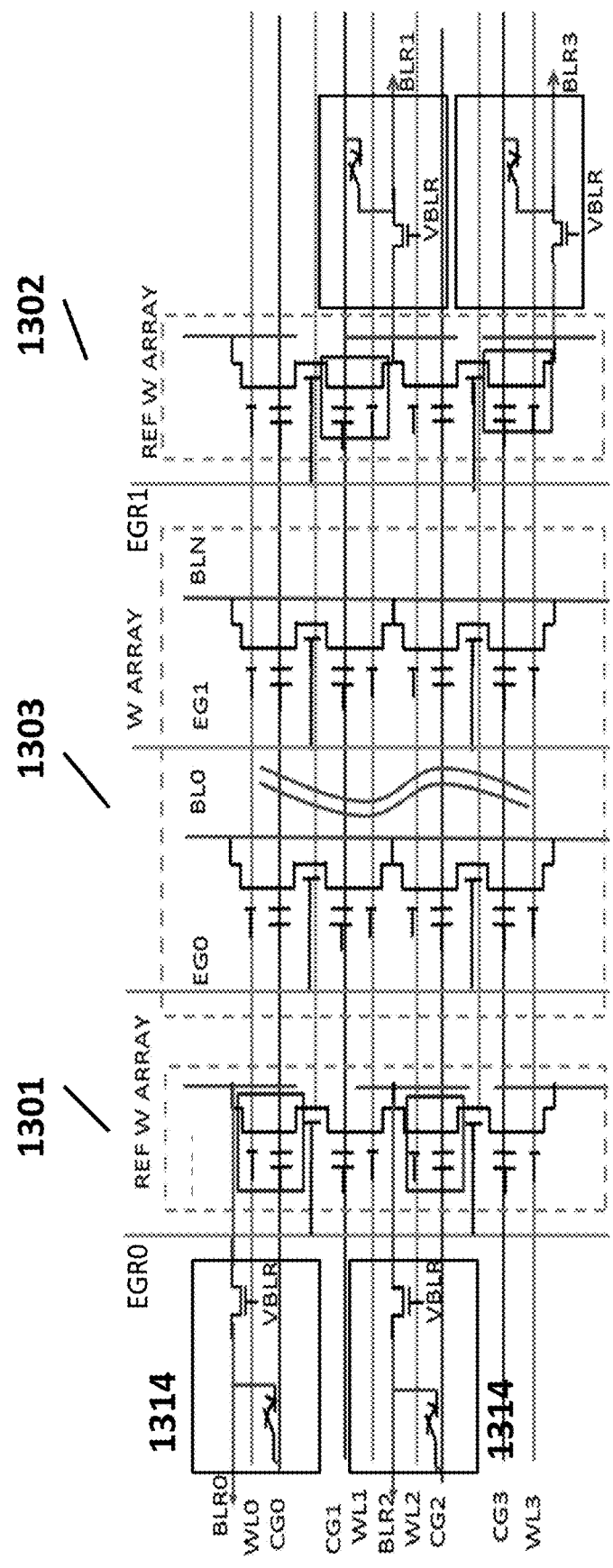
FIG. 13 depicts another example t of a VMM system.
Figure 14:
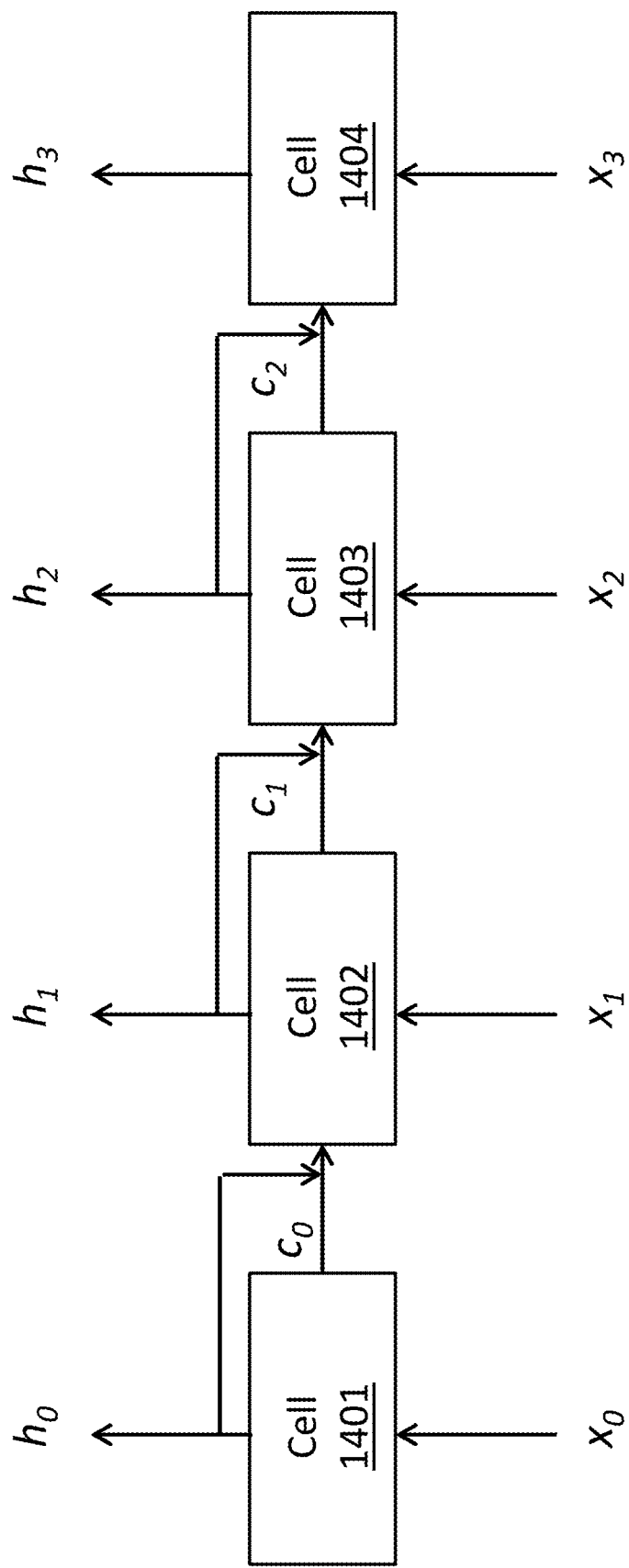
FIG. 14 depicts a prior art long short-term memory system.
Figure 15:
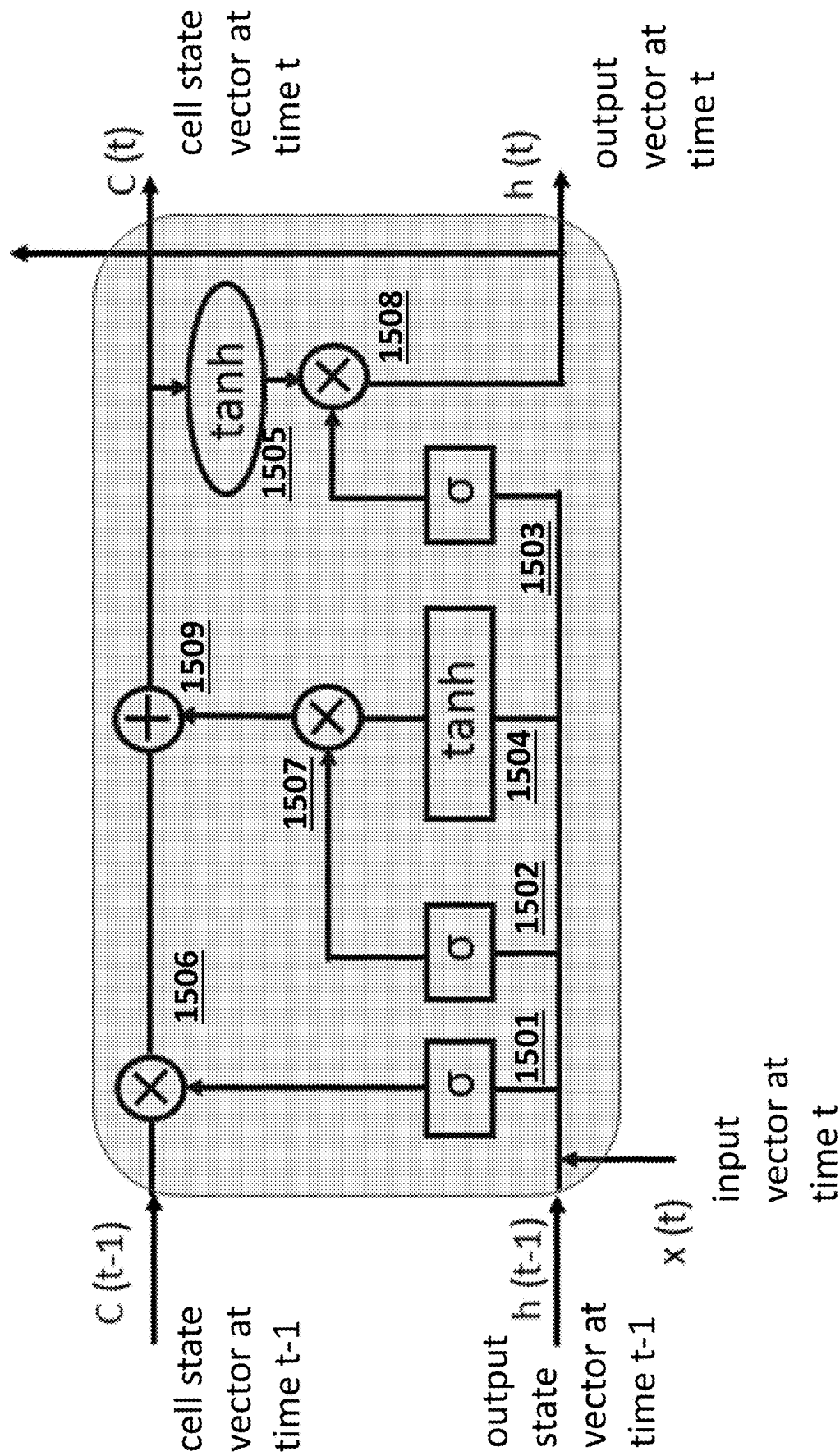
FIG. 15 depicts an example cell for use in a long short-term memory system.
Figure 16:
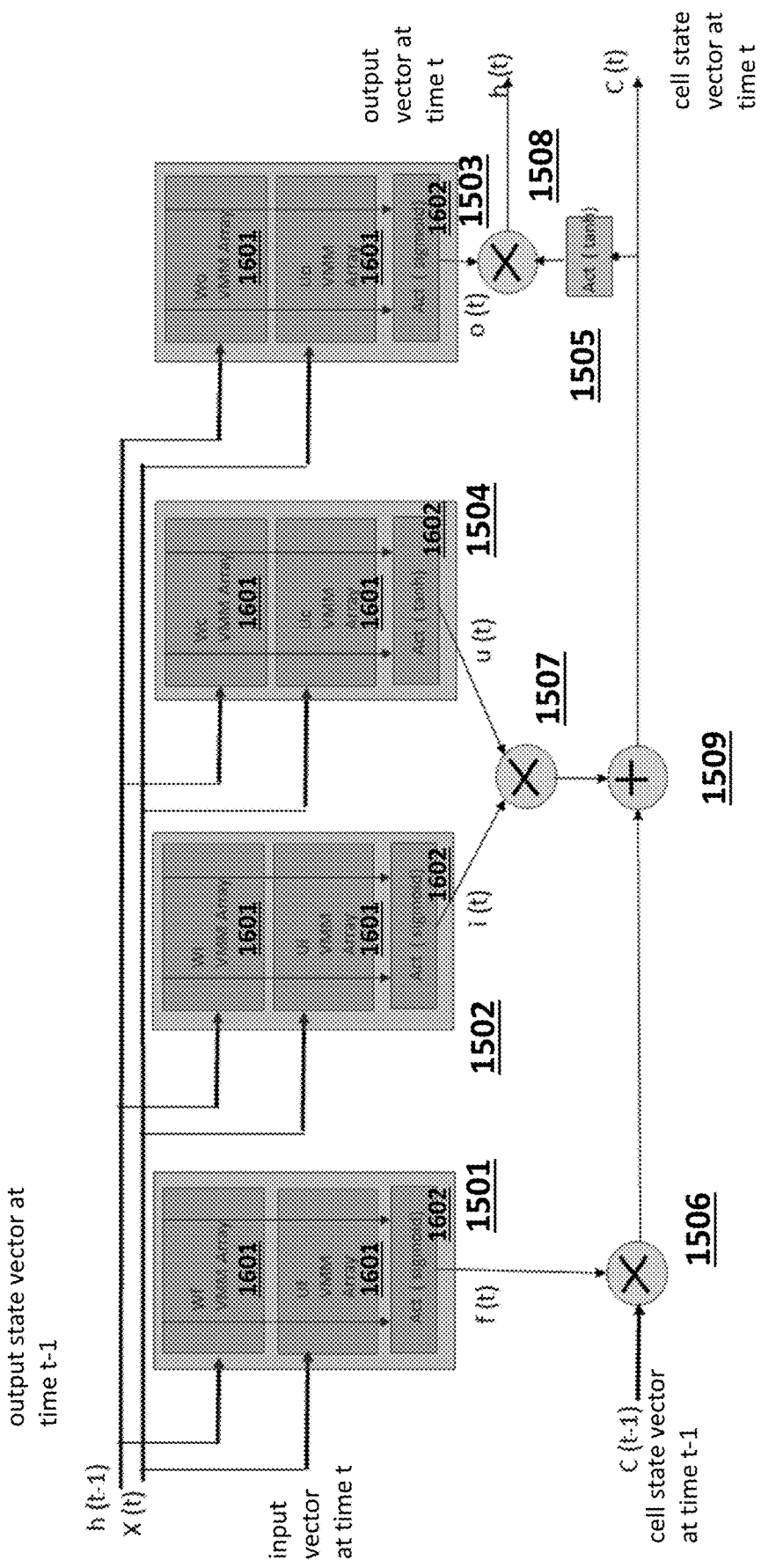
FIG. 16 depicts an example implementation of the cell of FIG. 15.
Figure 17:
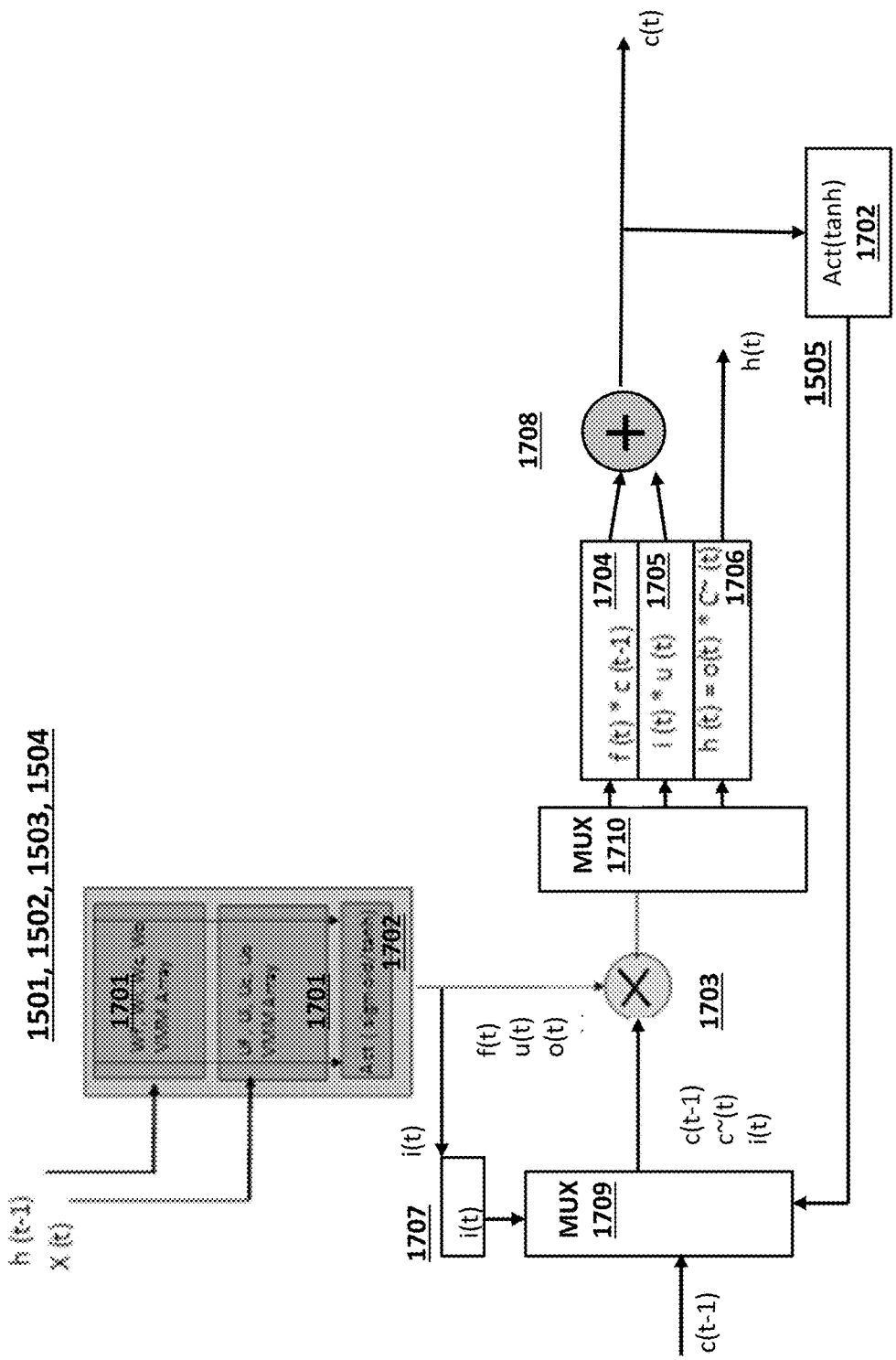
FIG. 17 depicts another example implementation of the cell of FIG. 15.
Figure 18:
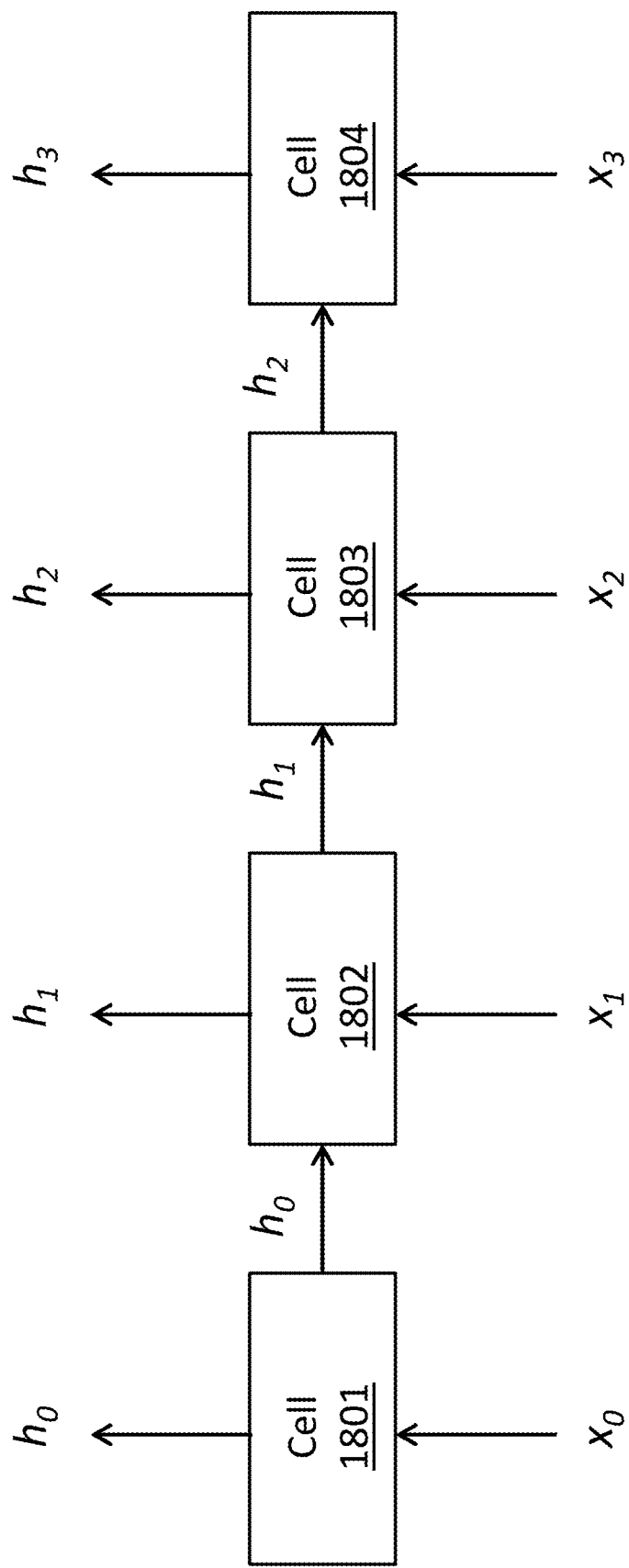
FIG. 18 depicts a prior art gated recurrent unit system.
Figure 19:
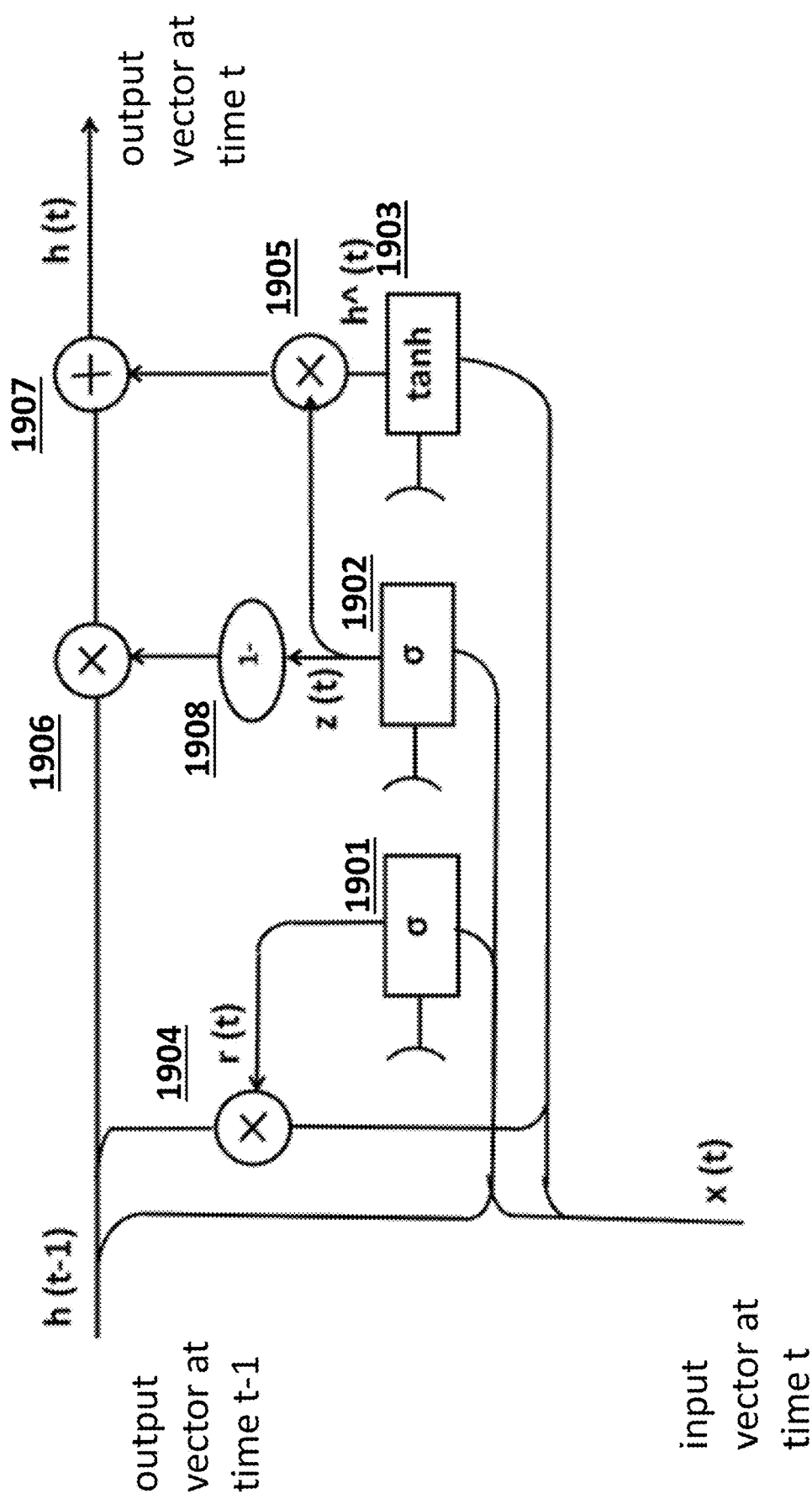
FIG. 19 depicts an example cell for use in a gated recurrent unit system.
Figure 20:
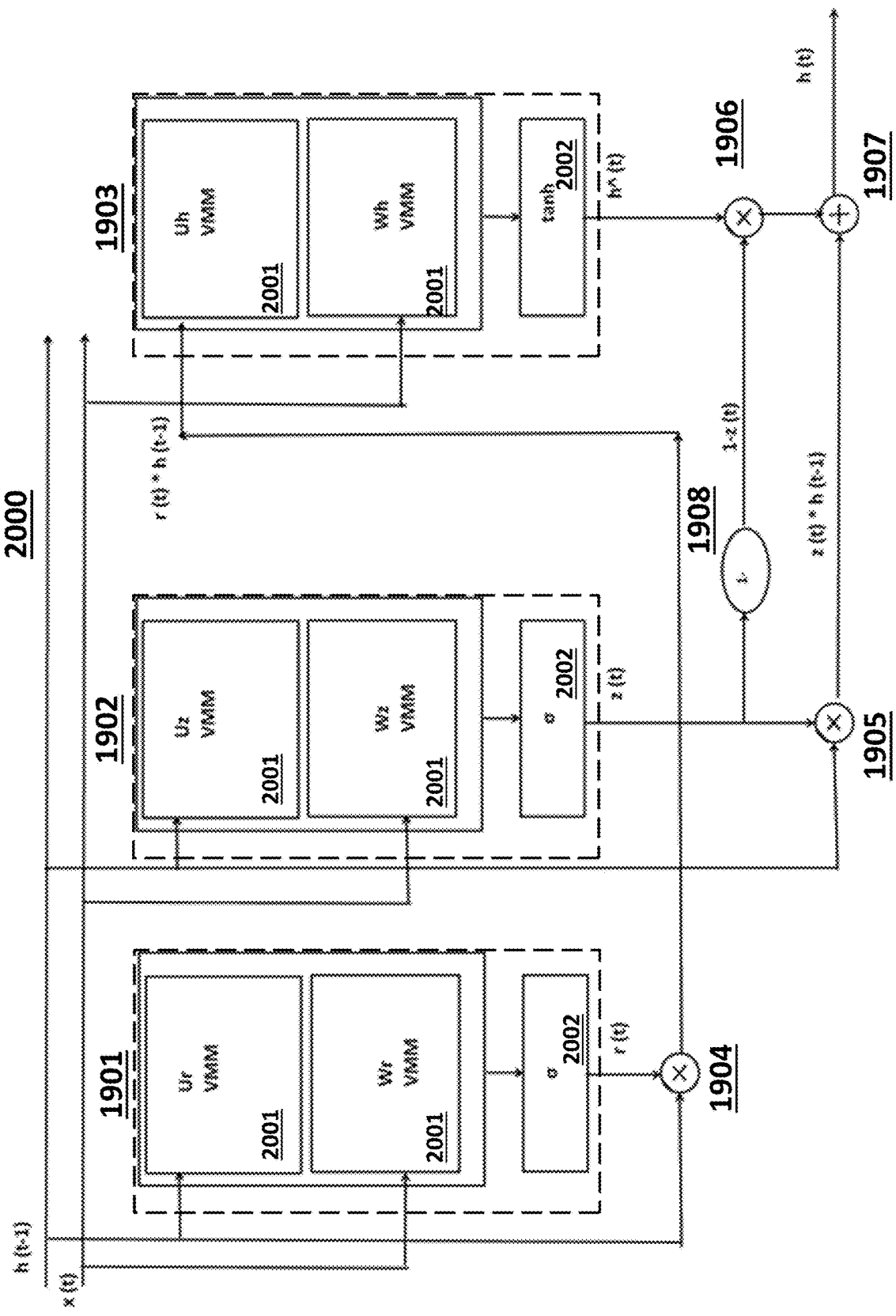
FIG. 20 depicts an example implementation of the cell of FIG. 19.
Figure 21:
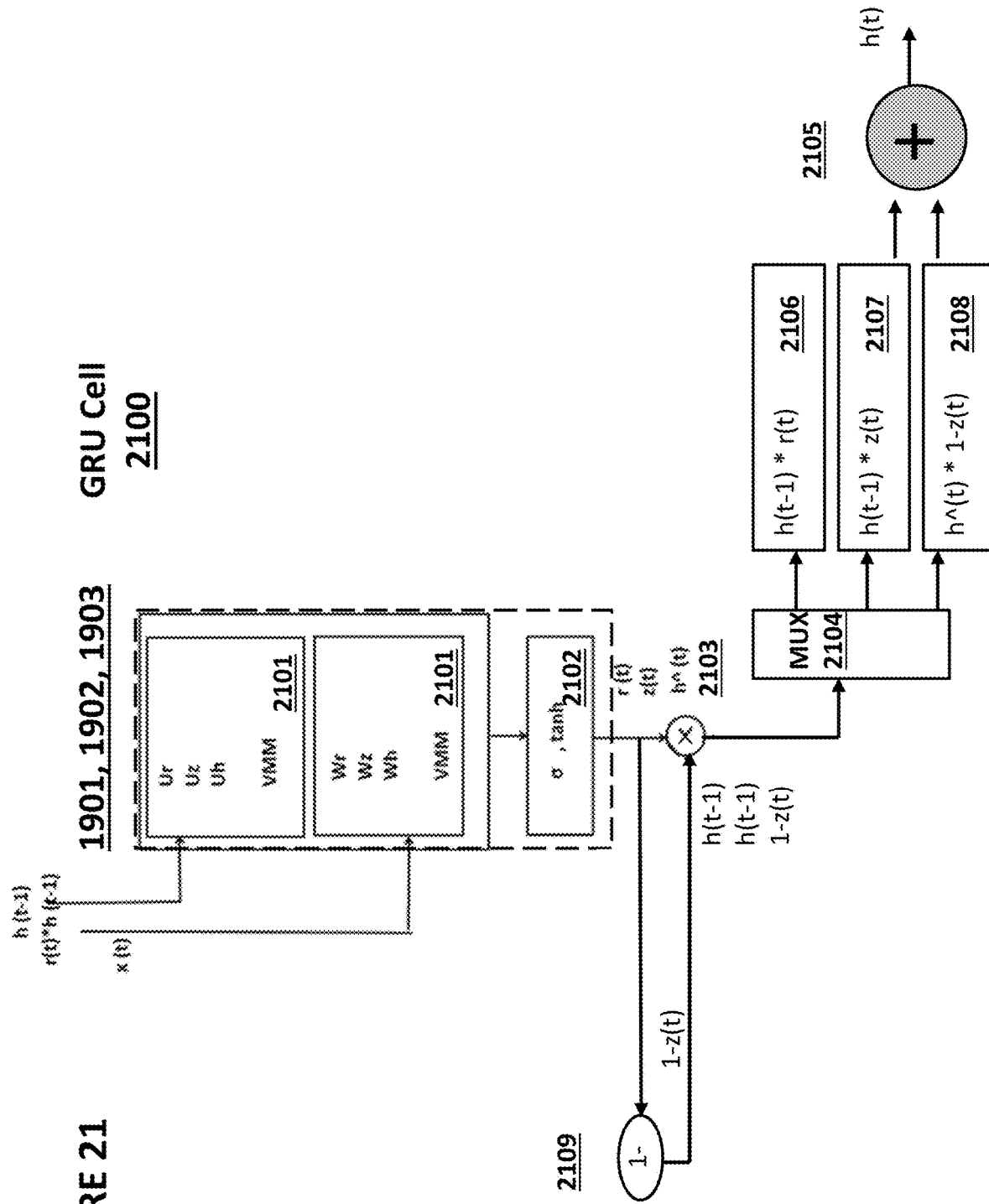
FIG. 21 depicts another example implementation of the cell of FIG. 19.
Figure 22:
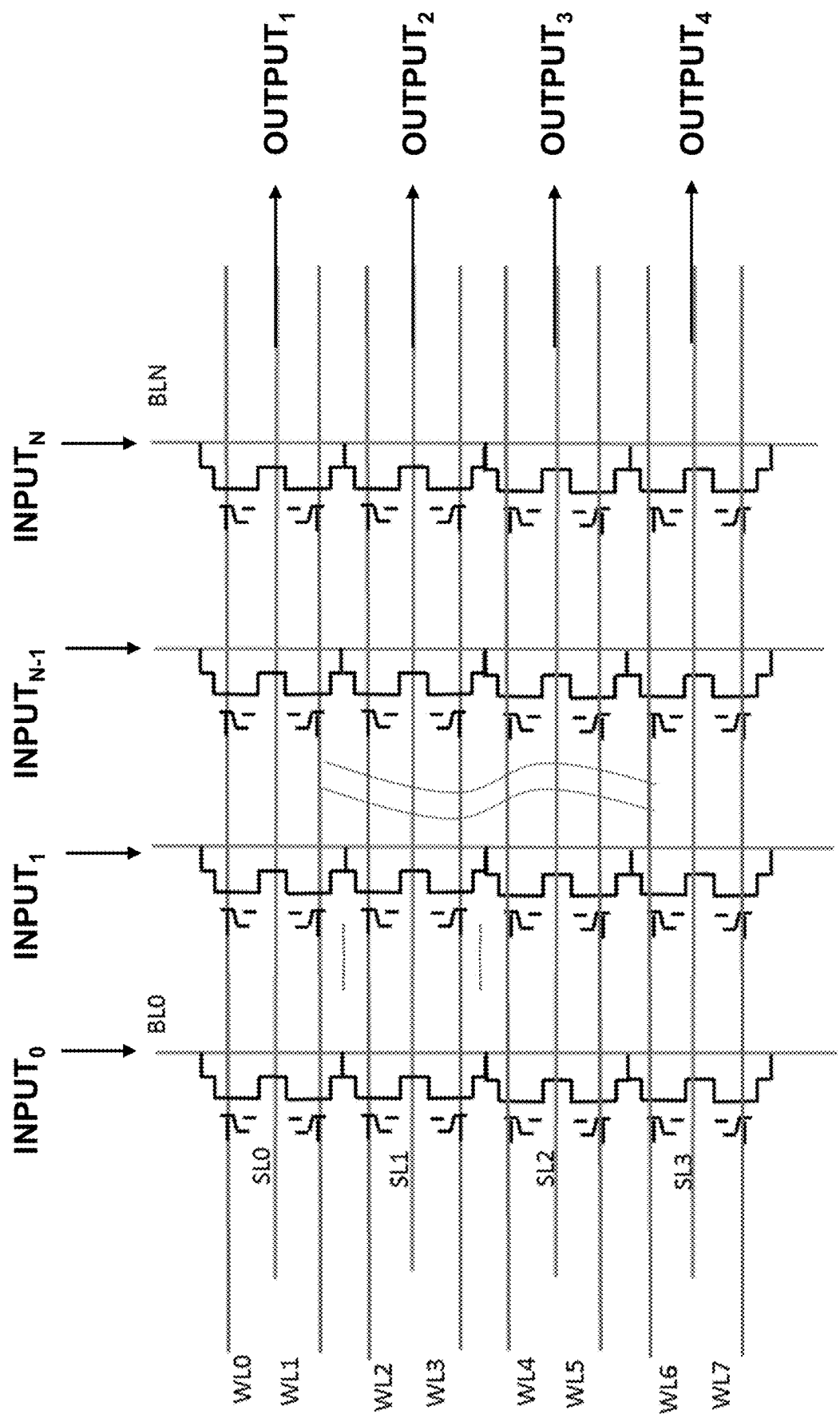
FIG. 22 depicts another example of a VMM system.
Figure 23:
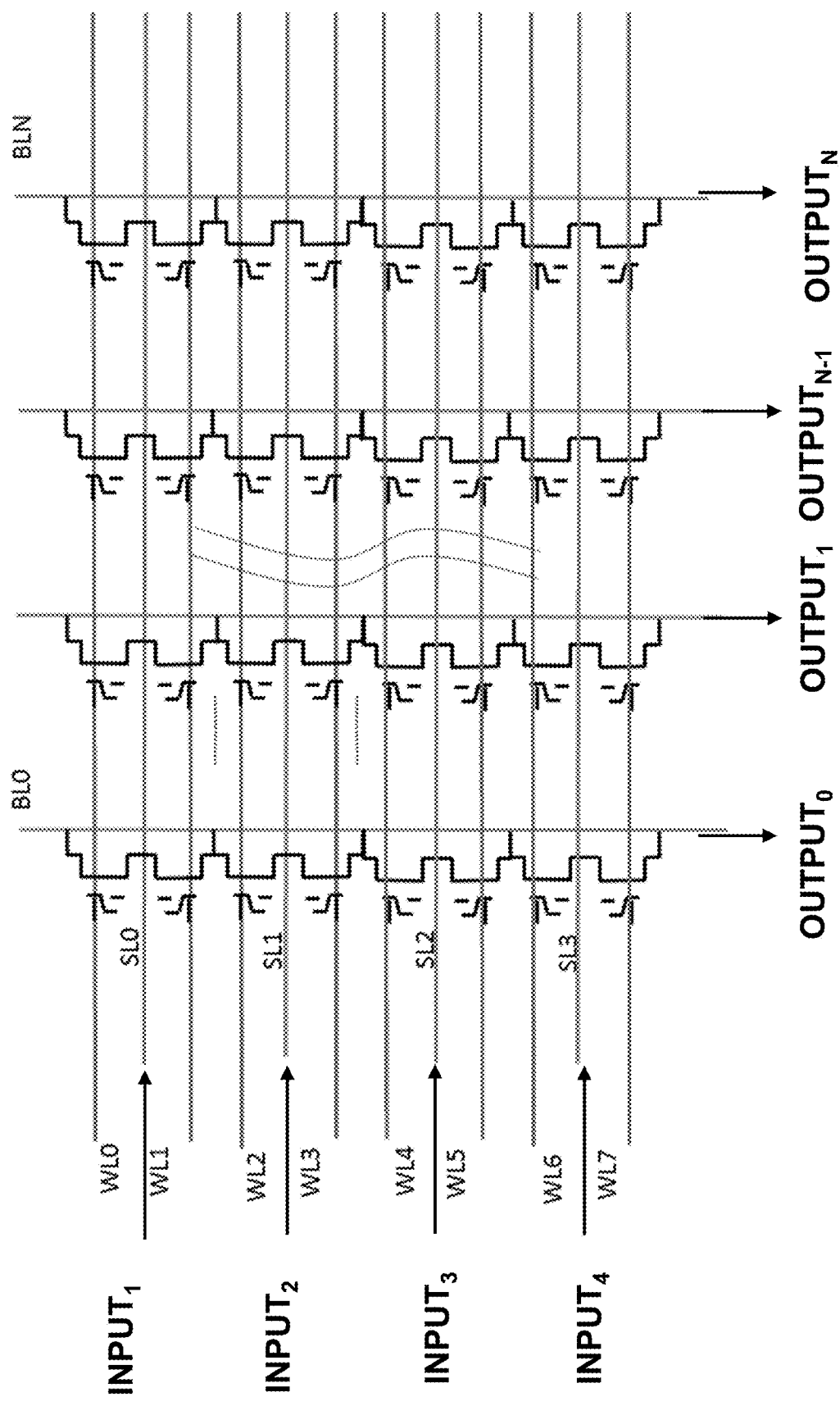
FIG. 23 depicts another example of a VMM system.
Figure 24:
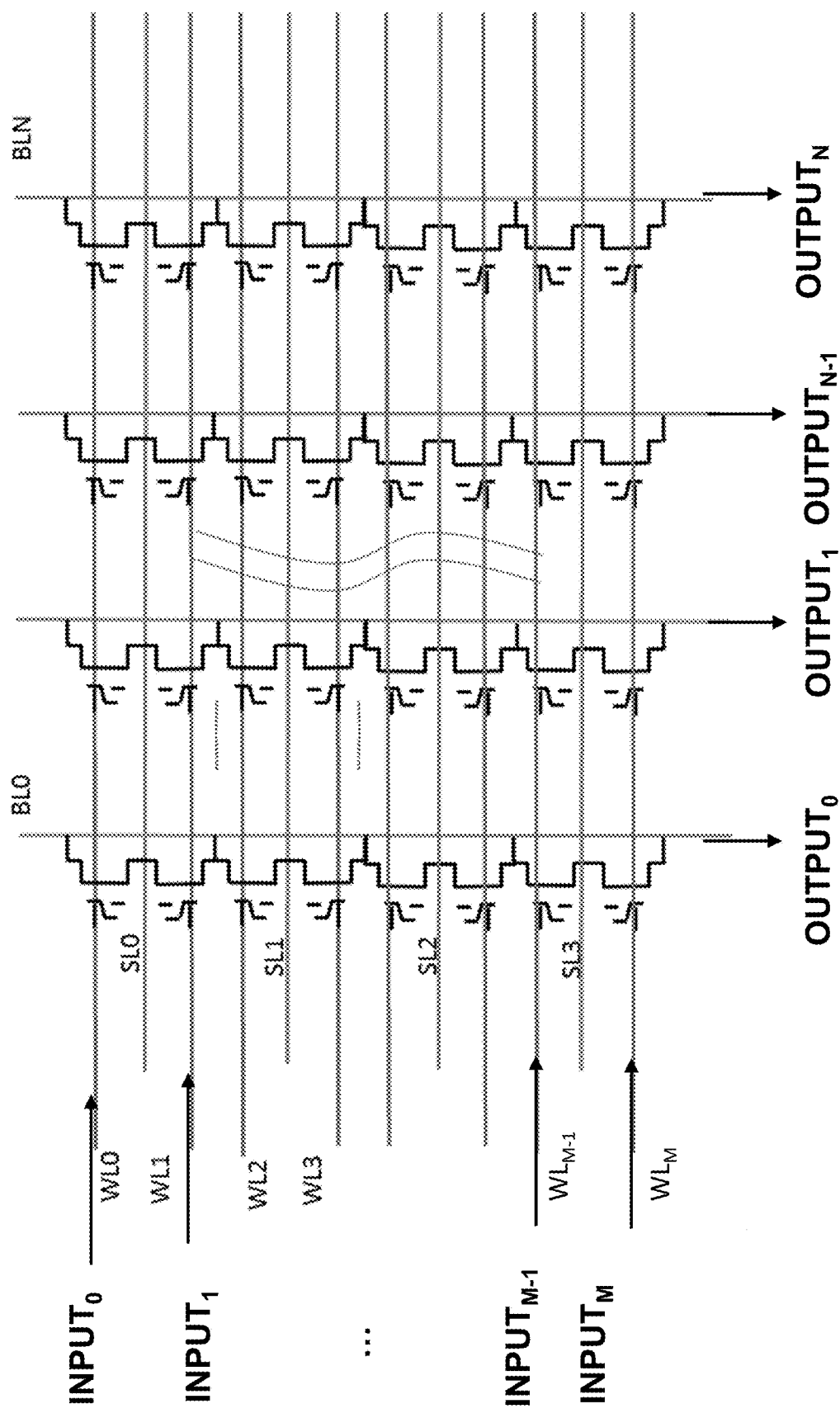
FIG. 24 depicts another example of a VMM system.
Figure 25:
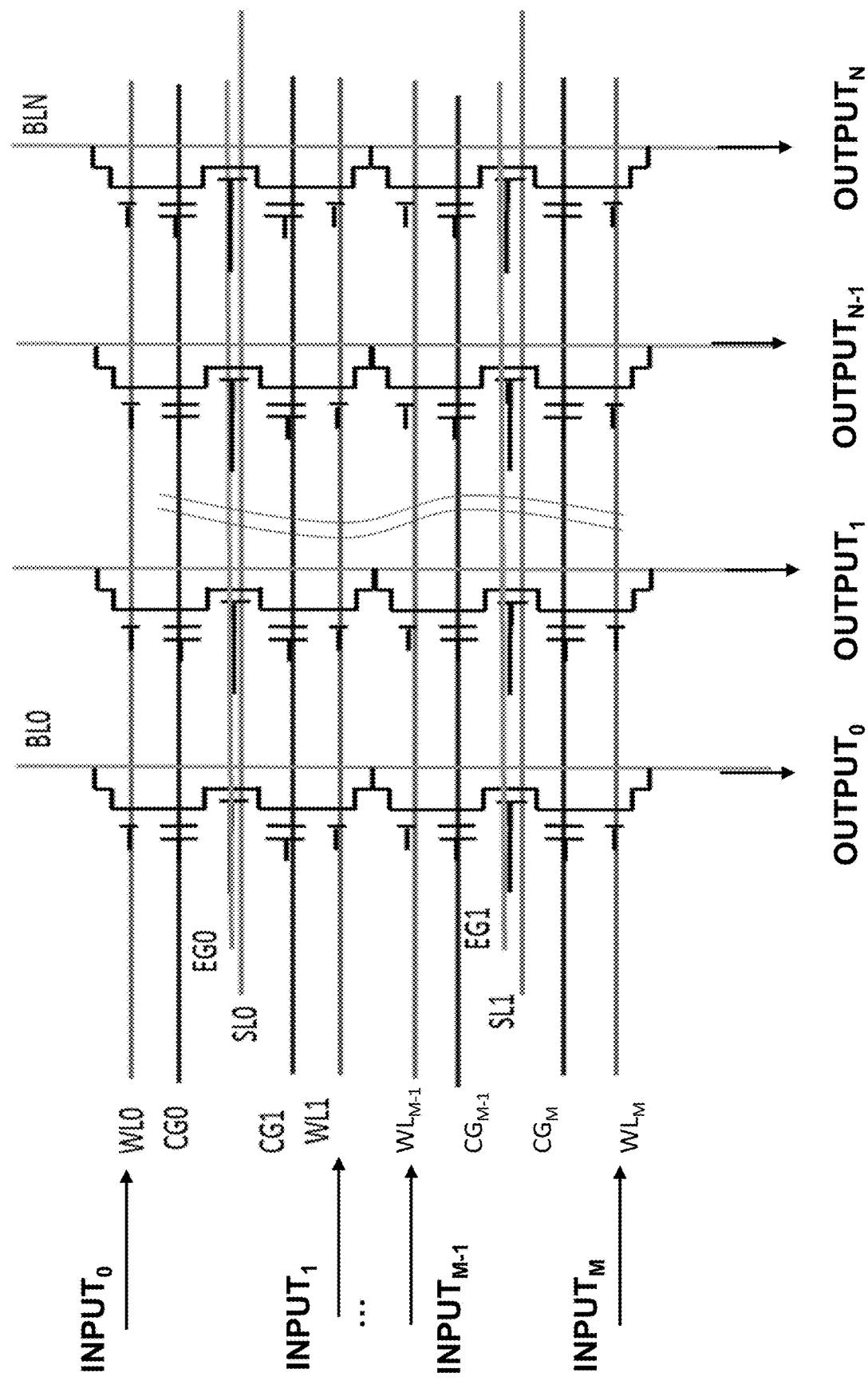
FIG. 25 depicts another example of a VMM system.
Figure 26:
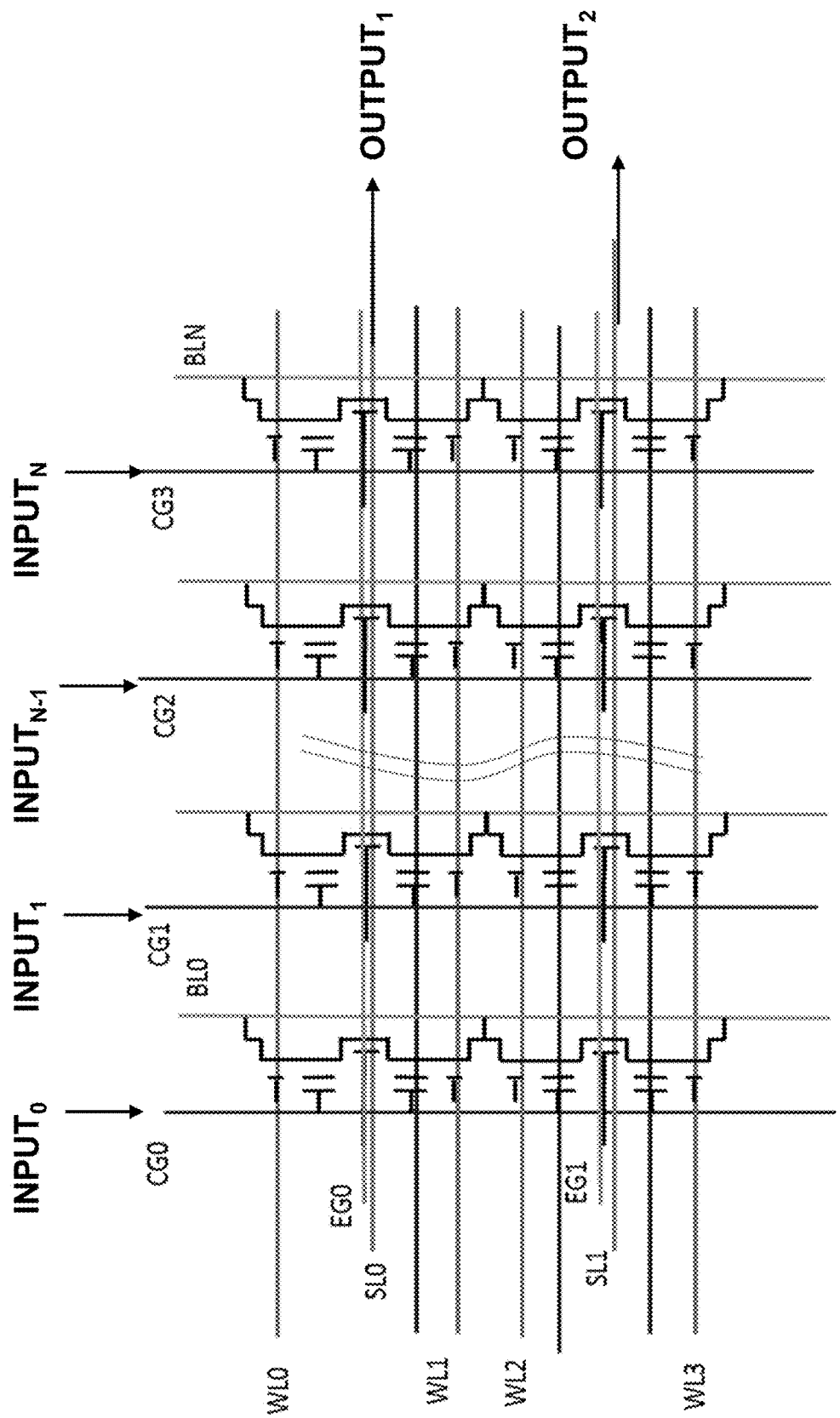
FIG. 26 depicts another example of a VMM system.
Figure 27:
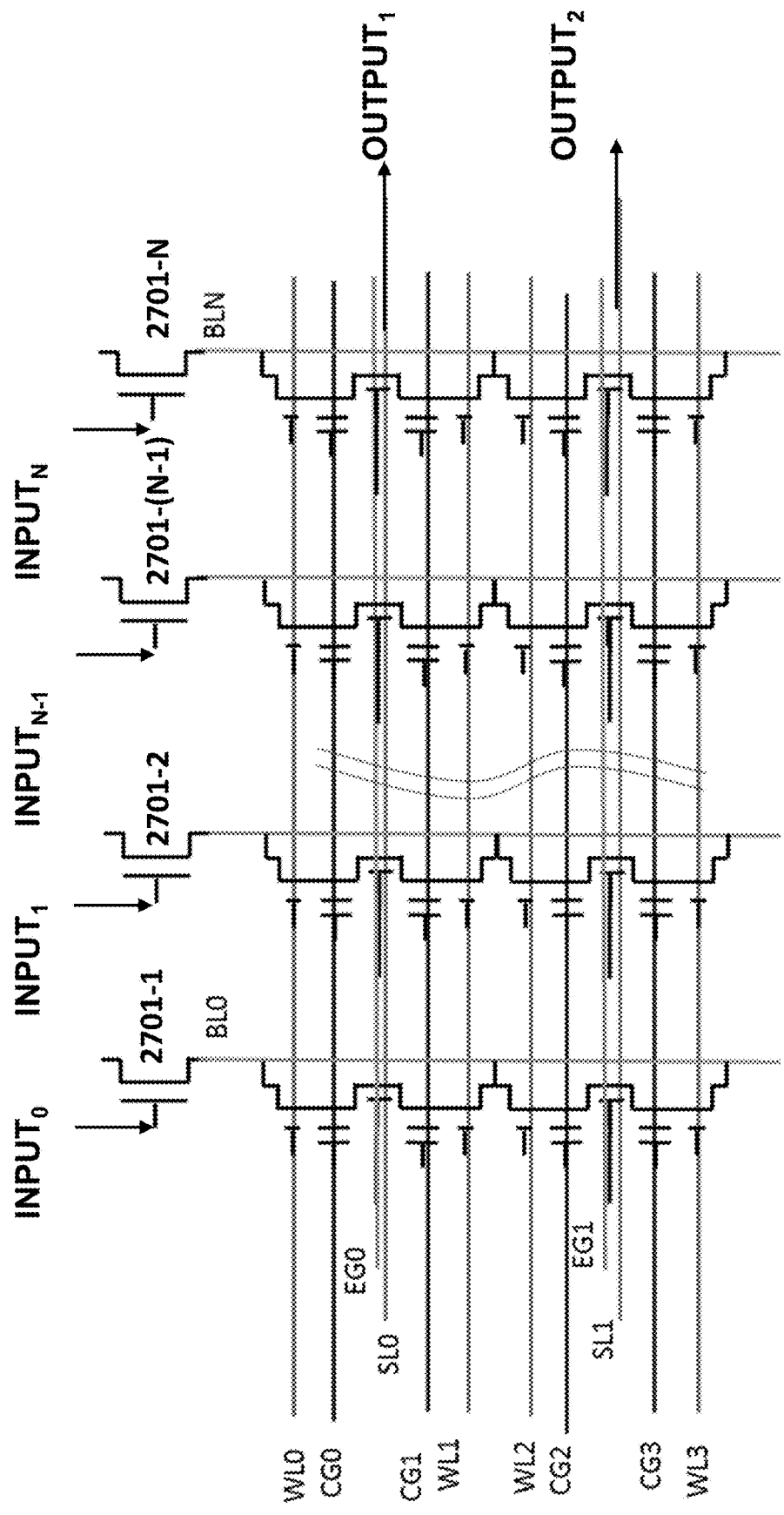
FIG. 27 depicts another example of a VMM system.
Figure 28:
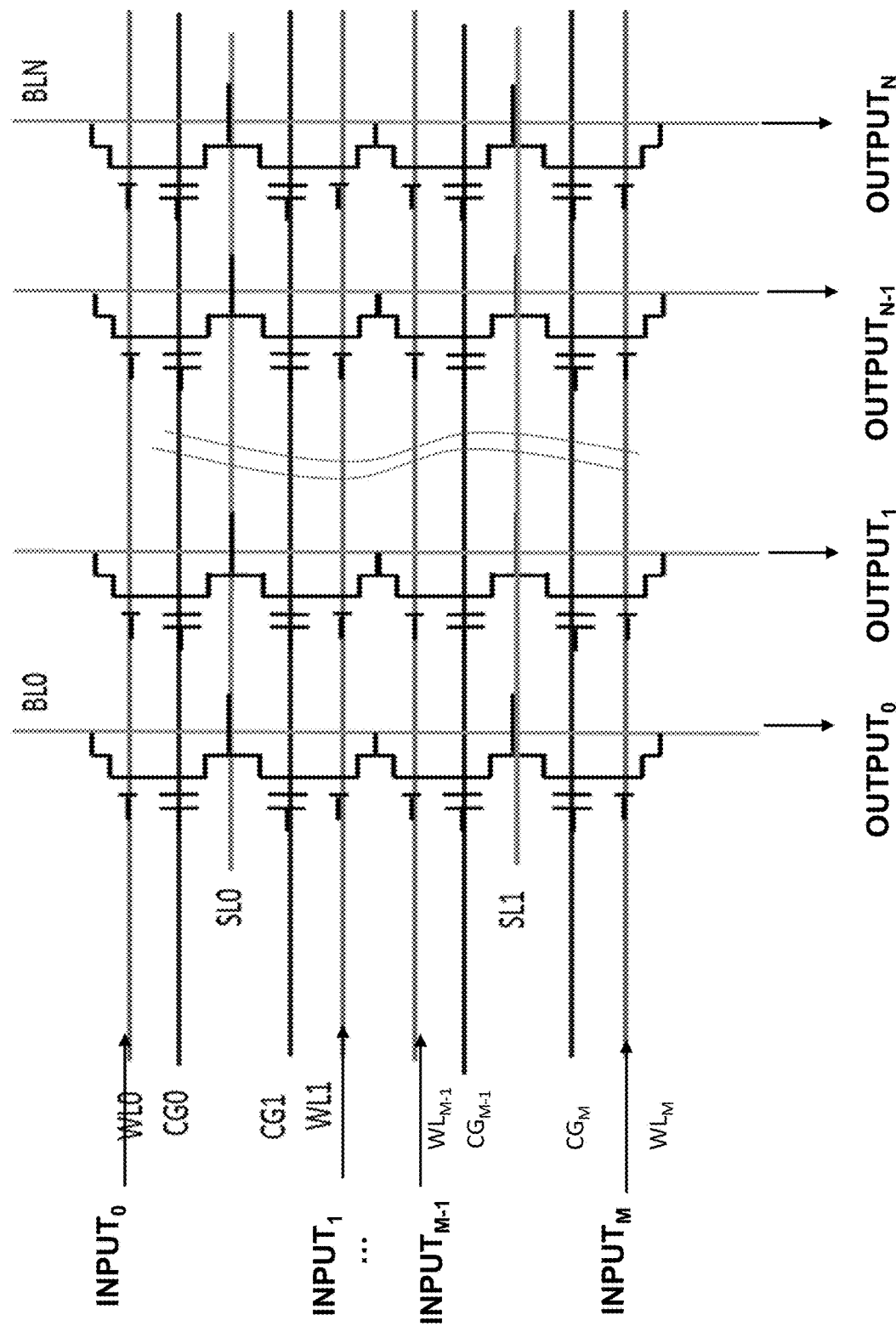
FIG. 28 depicts another example of a VMM system.
Figure 29:
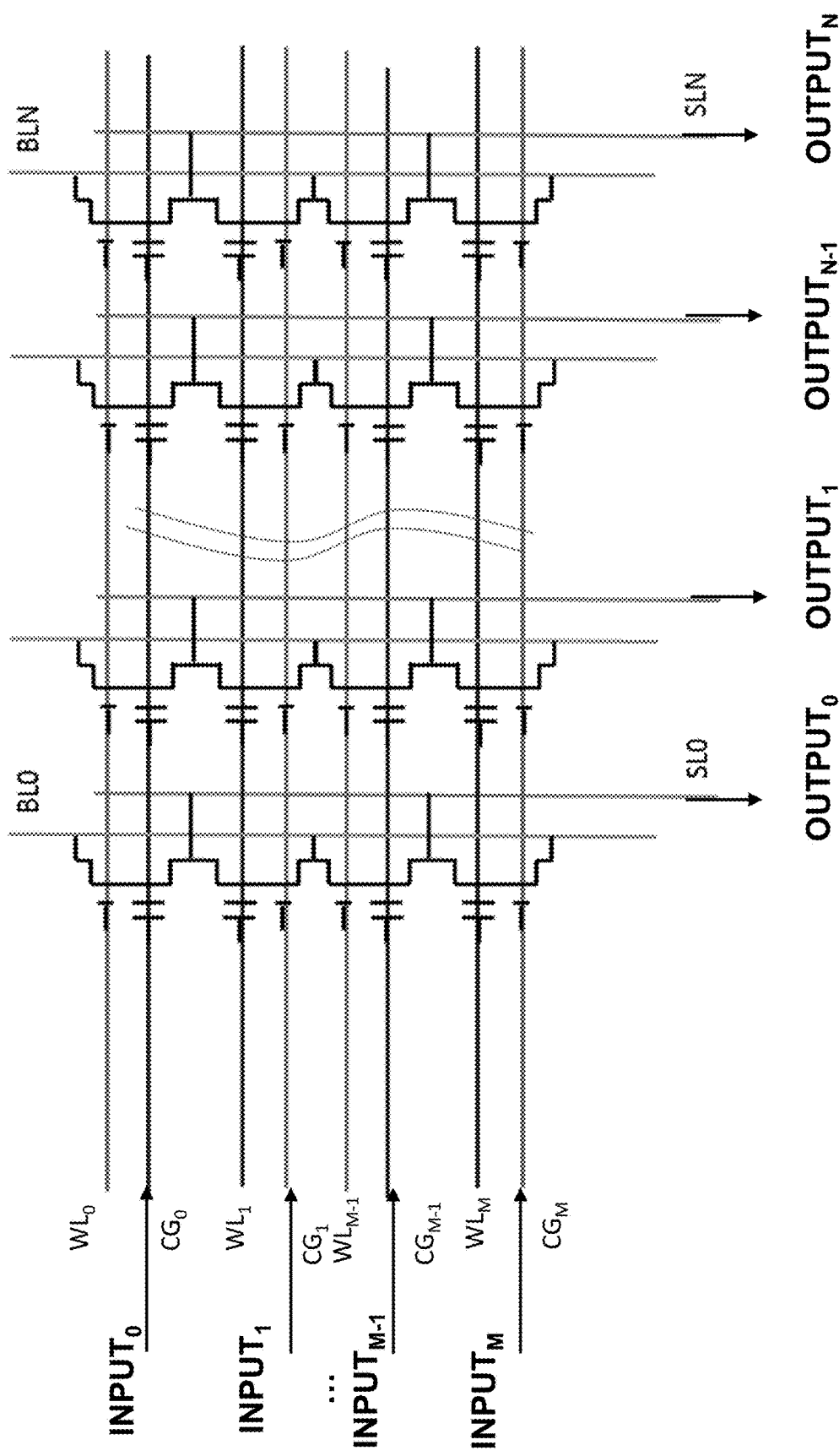
FIG. 29 depicts another example of a VMM system.
Figure 30:
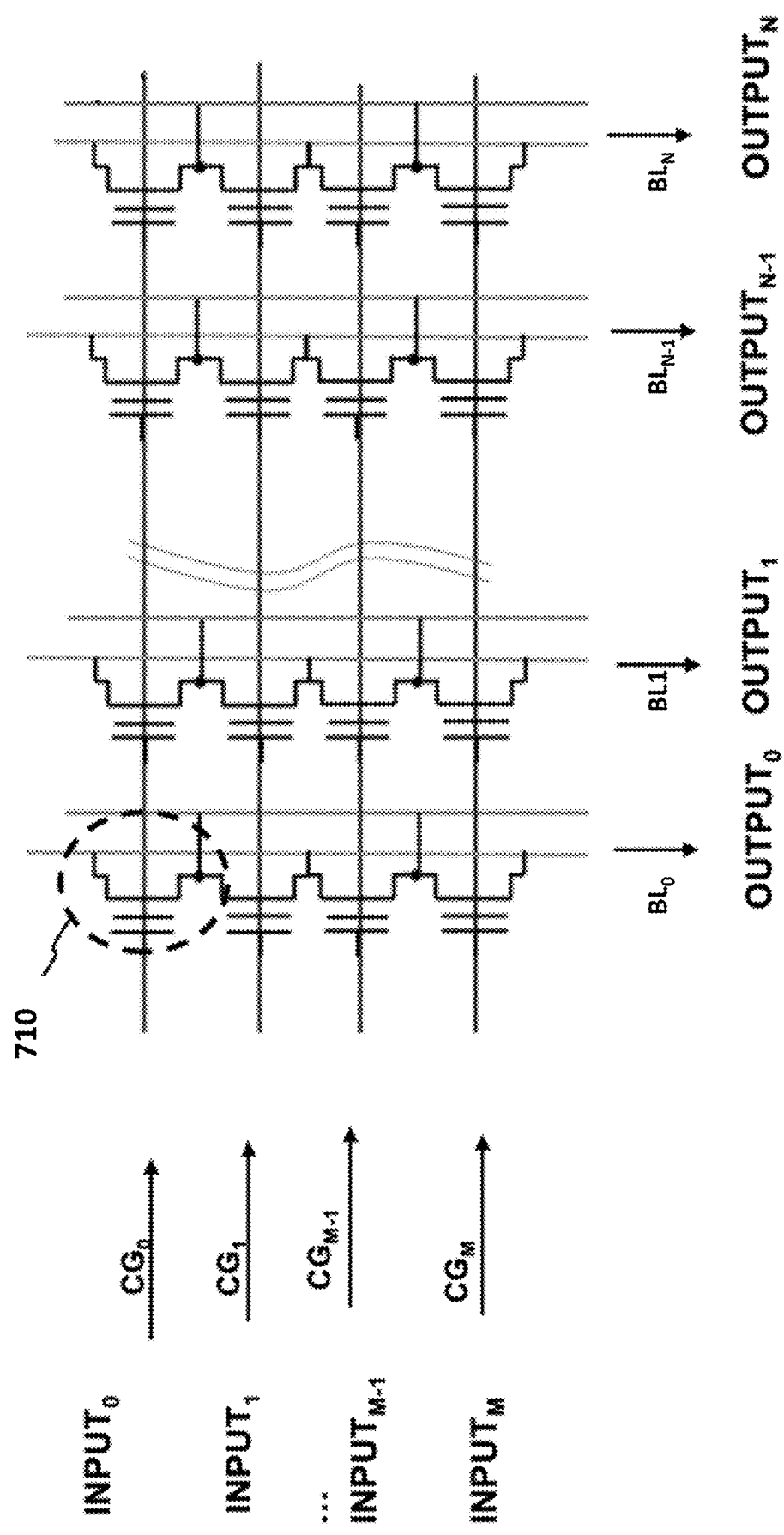
FIG. 30 depicts another example of a VMM system.
Figure 31:
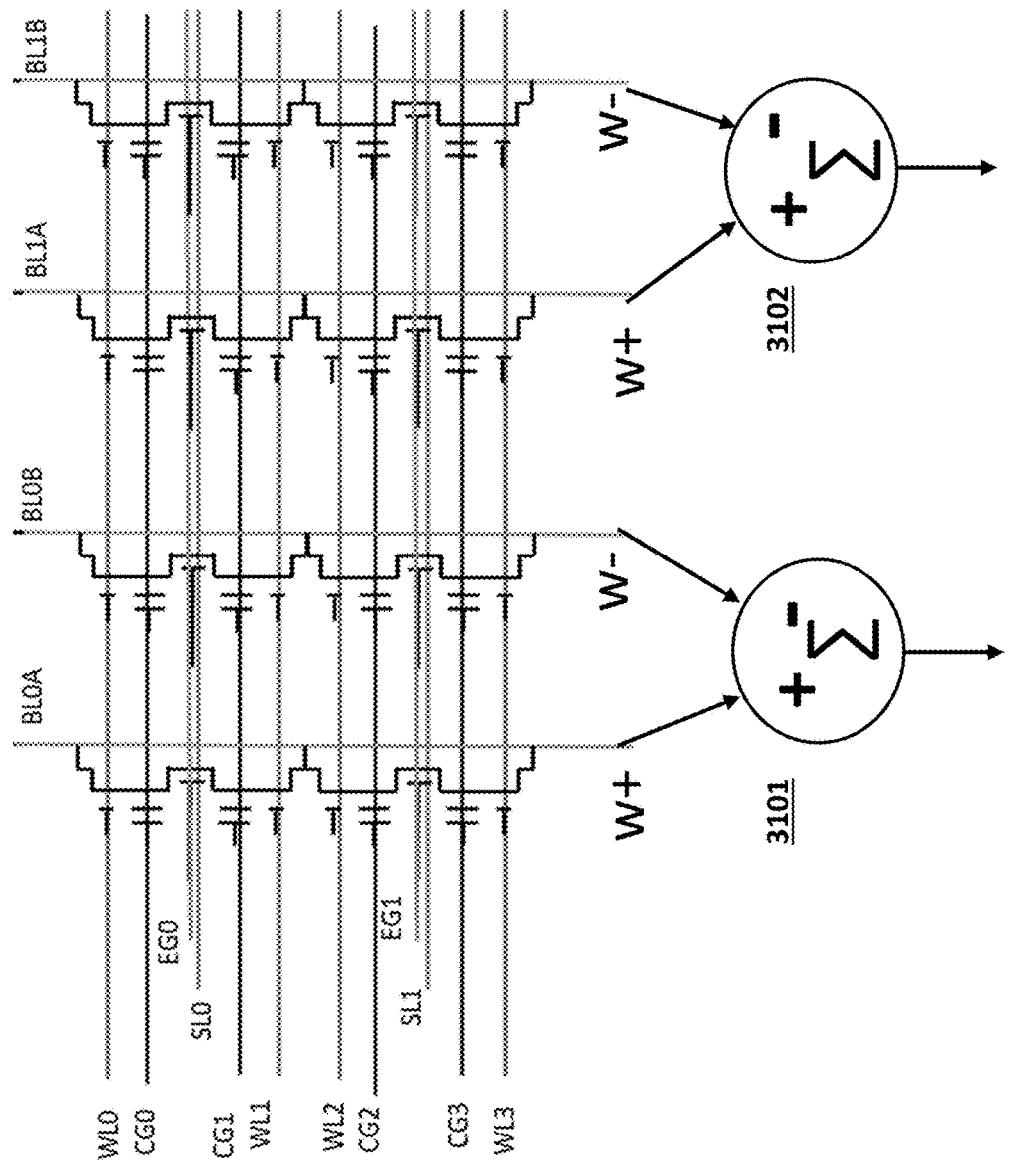
FIG. 31 depicts another example of a VMM system.
Figure 33:
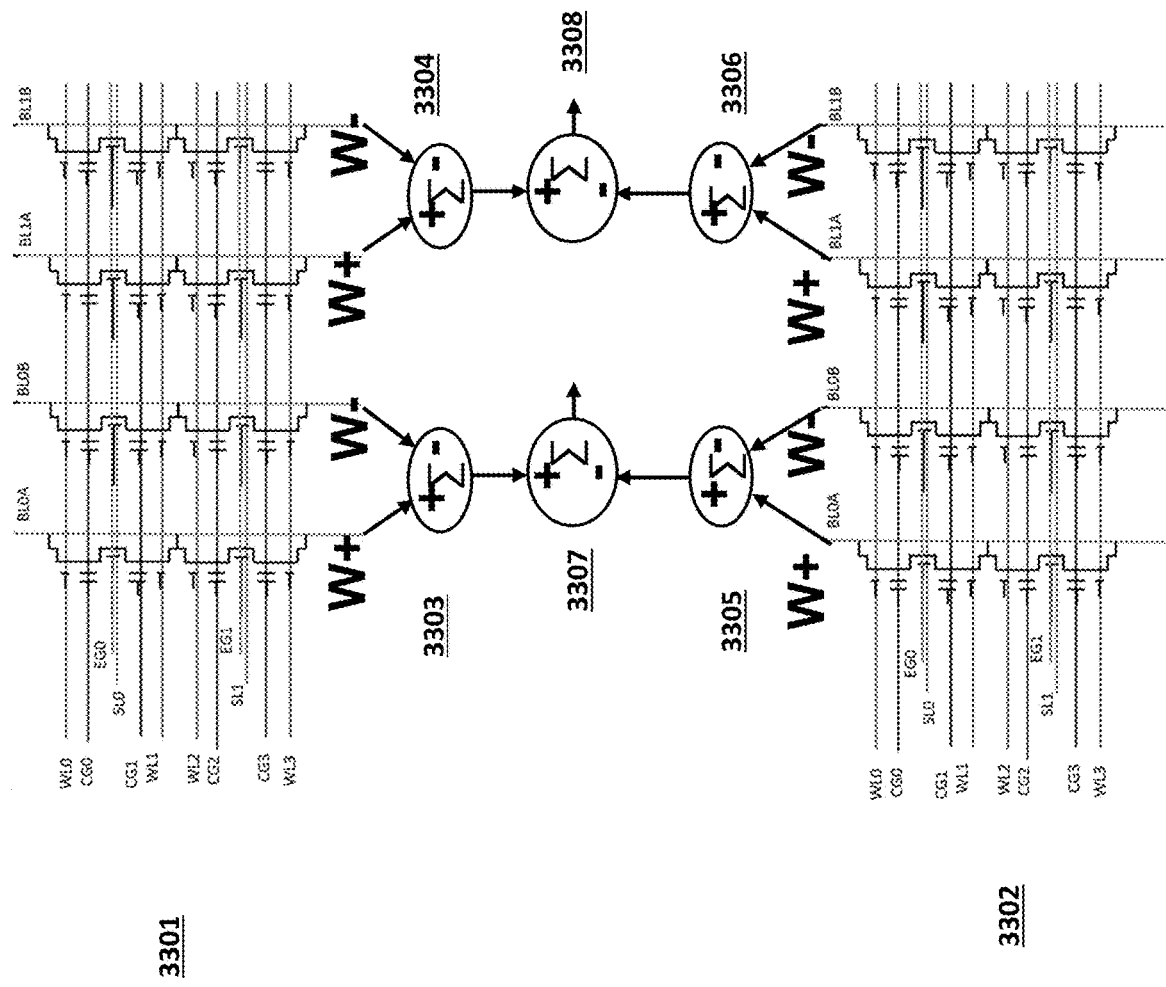
FIG. 33 depicts another example of a VMM system.
Figure 35:
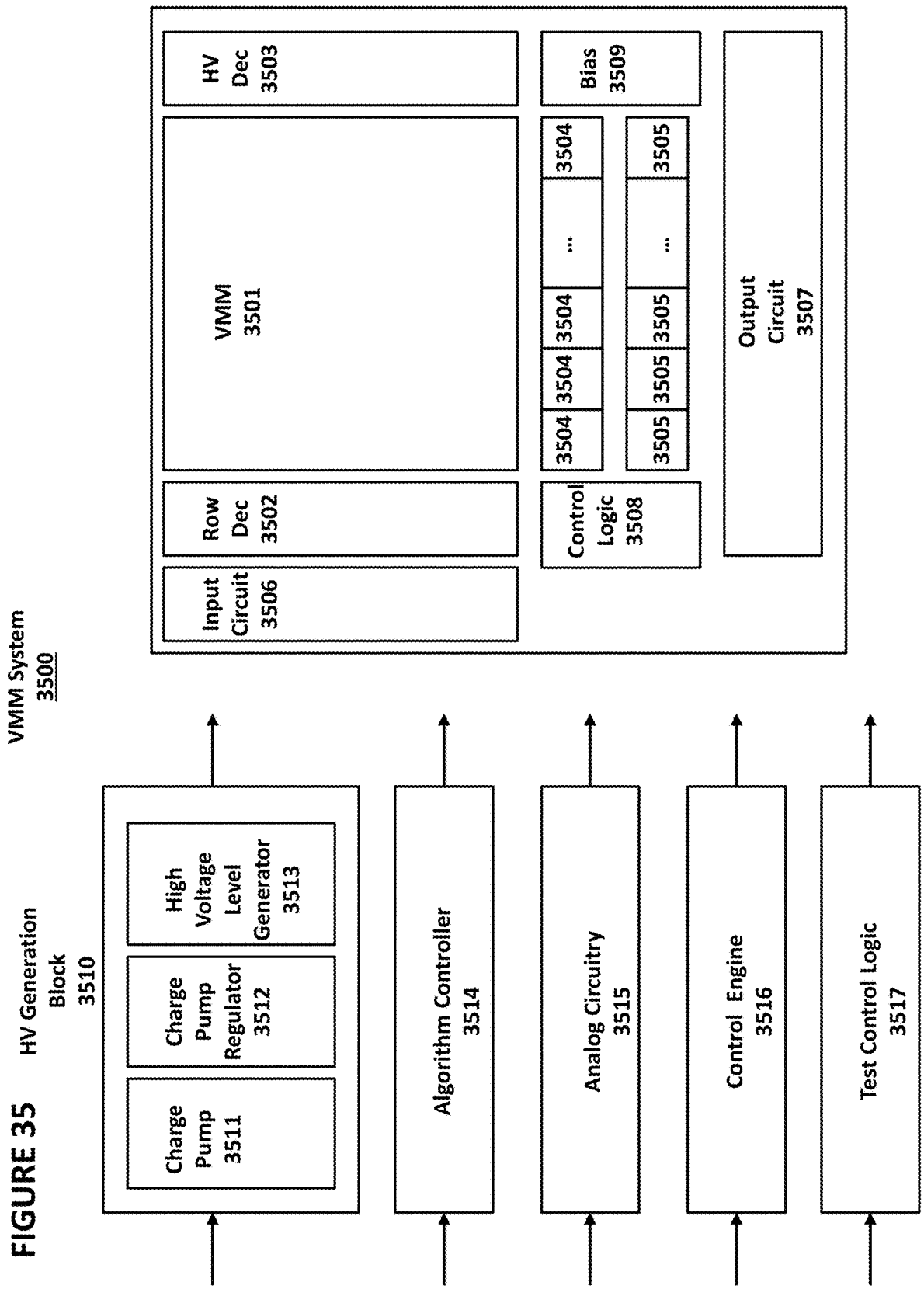
FIG. 35 depicts an example of a VMM system.

FIG. 35 depicts a block diagram of VMM system 3500. VMM system 3500 comprises VMM array 3501, which includes analog memory cells as well as digital memory cells, row decoder 3502, high voltage decoder 3503, column decoders 3504, bit line drivers 3505, input circuit 3506, output circuit 3507, control logic 3508, and bias generator 3509. VMM system 3500 further comprises high voltage generation block 3510, which comprises charge pump 3511, charge pump regulator 3512, and high voltage analog precision level generator 3513. VMM system 3500 further comprises (program/erase, or weight tuning) algorithm controller 3514, analog circuitry 3515, control engine 3516 (which may perform functions such as arithmetic functions, activation functions, embedded microcontroller logic, without limitation), and test control logic 3517. The systems and methods described below can be implemented in VMM system 3500.

The input circuit 3506 may include circuits such as a DAC (digital to analog converter), DPC (digital to pulses converter, digital to time modulated pulse converter), AAC (analog to analog converter, such as a current to voltage converter, logarithmic converter), PAC (pulse to analog level converter), or any other type of converters. The input circuit 3506 may implement one or more of normalization, linear or non-linear up/down scaling functions, or arithmetic functions. The input circuit 3506 may implement a temperature compensation function for input levels. The input circuit 3506 may implement an activation function such as ReLU or sigmoid. The output circuit 3507 may include circuits such as an ADC (analog to digital converter, to convert neuron analog output to digital bits), AAC (analog to analog converter, such as a current to voltage converter, logarithmic converter), APC (analog to pulse(s) converter, analog to time modulated pulse converter), or any other type of converters. The output circuit 3507 may implement an activation function such as rectified linear activation function (ReLU) or sigmoid. The output circuit 3507 may implement one or more of statistic normalization, regularization, up/down scaling/gain functions, statistical rounding, or arithmetic functions (e.g., add, subtract, divide, multiply, shift, log) for neuron outputs. The output circuit 3507 may implement a temperature compensation function for neuron outputs or array outputs (such as bitline output) so as to keep power consumption of the array approximately constant or to improve precision of the array (neuron) outputs such as by keeping the IV slope approximately the same.

As discussed above, a neural network may comprise many different layers, and within each layer, many calculations may be performed involving stored weight values in one or more arrays within that layer. Some layers will be used more than other layers, and it can be appreciated that such layers are more important to the overall accuracy of the neural network based on their high frequency of use.

Figure 36:
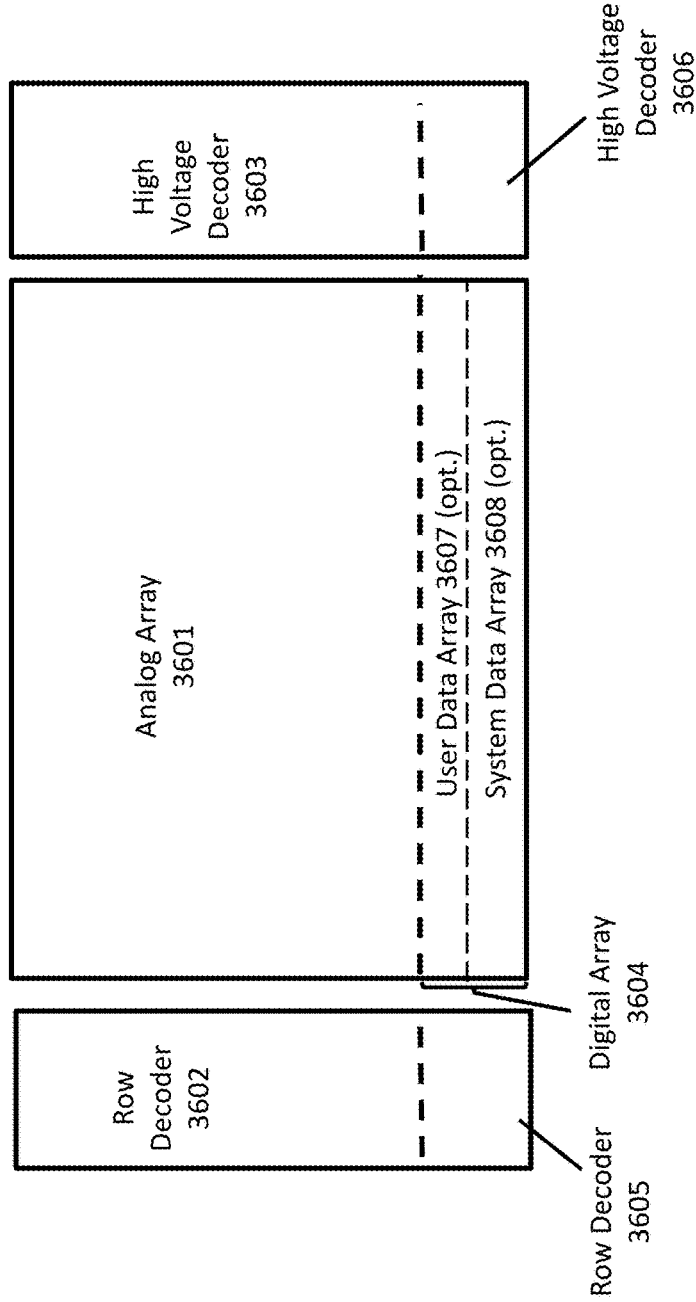
FIG. 36 depicts an example of a VMM system comprising a digital array.

FIG. 36 depicts VMM system 3600, which comprises analog array 3601, row decoder 3602, high voltage decoder 3603, digital array 3604, row decoder 3605, and high voltage decoder 3606. Analog array 3601 and digital array 3604 share the same diffusion and metal interconnect bit lines. Unlike in the prior art, digital array 3604 has its own row decoder (row decoder 3605) and its own high voltage decoder (3606), which allows for a first set of voltages and a second set voltages to be applied concurrently to analog array 3601 and digital array 3604, respectively. Optionally, analog array 3601 and digital array 3604 are fabricated on the same semiconductor die.

Digital array 3604 optionally may include a first array, which can be referred to as user data array 3607, comprising rows for storing digital data stored and retrieved by external sources (such as user data or operating system code for a computer) and a second array, which can be referred to as system data array 3608 comprising rows for storing digital system data, i.e. data that is used by VMM system 3600 itself and is not stored and retrieved by external sources, which is sometimes referred to as digital non-volatile registers (NVRs) or information rows or an information array. Examples of data that might be stored in system data array 3608 include user ID, trim bits, configuration bits, manufacturing info, security codes, password, lock bit, and other system data. The performance of system data array 3608 may be relaxed compared to user data array 3607.

For example, the content of system data array 3608 may be read once at power up or at the beginning of a system operation and not read thereafter during operation. As another example, content of system data array 3608 may be erased or programmed only a few times throughout its lifetime usage. Thus, a read, program, or erase operation of system data array 3608 can occur at a slower speed than for the user data array without much performance loss since the system data array is used so rarely. This difference in speed can be implemented in the VMM system 3600, for example, to save power when operating on system data array 3608.

As another example, non-volatile memory cells have a characteristic referred to as endurance, which refers to the number of times the non-volatile memory cell may be programmed or erased before it degrades to the point of no longer being reliable or usable. Thus, system data array 3608 may be provided with non-volatile memory cells of a lower endurance than non-volatile memory cells of user data array 3607 since system data array 3608 will be used much less during operation than user data array 3607.

Table 9 depicts example operating voltages used in VMM system 3600, where CG-main, EG-main, BL-main, and SL-main are a first set of voltages applied to the control gate terminal, erase gate terminal, bit line terminal, and source line terminal, respectively, of one or more memory cells in analog array 3601, by row decoder 3702 and high voltage decoder 3703, and CG-DIG, EG-DIG, BL-DIG, and SL-DIG are a second set of voltages applied to a control gate terminal, erase gate terminal, bit line terminal, and source line terminal, respectively, of one or more cells in digital array 3604, by row decoder 3705 and high voltage decoder 3706:

TABLE No 9

Operating Voltages for VMM System 3600 in FIG. 36

| Action | CG-main | EG-main | BL-main | SL-main | CG-DIG | EG-DIG | BL-DIG | SL-DIG |
|---|---|---|---|---|---|---|---|---|
| Neural Read | 1.5 V | 0 V | 0.6 V | >=0 V | 0 V | 0 V | 0.6 V | >=0 V |
| Digital Read | 0 V | 0 V | 0.9 V | 0 V | 1.5 V-2.5 V | 0 V-1.5 V | 0.9 V | 0 V |

The ability to apply different sets of voltages to memory cells of analog array 3601 and memory cells of digital array 3604 enhances performance during neural read operations of analog array 3601 and digital read operations of digital array 3604, such as reducing leakage during read neural operations (caused by the ability to shut off the high current of the digital cells sharing the same bit lines as the analog cells) and higher speed for digital cells due to higher current levels.

Figure 37:
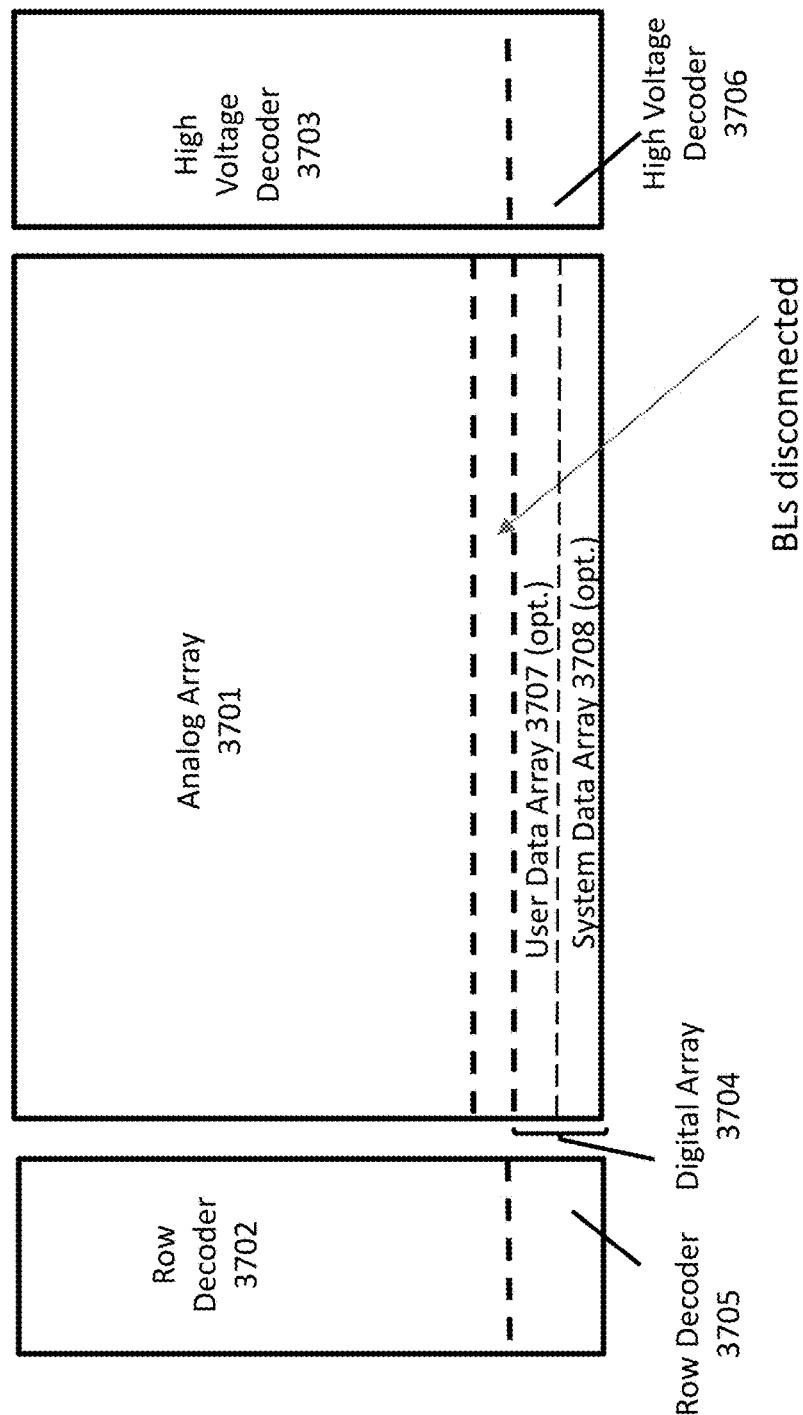
FIG. 37 depicts an example of a VMM system comprising a digital array.

FIG. 37 depicts an example VMM system 3700, which comprises analog array 3701, row decoder 3702, high voltage decoder 3703, digital array 3704 (optionally comprising user data array 3707 and system data array 3708), row decoder 3705, and high voltage decoder 3706. VMM system 3700 is similar to VMM system 3600, except that the bit lines coupled to analog array 3701 are disconnected from the bit lines coupled to digital array 3704, meaning that array 3701 and digital array 3704 have separate bit lines. However, the bitlines of analog array 3701 share the same diffusion layer as the bitlines of digital array 3704. In another example, the bitlines of analog array 3701 and the bitlines of digital array 3704 have different diffusion layers in addition to being disconnected. The diffusions may be disconnected between the analog and digital bit lines with one or more dummy rows. Optionally, analog array 3701 and digital array 3704 are fabricated on the same semiconductor die.

Table 10 depicts the operating voltages used in VMM system 3700, where CG-main, EG-main, BL-main, and SL-main are a first set of voltages applied to the control gate terminal, erase gate terminal, bit line terminal, and source line terminal, respectively, of one or more memory cells in analog array 3701 by row decoder 3702 and high voltage decoder 3703, and CG-IFR, EG-IFR, BL-IFR, and SL-IFR are a second set of voltages applied to a control gate terminal, erase gate terminal, bit line terminal, and source line terminal, respectively, of one or more memory cells in digital array 3704 by row decoder 3705 and high voltage decoder 3706.

TABLE No 10

Operating Voltages for VMM System 3700 in FIG. 37

| Action | CG-main | EG-main | BL-main | SL-main | CG-DIG | EG-DIG | BL-DIG | SL-DIG |
|---|---|---|---|---|---|---|---|---|
| Neural Read | 1.5 V | 0 V | 0.6 V | >=0 V | 0 V | 0 V | 0 V | 0 V |
| Digital Read | 0 V | 0 V | 0 V | 0 V | 2.5 V | 1.5 V | 0.9 V | 0 V |

FIG. 43 depicts an example read operation 4300 of an analog array (such as analog array 3601 and 3701 in FIGS. 36 and 37) and a digital array (such as digital array 3604 and 3704 in FIGS. 36 and 37). In operation 4301, during a read of an analog array, a first row decoder and a first voltage row decoder apply a first set of voltages to the analog array. In operation 4302, during a read of a digital array, a second row decoder and a second voltage row decoder apply a second set of voltages to the digital array, where the second set of voltages are different than the first set of voltages.

The ability to apply different sets of voltages to memory cells in analog array 3701 and memory cells in digital array 3704 enhances performance during neural read operations of analog array 3701 and digital read operations of digital array 3704, such as reducing leakage during read neural operations (caused by the ability to shut off the high current of the digital cells sharing the same bit lines as the analog cells) and higher speed for digital cells due to higher current levels.

Figure 38:
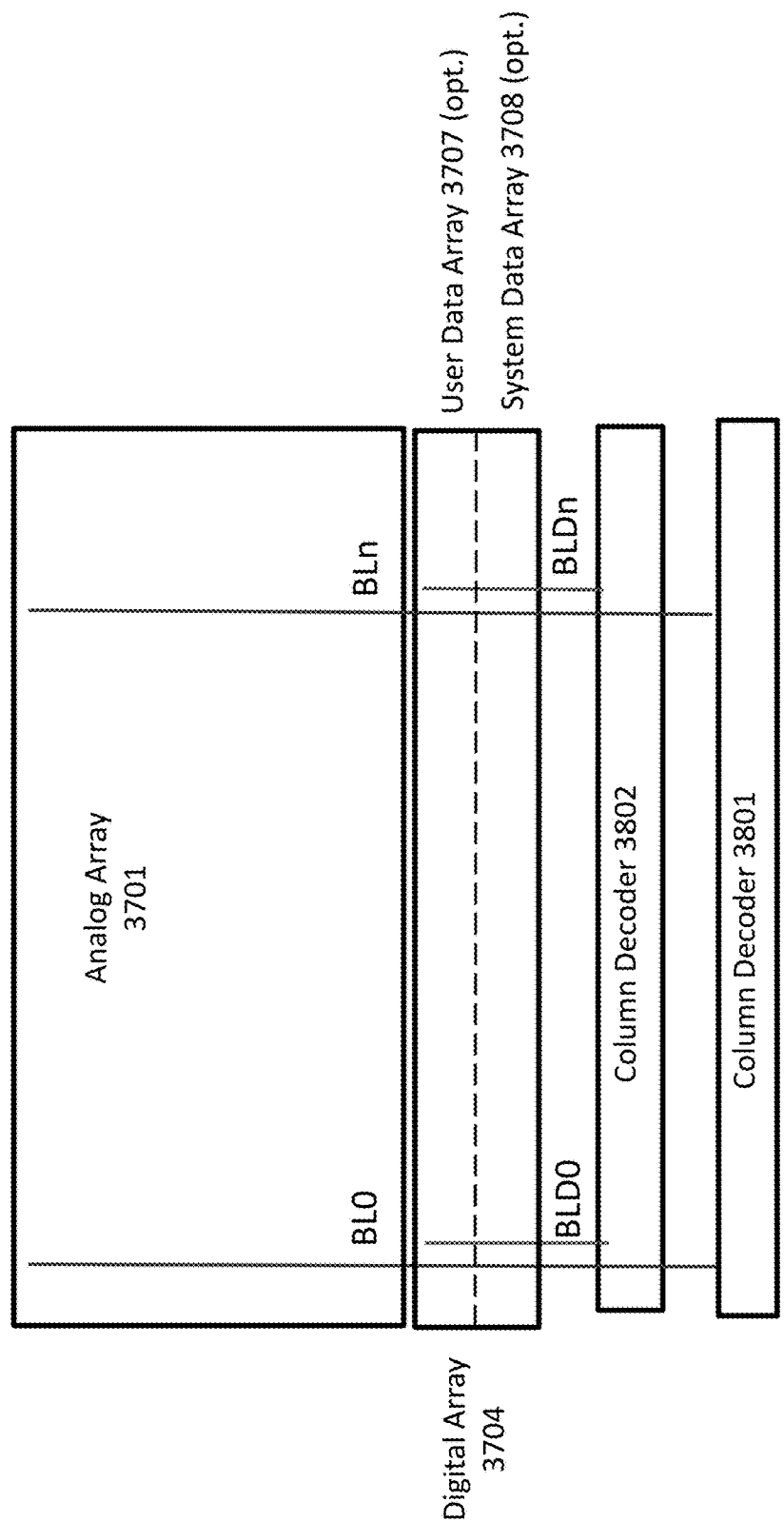
FIG. 38 depicts additional aspects of the VMM system of FIG. 37.

FIG. 38 depicts additional aspects of VMM system 3700, which further comprises column decoder 3801 and column decoder 3802. Column decoder 3801 is coupled to bit lines BL0, . . . , BLn that are coupled to columns of analog array 3701. Column decoder 3802 is coupled to bit lines BLD0, . . . , BLDn that are coupled to columns of digital array 3704. Digital array 3704 optionally comprises user data array 3707 and system data array 3708. Thus, analog array 3701 and digital array 3704 have separate column decoders, further reducing leakage during read neural operations.

Figure 39A:
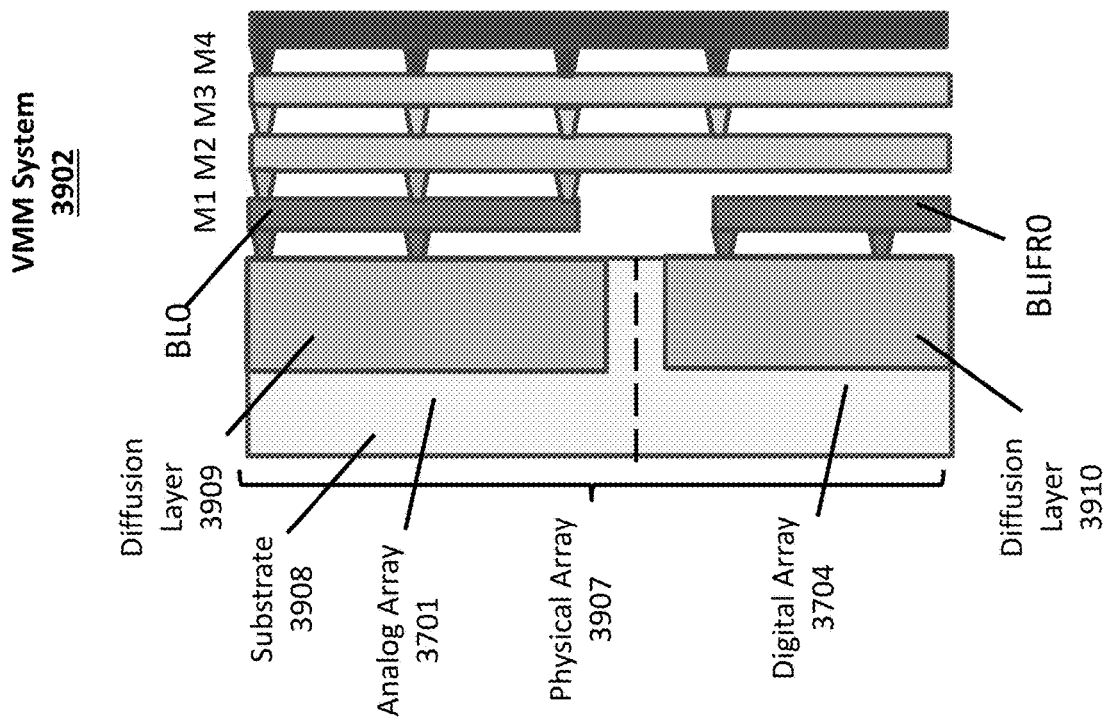
FIGS. 39A, 39B, and 39C depict example designs for VMM system of FIG. 37.
Figure 39B:
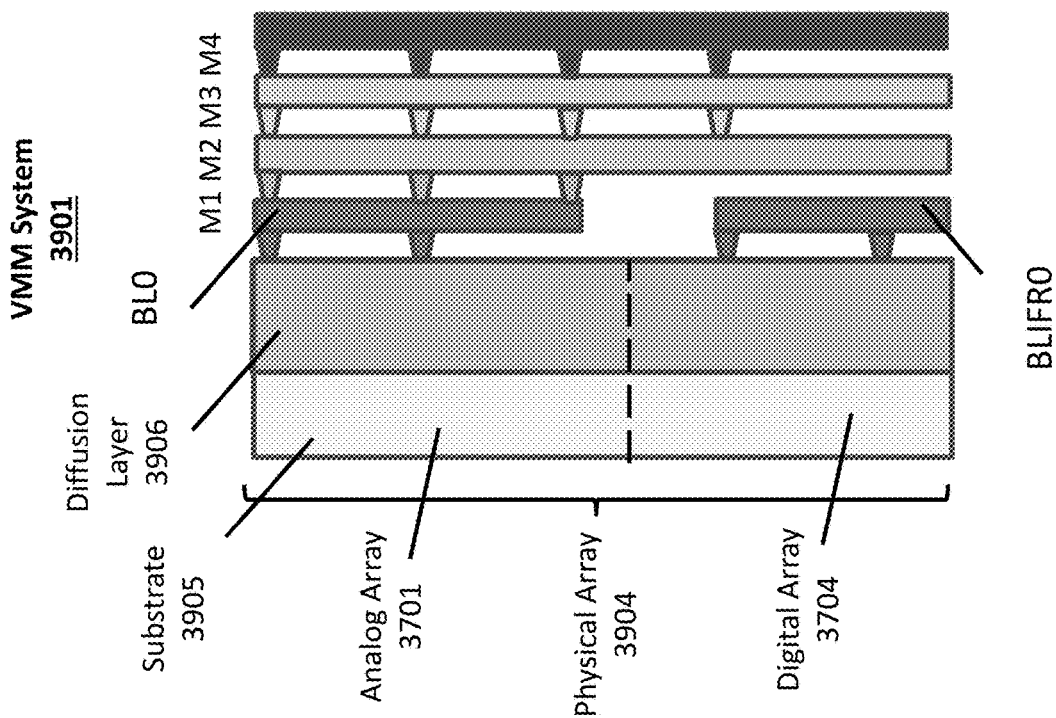
Figure 39C:
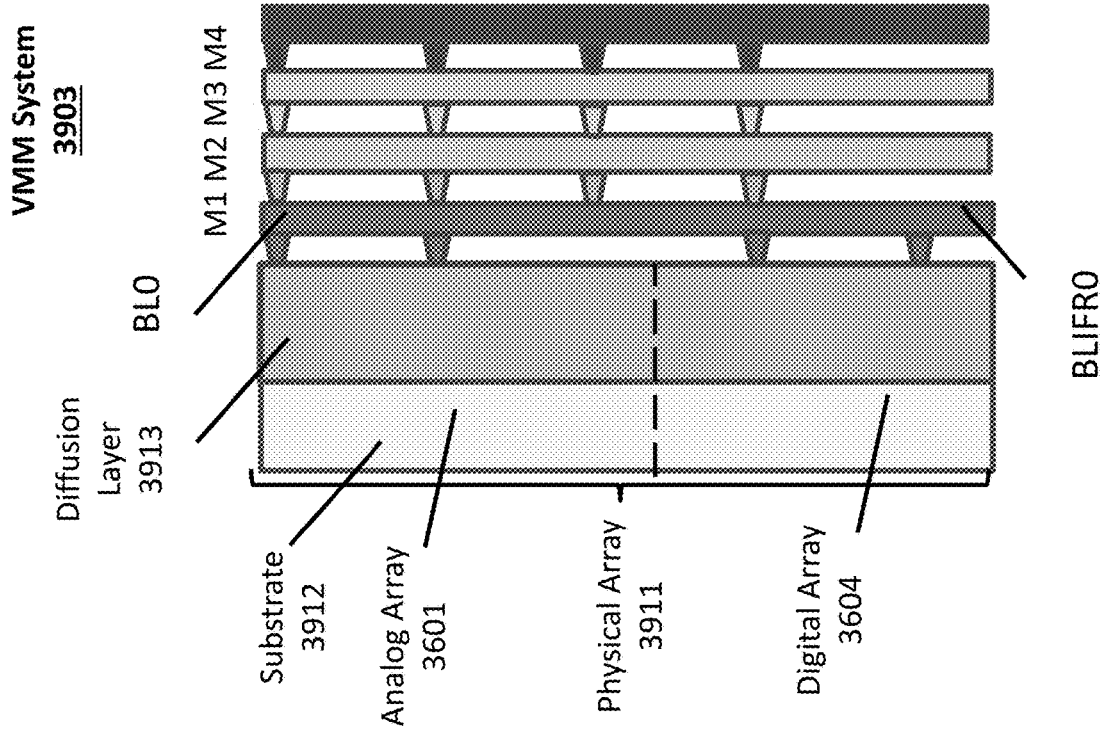

FIGS. 39A and 39B depict VMM systems 3901, 3902 respectively, which are example designs for VMM system 3700, and FIG. 39C depicts VMM system 3903 with is an example design for VMM system 3600.

In FIG. 39A, VMM system 3901 comprises analog array 3701 and digital array 3704. Example bit line BL0 is coupled to analog array 3701 and example bit line BLIFR0 is coupled to digital array 3704. The bit line BL0, coupled to analog array 3701, may be termed analog array bit line BL0, uses metal layers M1 to M4 in analog array 3701, and metal layers M2 to M4 also connect to peripheral circuitry (such as a column decoder), whereas bit line BLIFR0, coupled to digital array 3704, may be termed digital array bit line BLIFR0, uses metal layer M1 only. Analog array 3701 and digital array 3704 are part of the same physical array 3904. Physical array 3904 comprises substrate 3905 and diffusion layer 3906, which are both shared by analog array 3701 and digital array 3704. Physical array 3904 is partitioned by using disconnected metal interconnects for analog array 3701 and digital array 3704. For example, as can be seen, analog array bit line BL0 and digital array bit line BLIFR0 are disconnected from one another. Using the same physical array 3904 for both analog array 3701 and digital array 3704 reduces any physical effect from process uniformity and area overhead which would occur in the use of separate physical arrays.

In FIG. 39B, VMM system 3902 comprises analog array 3701 and digital array 3704. Example bit line BL0 is coupled to analog array 3701, and may be termed analog array bit line BL0, and example bit line BLIFR0 is coupled to digital array 3704, and may be termed digital array bit line BLIFR0. The analog array bit line B0 uses metal layers M1 to M4 in analog array 3701, and M2 to M4 also connect to peripheral circuitry (such as a column decoder), whereas digital array bit line BLIFR0 uses metal layer M1 only. Analog array 3701 and digital array 3704 are part of the same physical array 3907. Physical array 3907 comprises substrate 3908, diffusion layer 3909, and diffusion layer 3910. Substrate 3908 is shared by analog array 3701 and digital array 3704. Diffusion layer 3909 is part of analog array 3701 but not digital array 3704, and diffusion layer 3910 is part of digital array 3704 but not analog array 3701. Physical array 3907 is partitioned by using disconnected metal interconnects and separate diffusion layers for analog array 3701 and digital array 3704. For example, as can be seen, bit line BL0 serving analog array 3701 and bit line BLIFR0 serving digital array 3704 are disconnected from one another, and diffusion layer 3909 of analog array 3701 is separate from diffusion layer 3910 of digital array 3704. Using the same physical array 3907 for both analog array 3701 and digital array 3704 reduces any physical effect from process uniformity and area overhead which would occur in the use of separate physical arrays.

In FIG. 39C, VMM system 3903 comprises analog array 3601 and digital array 3604. Example bit line BL0 is coupled to analog array 3601 and example bit line BLIFR0 is coupled to digital array 3604. Here, bit line BL0 and bit line BLIFR0 are the same bit line and both use metal layers M1 to M4. Metal layers M2 to M4 also connect to peripheral circuitry (such as a column decoder). Analog array 3601 and digital array 3604 are part of the same physical array 3911. Physical array 3911 comprises substrate 3912 and diffusion layer 3913, which are both shared by analog array 3601 and digital array 3604. Unlike physical arrays 3904 and 3907 in FIGS. 39A and 39B, physical array 3911 is not partitioned. For example, as can be seen, bit lines BL0 and BLIFR0 are the same and connect to analog array 3601 and digital array 3604. Using the same physical array 3911 for analog array 3601 and digital array 3604 reduces any physical effect from process uniformity and area overhead which would occur in the use of a separate physical arrays.

Figure 40:
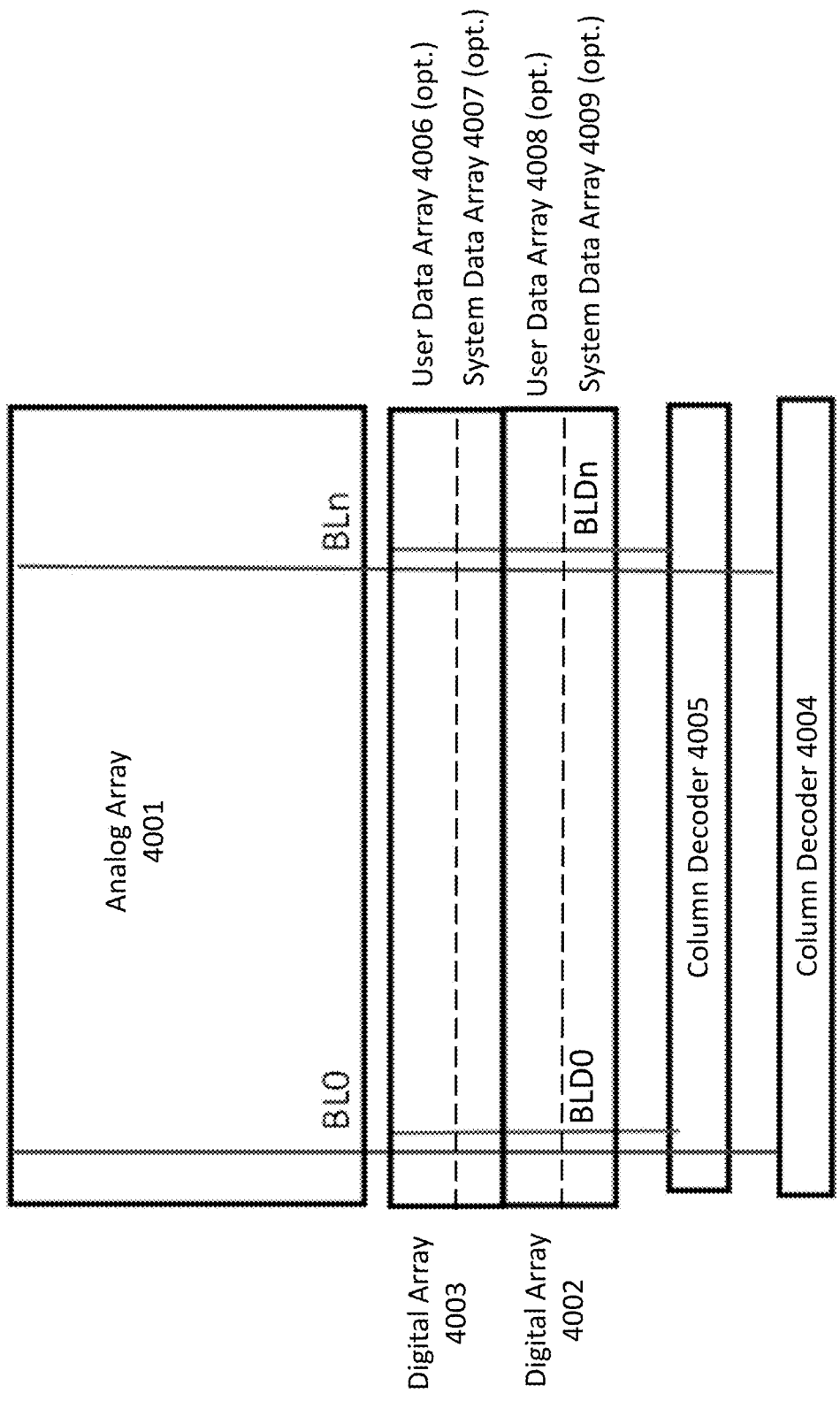
FIG. 40 depicts an example of a VMM system comprising a digital array.

FIG. 40 depicts example VMM system 4000, which comprises analog array 4001, digital array 4002 (which optionally comprises user data array 4008 and system data array 4009), digital array 4003 (which optionally comprises user data array 4006 and system data array 4007), column decoder 4004, and column decoder 4005. Column decoder 4004 is coupled to bit lines BL0, . . . , BLn that are coupled to columns of analog array 4001. Column decoder 4005 is coupled to bit lines BLD0, . . . , BLDn that are coupled to columns of digital array 4002 and digital array 4003. Here, each of digital array 4003 and digital array 4002 can be used to store any type of digital data, including digital user data for a non-volatile storage operation. Analog array 4001 and digital arrays 4002, 4003 have separate column decoders, reducing leakage and enhancing performance (like faster speed). Optionally, two or more of analog array 4001, digital array 4003, and digital array 4002 are fabricated on the same semiconductor die.

Figure 41:
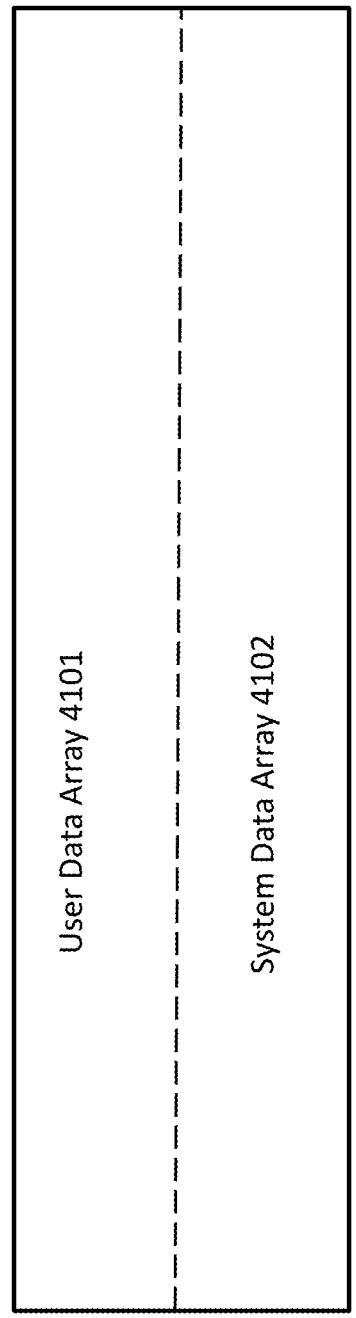
FIG. 41 depicts an example of a digital array.

FIG. 41 depicts digital array 4100, which can be any of digital arrays 3604, 3704, 4002, or 4003 discussed previously. In this example, digital array 4100 comprises user data array 4101 and system data array 4102. User data array 4101 and system data array 4102 can be accessed independently from one another, such that: (1) user data array 4101 is accessed at an average frequency $f_1$ while system data array 4102 is accessed at an average frequency $f_2$, where $f_1$ and $f_2$ can be different and $f_2$ may be less than $f_1$; (2) user data array 4101 has an access time of $t_1$, while system data array 4102 has an access time of $t_2$, where $t_1$ and $t_2$ can be different and $t_2$ may be greater than $t_1$, meaning that a read or write operation is slower for system data array 4102 than for user data array 4101; and (3) user data array 4101 has an endurance $e_1$ while system data array 4102 has an endurance $e_2$, where $e_1$ and $e_2$ can be different and $e_2$ may be less than $e_1$. This can allow for greater manufacturing tolerances and less power consumption for system data array 4102 compared to user data array 4101.

Figure 42A:
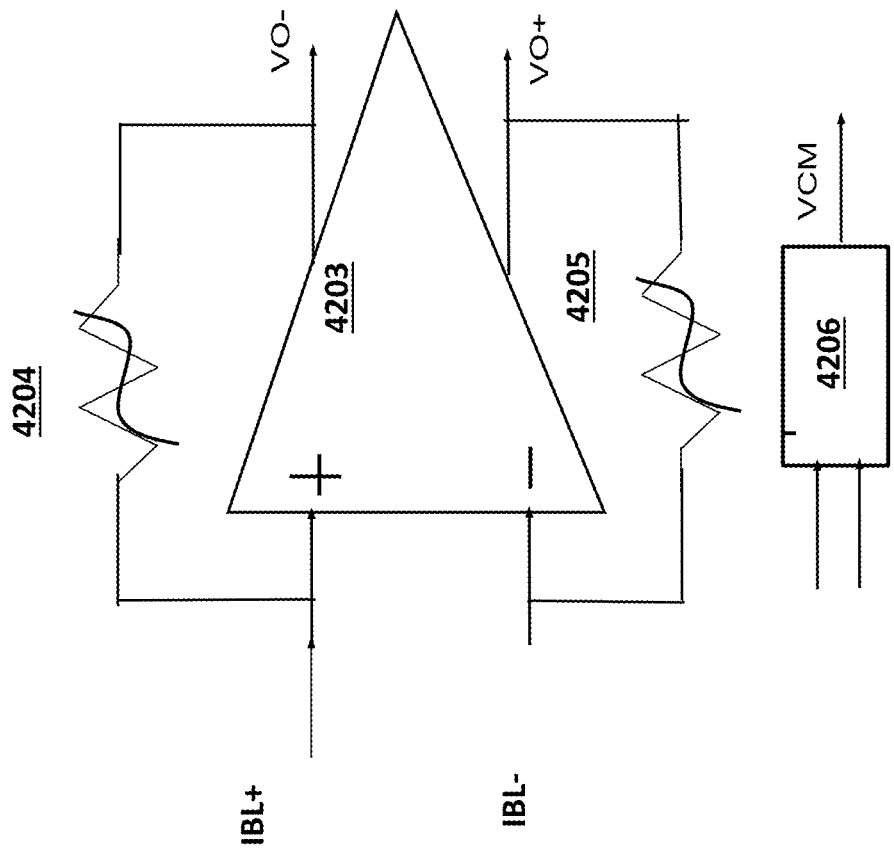
FIG. 42A depicts a differential current-to-voltage converter.

FIG. 42A depicts differential current-to-voltage converter 4201, which can read analog data from analog arrays 3601, 3701, and 4001 using a first set of voltages and read digital data from digital arrays 3604, 3704, 4002, and 4003 using a second set of voltages in VMM systems 3600, 3700, 4000, respectively.

Differential current-to-voltage converter 4201 comprises operational amplifier 4203; variable integrating resistors 4204 and 4205; and common mode circuit 4206 (which is used for a differential amplifier implementation of operational amplifier 4203). Differential current-to-voltage converter 4201 converts two current inputs, IBL+ and IBL−, into differential output voltages, VO+ and VO−, where the output voltages are proportional to the resistance of variable resistors 4204 and 4205. Input currents IBL+ and IBL− optionally are currents representing a positive weight and a negative weight. For example, IBL+ can be a current, Iw+ from a single cell or a bitline current that is the sum of currents from a plurality of w+ cells coupled to the bit line, and IBL− can be a current, Iw−, from a single cell or a bit line current that is the sum of currents from a plurality of w− cells coupled to the bit line. Such positive weights and negative weights can be used in a neural network to present a weight (W=W+−W−). In another example, the two input currents, IBL+ and IBL−, can represent a cell current (in which case, it is used to verify the cell current target in weight tuning, meaning program or erase cell to a target current) or bitline current from the array and a reference current.

Optionally, the bias current for operational amplifier 4203 and/or the common mode circuit 4206, can be set to a higher current level for a digital read than for an analog read.

Figure 42B:
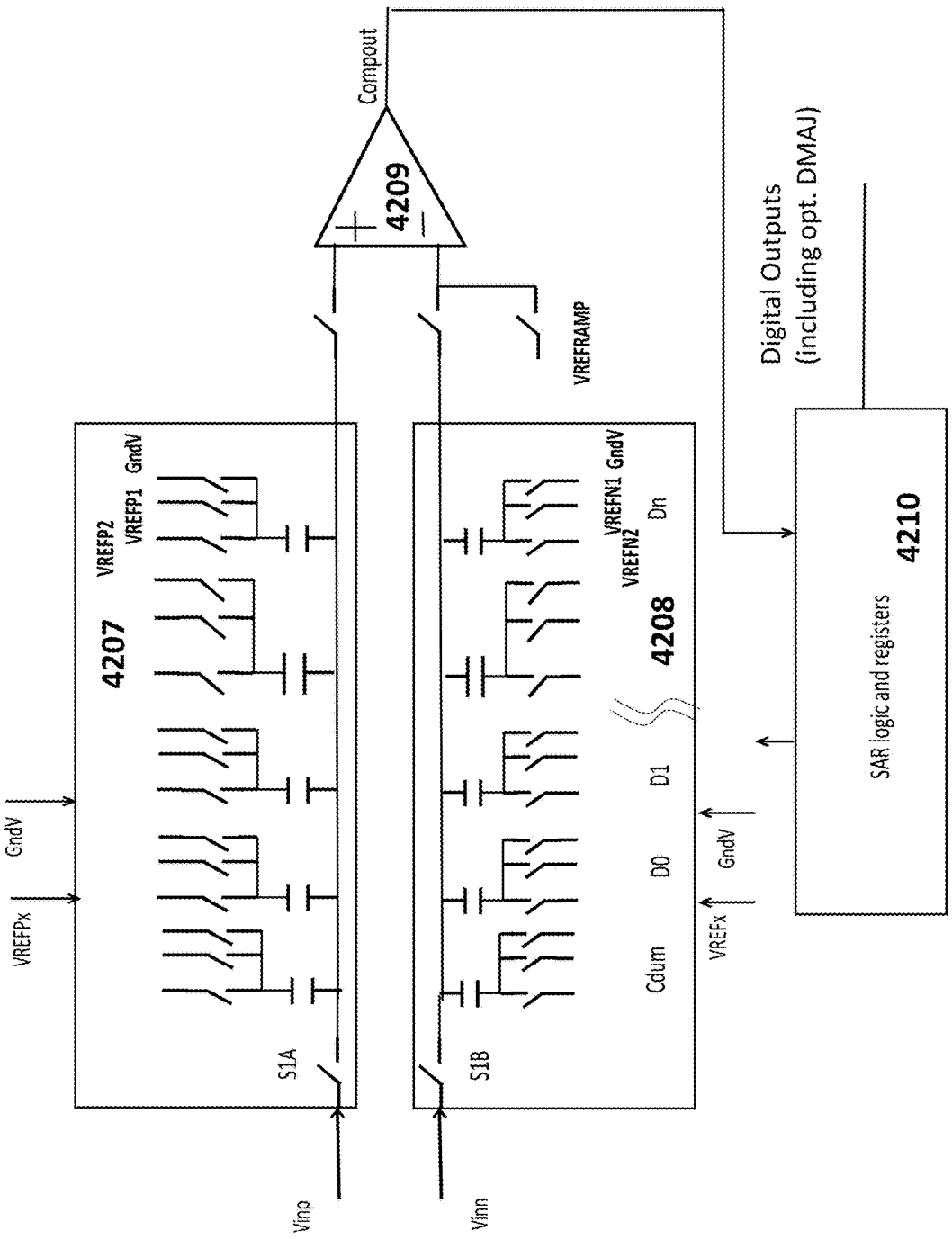
FIG. 42B depicts a differential successive address register analog-to-digital converter.

Optionally the resistor 4204 and 4205 can be set to a different value for digital read versus for analog read. Optionally the resistor 4204 and 4205 can be set to a different value for when the converter 4201 is used for cell verify in a weight tuning operation (such as program or erase memory cell to a target current). FIG. 42B depicts differential successive-approximation register (SAR) analog-to-digital converter (ADC) 4202, which can read analog data from analog arrays 3601, 3701, and 4001 using a first set of voltages and to read digital data from digital arrays 3604, 3704, 4002, and 4003 or using a second set of voltages in VMM systems 3600, 3700, 4000, respectively.

Differential successive approximation register analog-to-digital converter 4202 converts an analog input or differential analog input into a digital output using a binary search through all possible quantization levels to identify the appropriate digital output.

Differential successive approximation register analog-to-digital converter 4202 comprises binary capacitive digital-to-analog converter (CDAC) 4207, binary CDAC 4208 (complementary to CDAC 4207), comparator 4209, and SAR logic and registers 4210.

Differential successive approximation register analog-to-digital converter (SAR ADC) 4202 receives a differential voltage inputs, Vinp and Vinn, which are for example provided by the differential current-to-voltage converter 4201. SAR logic and registers 4210 cycle through all possible digital bit combinations, which in turn control switches in CDAC 4207 and 4208 to couple voltage sources to capacitors. When the output of comparator 4209 flips, then the digital bit combination in SAR logic and registers 4210 is output as Digital Outputs. Optionally, SAR logic and registers 4210 generates an additional 1-bit digital output, DMAJ, in Digital Outputs which is a "1" if a majority of the bits in the digital value are a "1", and a "0" if a majority of the bits in the corresponding digital value are not "1."

Optionally, resistors 4204 and 4205 can be set to different resistance values for a digital read operation than for an analog read operation.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. An artificial neural network system, comprising:
    an analog array of non-volatile memory cells arranged into rows and columns;
    a digital array of non-volatile memory cells arranged into rows and columns;
    a plurality of bit lines, wherein each bit line in the plurality of bit lines is connected to a column of non-volatile memory cells in the analog array and a column of non-volatile memory cells in the digital array;
    a first row decoder coupled to the analog array;
    a first high voltage row decoder coupled to the analog array;
    a second row decoder, separate from the first row decoder, coupled to the digital array; and
    a second high voltage row decoder, separate from the first high voltage row decoder coupled to the digital array;
    wherein during a read of the analog array, the first row decoder and the first high voltage row decoder apply a first set of voltages to the analog array; and
    wherein during a read of the digital array, the second row decoder and the second high voltage row decoder apply a second set of voltages to the digital array, the second set of voltages different than the first set of voltages.

2. The artificial neural network system of claim 1, comprising a read circuit used during a read of the analog array and a read of the digital array.

3. The artificial neural network system of claim 2, wherein during a read of the digital array, the read circuit outputs a "1" if a majority of output bits generated by the read circuit are a "1" and outputs a "0" if less than a majority of output bits generated by the read circuit are a "1".

4. The artificial neural network system of claim 1, wherein the digital array comprises a user data array and a system data array.

5. The artificial neural network system of claim 4, wherein a speed of one or more of a read, program, or erase for the system data array is slower than for the user data array.

6. The artificial neural network system of claim 4, wherein a speed of a read of the system data array is slower than for the user data array.

7. The artificial neural network system of claim 4, wherein an endurance of the system data array is less than an endurance of the user data array.

* * * * *